3,239,544
16-FLUORO-11-HYDROXY STEROIDS OF THE PREGNANE SERIES
Barney J. Magerlein, Portage Township, Kalamazoo County, Robert D. Birkenmeyer and Fred Kagan, Kalamazoo, and William P. Schneider, Kalamazoo Township, Kalamazoo County, Mich., assignors to The Upjohn Company, Kalamazoo, Mich., a corporation of Delaware
No Drawing. Filed Aug. 23, 1960, Ser. No. 51,298
33 Claims. (Cl. 260—397.45)

This application is a continuation-in-part of U.S. application Serial No. 36,760, filed June 17, 1960, now abandoned, which is in turn a continuation-in-part of U.S. application Serial No. 1,449, filed January 11, 1960, now abandoned, which is in turn a continuation-in-part of U.S. application Serial No. 633,175, now abandoned, filed January 7, 1957, which is in turn a continuation-in-part of U.S. application Serial No. 521,365, filed July 11, 1955, now U.S. Patent 2,781,366, issued February 12, 1957, and U.S. application Serial No. 776,437, filed November 26, 1958.

This invention relates to novel 16α-fluoro and 16β-fluoro steroids and novel steroid intermediates and methods used in the prepartion thereof.

The novel 16α-fluoro-11β-hydroxy and 16β-fluoro-11β-hydroxy steroid compounds of this invention are represented by the formula:

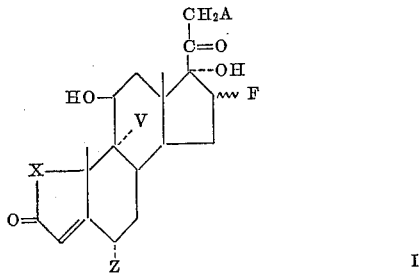

wherein A is selected from the group consisting of hydroxy, OAcyl, fluorine and —OPO$_3$H$_2$, the term Acyl representing the acyl radical of an organic carboxylic acid, particularly a hydrocarbon carboxylic acid containing from 1 to 12 carbon atoms, inclusive, X is selected from the group consisting of

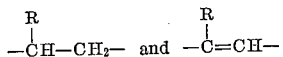

R being attached at the 2-position and selected from the group consisting of hydrogen and methyl, V is selected from the group consisting of hydrogen and ffuorine, and Z is selected from the group consisting of hydrogen, methyl and fluorine.

In this application the wavy line (∫) represents a generic expression including the alpha (α) and (β) configuration.

The compounds of Formula I possess useful therapeutic properties. The compounds of Formula I possess anti-inflammatory and glucocorticoid activity. Thus, for example, 16α-fluoro-11β,17α·21-trihydroxy-1,4-pregnadiene-3,20-dione 21-acetate has been found to exhibit approximately 7.7 times the glucocorticoid activity of hydrocortisone, approximately 16 times the anti-inflammatory activity of hydrocortisone, and in addition has a favorable effect on salt and water balance.

The compounds of Formula I are useful in the treatment of inflammatory conditions of mammals and birds and are particularly useful in the treatment of inflammatory conditions of the skin, eyes and ears of humans and of valuable domestic animals, as well as contact dermatitis and other allergic reactions.

Administration of the novel steroids of Formula I can be in conventional dosage forms, such as pills, tablets, capsules, syrups or elixirs for oral use, or in liquid forms which are adaptable to the natural and synthetic cortical steroid hormones for injectable products. The novel compounds of Formula I can also be administered topically in the form of ointments, creams, lotions, and the like, with or without coacting antibiotics, germicides or other materials forming advantageous combinations therewith.

This invention also relates to the 11-keto compounds, otherwise corresponding to the compounds of Formula I.

The novel compounds of this invention, and more particularly the 16α and 16β epimeric forms of 16-fluoro-Δ$^4$-pregnenes, such as, 16-fluoro-11β,17α,21-trihydroxy-4-pregnene-3,20-dione,
9α,16-difluoro-11β,17α,21-trihydrroxy-4-pregnene-3,20-dione,
6α,16-difluoro-11β,17α,21-trihydroxy-4-pregnene-3,20-dione,
6α,9α,16-trifluoro-11β,17α,21-trihydroxy-4-pregnene-3,20-dione,
6α-methyl-16-fluoro-11β,17α,21-trihydroxy-4-pregnene-3,20-dione,
6α-methyl-9α,16-difluoro-11β,17α,21-trihydroxy-4-pregnene-3,20-dione, and the 21-acylates thereof;
16-fluoro-Δ$^{1,4}$-pregnadienes, such as,
16-fluoro-11β,17α,21-trihydroxy-1,4-pregnadiene-3,20-dione,
9α,16-fluoro-11β,17α,21-trihydroxy-1,4,-pregnadiene-3,20-dione,
6α,16-difluoro-11β,17α,21-trihydroxy-1,4-pregnadiene-3,20-dione,
6α,9α,16-trifluoro-11β,17α,21-trihydroxy-1,4-pregnadiene-3,20-dione,
6α-methyl-16-fluoro-11β,17α,21-trihydroxy-1,4-pregnadiene-3,20-dione,
6α-methyl-9α,16-difluoro-11β,17α,21-trihydroxy-1,4-pregnadiene-3,20-dione, and the 21-acylates thereof;
2α-methyl-16-fluoro-Δ$^4$-pregnenes, such as,
2α-methyl-16-fluoro-11β,17α,21-trihydroxy-4-pregnene-3,20-dione,
2α-methyl-9α,16-difluoro-11β,17α,21-trihydroxy-4-pregnene-3,20-dione,
2α-methyl-6α,16-difluoro-11β,17α,21-trihydroxy-4-pregnene-3,20-dione,
2α-methyl-6α,9α,16-trifluoro-11β,17α,21-trihydroxy-4-pregnene-3,20-dione,
2α,6α-dimethyl-16-fluoro-11β,17α,21-trihydroxy-4-pregnene-3,20-dione,
2α,6α-dimethyl-9α,16-difluoro-11β,17α,21-trihydroxy-4-pregnene-3,20-dione, and the 21-acylates thereof;
2-methyl-16-fluoro-Δ$^{1,4}$-pregnadienes, such as,
2-methyl-16-fluoro-11β,17α,21-trihydroxy-1,4-pregnadiene-3,20-dione,
2-methyl-9α,16-difluoro-11β,17α,21-trihydroxy-1,4-pregnadiene-3,20-dione,
2-methyl-6α,16-difluoro-11β,17α,21-trihydroxy-1,4-pregnadiene-3,20-dione,
2-methyl-6α,9α,16-trifluoro-11β,17α,21-trihydroxy-1,4-pregnadiene-3,20-dione,
2,6α-dimethyl-16-fluoro-11β,17α,21-trihydroxy-1,4-pregnadiene-3,20-dione,
2,6α-dimethyl-9α,16-difluoro-11β,17α,21-trihydroxy-1,4- pregnadiene-3,20-dione, and the 21-acylates thereof;
16-21-difluoro-Δ⁴-pregnenes, such as,
16,21-difluoro-11β,17α-dihydroxy-4-pregnene-3,20,dione,
9α,16,21-trifluoro-11β,17α-dihydroxy-4-pregnene-3,20-dione,
6α,16,21-trifluoro-11β,17α-dihydroxy-4-pregnene-3,20-dione,
6α,9α,16,21-tetrafluoro-11β,17α-dihydroxy-4-pregnene-3,20-dione,
6α-methyl-16,21-difluoro-11β,17α-dihydroxy-4-pregnene-3,20-dione,
6α-methyl-9α,16,21-trifluoro-11β,17α-dihydroxy-4-pregnene-3,20-dione, and the 17-acylates thereof;
16,21-difluoro-Δ¹,⁴-pregnadienes, such as,
16,21-difluoro-11β,17α-dihydroxy-1,4-pregnadiene-3,20-dione,
9α,16,21-trifluoro-11β,17α-dihydroxy-1,4-pregnadiene-3,20-dione,
6α,16,21-trifluoro-11α,17α-dihydroxy-1,4-pregnadiene-3,20-dione,
6α,9α,16,21-tetrafluoro-11β,17α-dihydroxy-1,4-pregnadiene-3,20-dione,
6α-methyl-16,21-difluoro-11β,17α-dihydroxy-1,4-pregnadiene-3,20-dione,
6α-methyl-9α,16,21-trifluoro-11β,17α-dihydroxy-1,4-pregnadiene-3,20-dione, and the 17-acylates thereof;
2α-methyl-16,21-difluoro-Δ⁴-pregnenes, such as,
2α-methyl-16,21-difluoro-11β,17α-dihydroxy-4-pregnene-3,20-dione,
2α-methyl-9α,16α,21-trifluoro-11β,17α-dihydroxy-4-pregnene-3,20-dione,
2α-methyl-6α,16,21-trifluoro-11β,17α-dihydroxy-4-pregnene-3,20-dione,
2α-methyl-6α,9α,16,21-tetrafluoro-11β,17α-dihydroxy-4-pregnene-3,20-dione,
2α,6α-dimethyl-16,21-difluoro-11β,17α-dihydroxy-4-pregnene-3,20-dione,
2α,6α-dimethyl-9α,16,21-trifluoro-11β,17α-dihydroxy-4-pregnene-3,20-dione, and the 17-acylates thereof;
2-methyl-16,21-difluoro-Δ¹,⁴-pregnadienes, such as,
2-methyl-16,21-difluoro-11β,17α-dihydroxy-1,4-pregnadiene-3,20-dione,
2-methyl-9α,16,21-trifluoro-11β,17α-dihydroxy-1,4-pregnadiene-3,20-dione,
2-methyl-6α,16,21-trifluoro-11β,17α-dihydroxy-1,4-pregnadiene-3,20-dione,
2-methyl-6α,9α,16,21-tetrafluoro-11β,17α-dihydroxy-1,4-pregnadiene-3,20-dione,
2,6α-dimethyl-16,21-difluoro-11β,17α-dihydroxy-1,4-pregnadiene-3,20-dione,
2,6α-dimethyl-9α,16,21-trifluoro-11β,17α-dihydroxy-1,4-pregnadiene-3,20-dione, and the 17-acylates thereof;
16-fluoro-Δ⁴-pregnene 21-phosphates, such as,
16-fluoro-11β,17α,21-trihydroxy-4-pregnene-3,20-dione 21-phosphate,
9α,16-difluoro-11β,17α,21-trihydroxy-4-pregnene-3,20-dione 21-phosphate,
6α,16-difluoro-11β,17α,21-trihydroxy-4-pregnene-3,20-dione 21-phosphate,
6α,9α,16-trifluoro-11β,17α,21-trihydroxy-4-pregnene-3,20-dione 21-phosphate,
6α,methyl-16-fluoro-11β,17α,21-trihydroxy-4-pregnene-3,20-dione 21-phosphate,
6α-methyl-9α,16-difluoro-11β,17α,21-trihydroxy-4-pregnene-3,20-dione 21-phosphate,
16-fluoro-Δ¹,⁴-pregnadiene 21-phosphates, such as,
16-fluoro-11β,17α,21-trihydroxy-1,4-pregnadiene-3,20-dione 21-phosphate,
9α,16-difluoro-11β,17α,21-trihydroxy-1,4-pregnadiene-3,20-dione 21-phosphate,
6α,16-difluoro-11β,17α,21-trihydroxy-1,4-pregnadiene-3,20-dione 21-phosphate,
6α,9α,16-trifluoro-11β,17α,21-trihydroxy-1,4-pregnadiene-3,20-dione 21-phosphate,
6α-methyl-16-fluoro-11β,17α,21-trihydroxy-1,4-pregnadiene-3,20-dione 21-phosphate,
6α-methyl-9α,16-difluoro-11β,17α,21-trihydroxy-1,4-pregnadiene-3,20-dione 21-phosphate,
2α-methyl-16-fluoro-Δ⁴-pregnene 21-phosphates, such as,
2α-methyl-16-fluoro-11β,17α,21-trihydroxy-4-pregnene-3,20-dione 21-phosphate,
2α-methyl-9α,16-difluoro-11β,17α,21-trihydroxy-4-pregnene-3,20-dione 21-phosphate,
2α-methyl-6α,16-difluoro-11β,17α,21-trihydroxy-4-pregnene-3,20-dione 21-phosphate,
2α-methyl-6α,9α,16-trifluoro-11β,17α,21-trihydroxy-4-pregnene-3,20-dione 21-phosphate,
2α,6α-dimethyl-16-fluoro-11β,17α,21-trihydroxy-4-pregnene-3,20-dione 21-phosphate,
2α,6α-dimethyl-9α,16-difluoro-11β,17α,21-trihydroxy-4-pregnene-3,20-dione 21-phosphate,
2-methyl-16-fluoro-Δ¹,⁴-pregnadiene 21-phosphates, such as,
2-methyl-16-fluoro-11β,17α,21-trihydroxy-1,4-pregnadiene-3,20-dione 21-phosphate,
2-methyl-9α,16-difluoro-11β,17α,21-trihydroxy-1,4-pregnadiene-3,20-dione 21-phosphate,
2-methyl-6α,16-difluoro-11β,17α,21-trihydroxy-1,4-pregnadiene-3,20-dione 21-phosphate,
2-methyl-6α,9α,16-trifluoro-11β,17α,21-trihydroxy-1,4-pregnadiene-3,20-dione 21-phosphate,
2,6α-dimethyl-16-fluoro-11β,17α,21-trihydroxy-1,4-pregnadiene-3,20-dione 21-phosphate,
2,6α-dimethyl-9α,16-difluoro-11β,17α,21-trihydroxy-1,4-pregnadiene-3,20-dione 21-phosphate, are prepared according to the following reaction scheme:

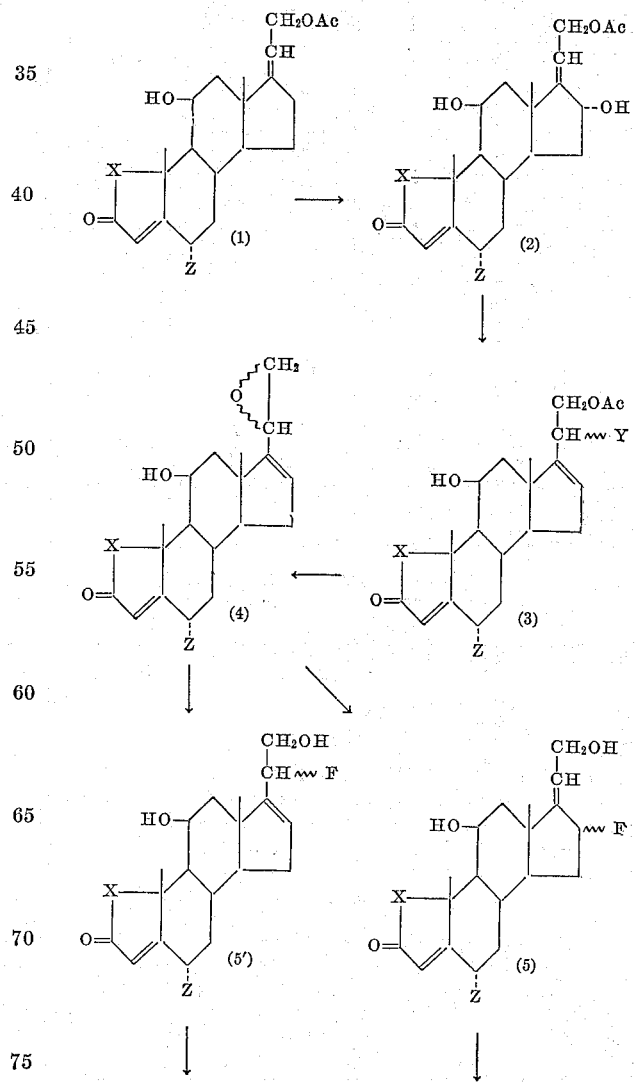

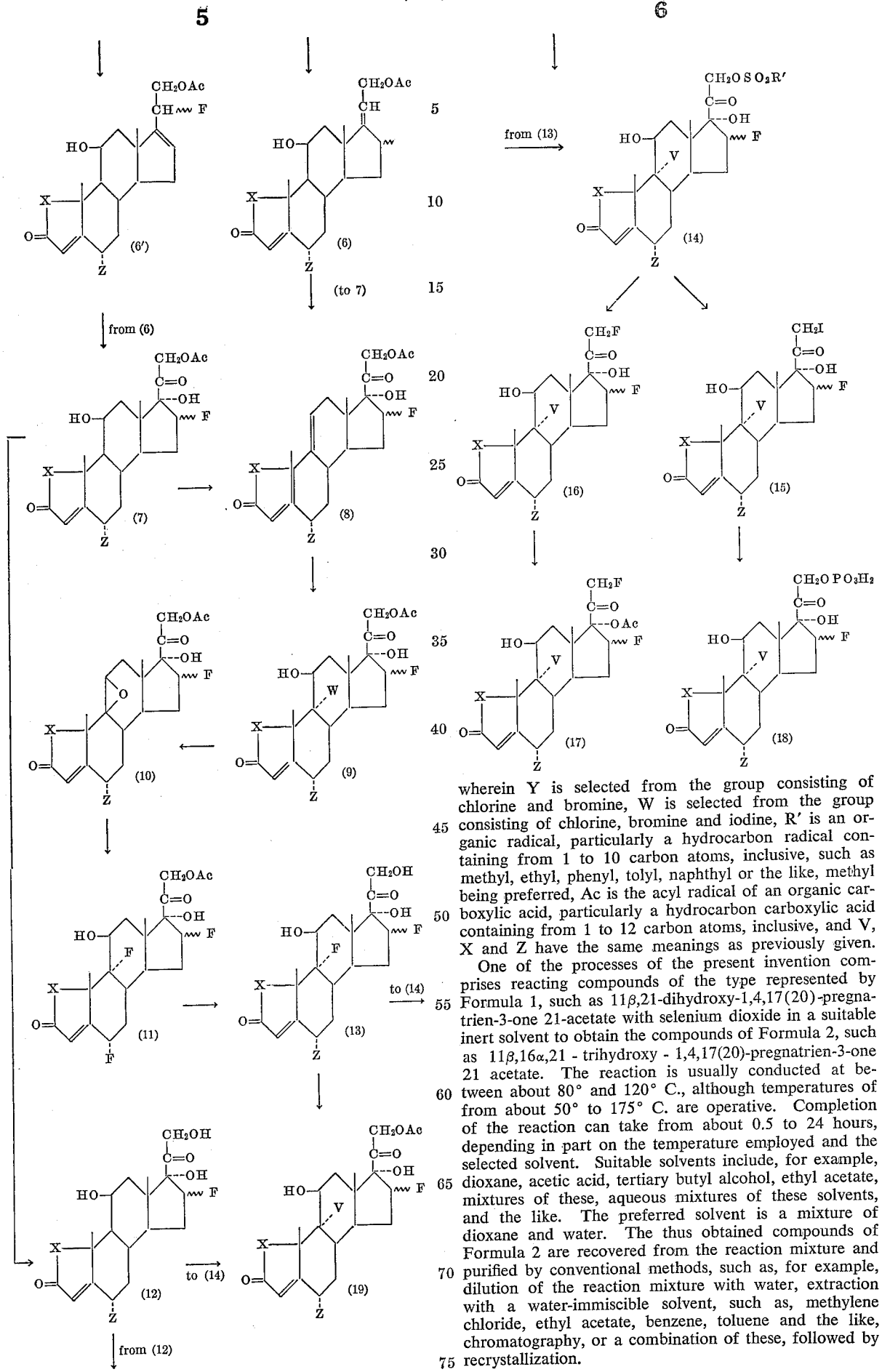

wherein Y is selected from the group consisting of chlorine and bromine, W is selected from the group consisting of chlorine, bromine and iodine, R' is an organic radical, particularly a hydrocarbon radical containing from 1 to 10 carbon atoms, inclusive, such as methyl, ethyl, phenyl, tolyl, naphthyl or the like, methyl being preferred, Ac is the acyl radical of an organic carboxylic acid, particularly a hydrocarbon carboxylic acid containing from 1 to 12 carbon atoms, inclusive, and V, X and Z have the same meanings as previously given.

One of the processes of the present invention comprises reacting compounds of the type represented by Formula 1, such as 11β,21-dihydroxy-1,4,17(20)-pregnatrien-3-one 21-acetate with selenium dioxide in a suitable inert solvent to obtain the compounds of Formula 2, such as 11β,16α,21 - trihydroxy - 1,4,17(20)-pregnatrien-3-one 21 acetate. The reaction is usually conducted at between about 80° and 120° C., although temperatures of from about 50° to 175° C. are operative. Completion of the reaction can take from about 0.5 to 24 hours, depending in part on the temperature employed and the selected solvent. Suitable solvents include, for example, dioxane, acetic acid, tertiary butyl alcohol, ethyl acetate, mixtures of these, aqueous mixtures of these solvents, and the like. The preferred solvent is a mixture of dioxane and water. The thus obtained compounds of Formula 2 are recovered from the reaction mixture and purified by conventional methods, such as, for example, dilution of the reaction mixture with water, extraction with a water-immiscible solvent, such as, methylene chloride, ethyl acetate, benzene, toluene and the like, chromatography, or a combination of these, followed by recrystallization.

The compounds of Formula 2 can be converted to the corresponding 16,21-diacylates using conventional acylating procedures, for example, these acylating procedures used to convert hydrocortisone to hydrocortisone acetate. The compounds of Formula 2 can also be hydrolyzed using procedures known in the art, for example, the hydrolysis of hydrocortisone acylates to hydrocortisone, to obtain the corresponding free 21-alcohol compounds.

The compounds of Formula 2, such as 11$\beta$,16$\alpha$,21-trihydroxy-1,4,17(20)-pregnatrien-3-one 21-acetate are converted to the compounds of Formula 3, such as 20$\alpha$-chloro - 11$\beta$,21 - dihydroxy - 1,4,16-pregnatrien-3-one 21-acetate (Y=Cl) and 20$\alpha$-bromo-11$\beta$,21-dihydroxy-1,4,-16-pregnatrien-3-one 21-acetate (Y=Br), with thionyl chloride and thionyl bromide, respectively.

The conversion of the compounds of Formula 2 to the compounds of Formula 3 is carried out in the presence of a tertiary amine, such as tri-n-butylamine, pyridine, collidine, lutidine, triethylamine and the like, preferably tri-n-butylamine, and in the presence of a suitable solvent, such as methylene chloride, carbon tetrachloride, ether, tetrahydrofuran, benzene, and the like, preferably methylene chloride, at a temperature of about 3° to +30° C., preferably at a temperature of 0° to +15° C. Completion of the reaction can take from a few minutes to several hours, depending on the temperature employed and the selected solvent.

The thus obtained compounds of Formula 3 are recovered from the reaction mixture and purified by conventional methods, such as, for example, those described above for the recovery and purification of the compounds of Formula 2.

The thus obtained compounds of Formula 3 are converted to the compounds of Formula 4, such as 11$\beta$-hydroxy-20$\beta$,21-epoxy-1,4,16 - pregnatrien - 3 - one, using a base, for example an alkali-metal hydroxide, such as sodium hydroxide, potassium hydroxide, lithium hydroxide, and the like, or an alkaline-earth metal hydroxide, such as calcium hydroxide, barium hydroxide and the like, preferably sodium hydroxide, in the presence of a suitable inert solvent, such as methanol, ethanol, acetone, tetrahydrofuran, dioxane, and the like, preferably methanol.

The conversion of the compounds of Formula 3 to Formula 4 is carried out at a temperature of —25° to +50° C., preferably around 0° C. Completion of the reaction can take from a few minutes to a few hours, depending on the temperature employed and the selected solvent.

The thus obtained compounds of Formula 4 are recovered from the reaction mixture and purified by conventional methods, such as, for example, those described above for the recovery and purification of the compounds of Formula 2.

The thus obtained compounds of Formula 4 are then reacted with substantially anhydrous hydrogen fluoride in the presence of a suitable inert solvent, such as methylene chloride, tetrahydrofuran, chloroform, carbon tetrachloride, ethylene dichloride, or mixtures of these, preferably a mixture of methylene chloride and tetrahydrofuran, to obtain a mixture comprising the 16$\alpha$ and 16$\beta$ epimeric forms of the compounds of Formula 5, such as 16$\beta$-fluoro- and 16$\alpha$-fluoro-11$\beta$,21-dihydroxy-1,4,17(20)-pregnatrien-3-one, and the 20$\alpha$ and 20$\beta$ epimeric forms or the compounds of Formula 5', such as 20$\beta$-fluoro and 20$\alpha$-fluoro-11$\beta$,21-dihydroxy-1,4,16 - pregnatrien - 3 - one. The compounds of Formula 5' possess central nervous system regulating activity.

The conversion of the compounds of Formula 4 to the compounds of Formula 5 and Formula 5' is carried out at a temperature of about —80° to +25° C., preferably around 0° C. Completion of the reaction can take from about a few minutes to 24 hours, depending on the temperature employed and the solvent selected.

The thus obtained compounds of Formula 5 (the 16$\alpha$ and 16$\beta$ epimeric forms) and Formula 5' (the 20$\alpha$ and 20$\beta$ epimeric forms) can be recovered from the reaction mixture by conventional methods, such as, for example, extraction with a water-immiscible solvent, such as methylene chloride, ethyl acetate, benzene, toluene and the like. If desired, the recovered mixed 16$\alpha$-fluoro and 16$\beta$-fluoro epimeric forms can be separated from each other and from the 20$\alpha$-fluoro and 20$\beta$-fluoro compounds and purified by chromatography or countercurrent extraction followed by recrystallization. However, it has been found to be economically expedient to use the mixture comprising the 16$\alpha$ and 16$\beta$ epimeric forms of the compounds of Formula 5 and the 20$\alpha$ and 20$\beta$ epimeric forms of the compounds of Formula 5' in the next step of the process without further separation or purification.

The thus obtained mixture comprising the compounds of Formula 5 (the 16$\alpha$ and 16$\beta$ epimeric forms) and the compounds of Formula 5' (the 20$\alpha$ and 20$\beta$ epimeric forms) is then acylated by allowing the mixture to react with an acylating agent. Suitable acylating agents are organic carboxylic acids, particularly hydrocarbon carboxylic acids, containing from 1 to 12 carbon atoms, inclusive, or the anhydrides or acid halides thereof. For example, a saturated straight-chain aliphatic acid, e.g., formic, acetic, propionic, butyric, valeric, hexanoic, lauric, a saturated branched-chain aliphatic acid, e.g., trimethylacetic, isobutyric, isovaleric, tertiary butylacetic, a cycloaliphatic saturated acid, e.g., $\beta$-cyclopentylpropionic, cyclohexane-carboxylic, cyclohexylacetic, an alkaryl acid, e.g., benzoic, phenylacetic, $\beta$-phenylpropionic, o-, m-, p-toluic, a saturated dibasic acid (which can be converted into water-soluble, e.g., sodium, salts, e.g., succinic, adipic, a mono-basic unsaturated acid, e.g., acrylic, crotonic, undecylenic, propiolic, undecolic, cinnamic, dibasic unsaturated acids (which can be converted into water-soluble, e.g., sodium salts), e.g., maleic and citraconic, or the acid anhydrides and acid halides thereof, can be used to acylate the compounds of Formula 5 to convert them into the compounds of Formula 6, such as 16$\beta$- and 16$\alpha$-fluoro-11$\beta$,21-dihydroxy-1,4,17(20)-pregnatrien-3-one 21-acetate, and the compounds of Formula 6', such as 20$\beta$-fluoro- and 20$\alpha$-fluoro-11$\beta$,21-dihydroxy-1,4,16-pregnatrien-3-one 21-acetate. The compounds of Formula 6', like their parent free 21-alcohols, possess central nervous system regulating activity.

The conversion of the compounds of Formulas 5 and 5' to the compounds of Formulas 6 and 6', respectively, is carried out using the acylating agent as solvent, or in the presence of a suitable inert solvent, such as benzene, xylene, dioxane, methylene chloride or the like, particularly when the acylating agent is a solid, and frequently in the presence of a catalyst, such as p-toluenesulfonic acid, or an amine, preferably pyridine. Completion of the reaction can take from a few minutes to 24 hours, depending on the temperature and the solvent employed. If the acylating agent is the free acid, the reaction is preferably carried out in the presence of an esterification catalyst, for example, p-toluenesulfonyl chloride, trifluoroacetic anhydride, p-toluenesulfonic acid, trifluoroacetic acid, sulfuric acid, and the like.

The thus obtained compounds of Formulas 6 (the 16$\alpha$ and 16$\beta$ epimeric forms) and 6' (the 20$\alpha$ and 20$\beta$ epimeric forms) are recovered from the reaction mixture and purified by conventional methods, such as, for example, those described above for the recovery and purification of the compounds of Formula 2. The 16$\alpha$ and 16$\beta$ epimeric forms of the compounds of Formula 6 are separated from each other by still further chromatography pounds of Formula 6' by further chromatography using conventional methods. If desired, the 16$\alpha$ and 16$\beta$ epimeric forms of the compounds of Formula 6 can be separated from each other by still further chromatography using conventional methods. However, it has been found to be economically expedient to use the mixed 16$\alpha$ and 16β epimeric forms of the compounds of Formula 6 in the next step of the process without further purification or separation.

The thus obtained compounds of Formula 6 (a mixture of the 16α and 16β epimeric forms) are converted to the compounds of Formula 7, such as 16β-fluoro- and 16α-fluoro-11β-17a,21 - trihydroxy-1,4-pregnadiene-3,20-dione 21-acetate by an oxidative hydroxylation reaction which is carried out using a catalytic amount of osmium tetroxide and an oxygen donating oxidizing agent. Included among the oxidizing agents are hydrogen peroxide, peracids, alkyl peroxides, amine oxide peroxides, etc. The preparation of a number of oxidizing agents and the reaction conditions which are preferably employed is discussed more fully in U.S. Patent 2,875,200.

The 16α and 16β epimeric forms of the compounds of Formula 7, such as 16β-fluoro and 16α-fluoro-11β,17α,21-trihydroxy - 1,4 - pregnadiene - 3,20-dione 21-acetate, are recovered from the reaction mixture as a mixture of the epimeric forms by conventional methods, such as, for example, dilution of the reaction mixture with water, extraction with a water-immiscible solvent, such as methylene chloride, ethyl acetate, benzene, toluene, and the like. The 16α and 16β epimeric forms are then separated from each other using conventional chromatographic methods. The separated 16α and 16β epimeric forms are then purified by recrystallization.

The thus obtained compounds of Formula 7 are converted to the 9(11)-dehydro compounds of Formula 8, such as 16β-fluoro and 16α-fluoro-17α,21-dihydroxy-1,4,9 (11)-pregnatriene-3,20-dione 21-acetate, which are converted to the 9α-halo, wherein the halogen is chlorine, bromine, or iodine, compounds of Formula 9, such as 16β-fluoro- and 16α-fluoro-9α-bromo - 11β,17α,21 - trihydroxy-1,4-pregnadiene-3,20-dione 21-acetate, which are converted to the 9,11-epoxy compounds of Formula 10, such as 16β-fluoro and 16α-fluoro-9β,11β-epoxy-17α,21-dihydroxy-1,4-pregnadiene - 3,20-dione 21-acetate, which are in turn converted to the 9α-fluoro compounds of Formula 11, such as 9α,16β-difluoro- and 9α,16α-difluoro-11β,17α,21-trihydroxy-1,4 - pregnadiene - 3,20-dione 21-acetate, which can be converted to the free 21-alcohol compounds of Formula 13, such as 9α,16β-difluoro- and 9α,16α-difluoro-11β,17α,21-trihydroxy-1,4 - pregnadiene-3,20-dione, all according to the procedures disclosed in U.S. Patent 2,838,499.

The compounds of Formula 7 are converted to the compounds of Formula 12, such as 16β-fluoro- and 16α-fluoro-11β,17α,21-trihydroxy-1,4-pregnadiene-3,20 dione, according to the procedure described above for the conversion of the compounds of Formula 11 to the compounds of Formula 13, namely, using the procedure disclosed in U.S. Patent 2,838,499.

If desired, the compounds of Formulas 12 and 13 can be reacylated to obtain the compounds of Formula 19, such as 16β-fluoro- and 16α-fluoro-11β,17α,21-trihydroxy-1,4-pregnadiene-3,20-dione 21-acetate (or other 21-acylates) and 9α,16β-difluoro- and 9α,16α-difluoro-11β,17α, 21-trihydroxy-1,4-pregnadiene-3,20-dione 21-acetate (or other 21-acylates), according to the procedure described above for the conversion of the compounds of Formula 5 to the compounds of Formula 6.

The compounds of Formulas 12 and 13 are converted to the 21-methanesulfonate compounds of Formula 14, such as, 16β-fluoro and 16α-fluoro-11β,17α,21-trihydroxy-1,4-pregnadiene-3,20-dione 21-methanesulfonate and 9α,16β-difluoro- and 9α,16α-difluoro-11β,17α,21-trihydroxy-1,4-pregnadiene-3,20-dione 21-methanesulfonate, according to the procedure disclosed in U.S. Patent 2,838,538.

The thus obtained compounds of Formula 14 are converted to the 21-iodo compounds of Formula 15, such as 16β-fluoro- and 16α-fluoro-21-iodo-11β,17α-dihydroxy-1,4-pregnadiene-3,20-dione and 9α,16β-difluoro- and 9α, 16α-difluoro-21-iodo-11β,17α-dihydroxy - 1,4 - pregnadiene-3,20-dione, according to the procedure disclosed in U.S. Patent 2,838,539.

The compounds of Formula 15 are converted to the 21-fluoro compounds of Formula 16, such as 16β,21-difluoro- and 16α,21-difluoro-11β,17α - dihydroxy-1,4-pregnadiene-3,20-dione and 9α,16β,21-trifluoro- and 9α,16α, 21-trifluoro-11β,17α-dihydroxy-1,4 - pregnadiene - 3,20-dione, according to the procedure disclosed in U.S. Patent 2,838,539.

Alternatively, the 21-fluoro compounds of Formula 16 are prepared from the compounds of Formula 14 according to the procedures disclosed in U.S. Patent 2,838,539.

The compounds of Formula 16 are converted to the 17-acylated compounds of Formula 17, such as 16β,21-difluoro- and 16α,21-difluoro - 11β,17α - dihydroxy-1,4-pregnadiene-3,20-dione 17-acetate (or other 17-acylates) and 9α,16β,21-trifluoro- and 9a,16α,21-trifluoro-11β,17α-dihydroxy-1,4-pregnadiene - 3,20 - dione 17 - acetate (or other 17-acylates) by reaction with the anhydride of an acid, such as those listed above in the conversion of the compounds of Formula 5 to the compounds of Formula 6, in the presence of an esterification catalyst such as p-toluenesulfonic acid. The 17-acylation is carried out at a temperature of from about 0° C. to about 75° C., preferably at about 25° C. Completion of the reaction can take from several minutes to several hours depending on the temperature, the acylating agent and the steroid employed.

The compounds of Formula 15 are also converted to the compounds of Formula 18, such as 16β-fluoro and 16α-fluoro-11β,17α,21-trihydroxy-1,4 - pregnadiene-3,20-dione 21-phosphate and 9α,16β-difluoro- and 9α,16α-difluoro-11β,17α,21-trihydroxy-1,4-pregnadiene-3,20 - dione 21-phosphate, according to the procedure disclosed by Hirschmann et al., Chem. and Ind., 1956, 682. Water soluble salts of the compounds of Formula 18, such as the sodium or potassium salt, can be prepared by treating the compounds of Formula 18 according to procedures well known in the art for the preparation of water soluble salts of hydrocortisone 21-hemisuccinate from hydrocortisone 21-hemisuccinate.

The compounds of Formulas 7, 11, 16, 17, and 18, can be oxidized to their corresponding 11-keto compounds according to the oxidation procedures disclosed in U.S. 2,838,539. If desired, the 11-keto 21-acylated compounds, otherwise corresponding to the compounds of Formulas 7 and 11, can be hydrolyzed, using methods known in the art for the conversion of hydrocortisone 21-acylates to hydrocortisone, to obtain the 11-keto free 21-alcohol compounds corresponding to the compounds of Formulas 12 and 13.

Alternatively, 16-fluoro-11β, 17α, 21-trihydroxy-4-pregnene-3,20-dione and the 21-acylates thereof, 16-fluoro-11β,17α,21 - trihydroxy - 1,4 - pregnadiene - 3,20 - dione and the 21-acylates thereof, the corresponding 16-chloro-16-bromo and 16-iodo compounds thereof and intermediates used in the preparation thereof, are prepared according to the following reaction scheme:

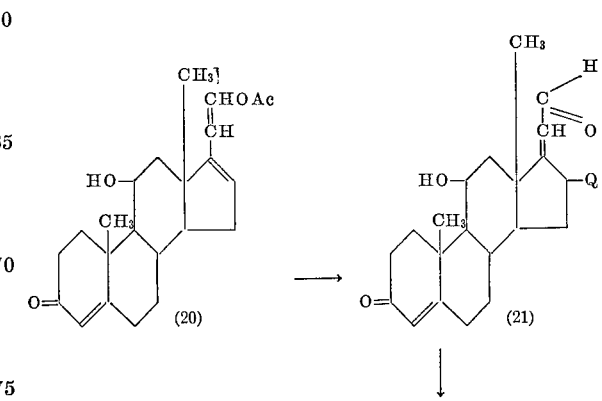

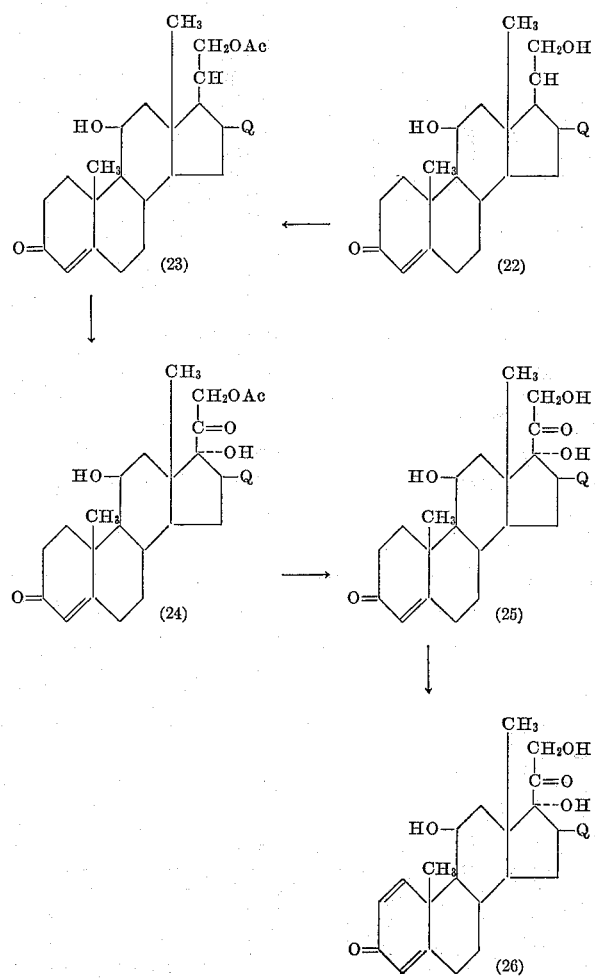

wherein Q is a halogen having an atomic weight of from 19 to 127, and Ac has the same meaning as previously given.

In preparing the novel compounds of the present invention, 11β-hydroxy -21- acyloxy -4,16,20- pregnatrien-3-one (20) is employed as the starting material. Treatment of this compound with hypobromous or hypochlorous acid, bromine or chlorine, N-bromoacetamide or N-chloroacetamide, produces the novel 16-halo-11β-hydroxy-4,17(20)-pregnadien-3-one-21-al (21), wherein the halogen is bromine or chlorine. Reaction of this halo compound with sodium borohydride in methanol at reduced temperatures yields 16-halo-11β,21-dihydroxy-4,17(20)-pregnadien-3-one (22), which is then acetylated with an acylating derivative of an organic carboxylic acid, preferably a hydrocarbon carboxylic acid containing from 1 to 12 carbon atoms, inclusive, to produce 16-halo - 11β - hydroxy - 21 - acyloxy - 4,17(20) - pregnadien-3-one (23) by methods already known for the 21-acylation of 21-hydroxy steroids. Oxidative hydroxylation of this compound with a metal oxide and an oxidizing agent, such as osmium tetroxide with hydrogen peroxide, an amine oxide peroxide or phenyl iodosoacetate in the presence of a small amount of water, produces the 16 - halo - 11β,17α - dihydroxy - 21 - acyloxy - 4 - pregnene-3,20-dione (24), wherein the halogen is bromine or chlorine.

The earlier produced 16-halo-11β-hydroxy-4,17(20)-pregnadien-3-one-21-al (21) can be reacted with cadmium fluoride, potassium fluoride, silver fluoride, mercuric fluoride or lead fluoride to produce the corresponding 16-fluoro compound, with subsequent reduction, 21-esterification and oxidative hydroxylation as described to yield 16 - fluoro - 11β,17α - dihydroxy - 21 - acyloxy - 4-pregnene-3,20-dione (24). Similarly, the 16-halo-11β-hydroxy-4,17(20)-pregnadiene-3-one-21-al (21), wherein the halogen is bromine or chlorine, can be converted by reaction with sodium iodide to the corresponding 16-iodo compound which can likewise be treated as described to produce 16 - iodo - 11β,17α - dihydroxy - 21 - acyloxy-4-pregnene-3,20-dione (24).

Alternatively, the 16-halo compounds, (22), (23), or (24), wherein the halogen is bromine, chlorine or iodine, can be reacted with cadmium fluoride, silver fluoride, mercuric fluoride, potassium fluoride or lead fluoride to produce the corresponding 16-fluoro compound by replacement as an intervening step immediately before or after the 21-acylation and oxidative hydroxylation steps shown above.

The 16 - halo - 11β,17α - dihydroxy - 21 - acyloxy - 4-pregnene-3,20-diones (24) can be readily converted to the 16-halo-hydrocortisones (25) by conventional hydrolysis using, for example, potassium carbonate solution in the absence of air. The 16-halohydrocortisones (25) or their 21-esters can be subjected to a process of fermentative dehydrogenation, as disclosed in U.S. 2,902,410, to yield the 16-halo-1-dehydrohydrocortisones (26) or 21-esters thereof. In the fermentation procedure, the displacement of hydrogen to produce a double bond at the 1-2 position is accomplished by subjecting the 16-halohydrocortisones or their 21-esters to the action of a fungus of the genus Septomyxa, more particularly, Septomyxa affinis. On completion of the fermentation reaction and subsequent purification steps in accordance with established techniques, 16-halo-1-dehydrohydrocortisones or 21-esters thereof are recovered in high purity.

The 16-halo-1-dehydrohydrocortisone 21-esters can be readily oxidized in accordance with standard procedures, for example, with sodium dichromate and acid to yield the corresponding 16-halo-1-dehydrocortisone 21-esters.

As an alternative procedure in preparing the 16-halo-1-dehydrohydrocortisones and 21-esters thereof, dehydrogenation of any 16-halo-Δ⁴-21-oxy intermediate may be accomplished by the methods described rather than deferring this reaction until the last step. For example, the 1-2 double bond can be introduced subsequent to halogenation and reduction of the starting 11β-hydroxy-21-acyloxy-4,16,20-pregnatrien-3-one (20), i.e., by bioconversion of compounds (22), (23), (24), or (25). At whatever point dehydrogenation is instituted, the 1-2 unsaturation remains undisturbed throughout the remaining steps in the process. Thus, subjection of 16-halo-11β-hydroxy-21-acyloxy-4,17(20)-pregnadien-3-one (23) to the fermentative action of Septomyxa affinis yields the Δ¹ analog thereof, which is then reacylated and oxidatively hydroxylated to produce the 21-esters of 16-halo-1-dehydrohydrocortisone in the manner described for the corresponding compounds saturated at the 1-2 position. Hydrolysis then is productive of the 16-halo-1-dehydrohydrocortisone (26) as before. From this modification of the process it is seen that the precise point at which dehydrogenation takes place, and whether such dehydrogenation is accomplished on a 21-hydroxy or a higher 21-acyloxy compound, is of no substantial significance in achieving the products of the present invention. Likewise, although as indicated earlier the 16-bromo and 16-chloro compounds are normally preferred in the intermediate stages of the process, any of the compounds produced as intermediates can be readily treated to yield any of their corresponding 16-halogenated derivatives in accordance with conventional halogen interchange techniques. Additionally, the 11-hydroxy group may be oxidized, for example, with sodium dichromate and acid, to produce the corresponding 11-keto compounds where adequate protection is given the groups occupying the 21-positions which might become involved in the reaction. These 11-keto compounds can also be converted by treatment in accordance with the process as outlined above to the 16-halo-1-dehydrocortisones and 21-esters thereof. Thus, for example, the 16-halohydrocortisone 21-esters (24) can be oxidized with sodium dichromate and acid to give the corresponding 16-halocortisone 21-esters, or the 16-halohydrocortisone (25) first esterified to protect the 21-hydroxyl group against reaction and then oxidized as before to give the corresponding 16-halocortisone 21-ester, followed by hydrolysis according to conventional techniques to produce the 16-halocortisone.

The 16-halo-1-dehydrocortisones and 16-halo-1-dehydrohydrocortisones serve as intermediates for the preparation of the 9α-halo analogs thereof, namely, 9α,16-dihalo-17α,21 - dihydroxy - 1,4 - pregnadiene - 3,11,20 - trione, 9α,16 - dihalo - 11β,17α,21 - trihydroxy - 1,4 - pregnadiene-3,20-dione, and the corresponding 21-esters thereof.

In the preparation of these compounds, for example, 16-fluoro-1-dehydrohydrocortisone 21-acetate of the class of (26) can be reacted with N-bromoacetamide and anhydrous sulfur dioxide until a potassium iodide-starch test of the reaction mixture is negative. Dilution with cold water, e.g., ice water, results in the precipitation of 16-fluoro - 17α - hydroxy - 21 - acetoxy - 1,4,9(11) - pregnatriene-3,20-dione which can be purified by recrystallization from acetone. The crystalline product can then be reacted in methylene chloride-tertiary butyl alcohol solution with perchloric acid and N-bromoacetamide or N-iodo-succinimide to produce a reaction mixture from which 16-fluoro-9α-bromo-11β,17α-dihydroxy-21-acetoxy-1,4-pregnadiene-3,20-dione or the corresponding 16-fluoro-9α-iodo compound, respectively, can be recovered by precipitation with ice water and recrystallization from acetone. The latter compounds can be reacted in acetone solution with anhydrous potassium acetate at reflux temperature to produce 16-fluoro-9β,11β-oxido-17α-hydroxy-21-acetoxy-1,4-pregnadiene-3,20-dione which is recoverable from the reaction mixture by chromatographic methods and can be purified by recrystallization from a Skellysolve B hexane hydrocarbons-acetone mixture. Reaction of the latter in methylene chloride solution with aqueous hydrogen fluoride at room temperature is productive of 9α,16 - difluoro - 11β,17α - dihydroxy - 21 - acetoxy - 1,4-pregnadiene-3,20-dione. Substitution of aqueous hydrogen chloride, and carrying out the reaction at lower temperatures, e.g., minus 5° C., is productive of 9α-chloro-16 - fluoro - 11β,17α - dihydroxy - 21 - acetoxy - 1,4-pregnadiene-3,20-dione.

The 9α,16-difluoro-11β,17α-dihydroxy-21-acetoxy-1,4-pregnadiene-3,20-dione or the 9α-chloro analog thereof can be oxidized with chromic acid in accordance with known methods for converting Kendall's Compound "F" 21-esters to Kendall's Compound "E" 21-esters to produce 9α,16-difluoro-17α-hydroxy 21-acetoxy-1,4-pregnadiene - 3,11,20 - trione and 9α - chloro - 16 - fluoro - 17α-hydroxy - 21 - acetoxy - 1,4 - pregnadiene - 3,11,20 - trione, respectively.

The foregoing dihalo compounds can be hydrolyzed to the corresponding 21-hydroxy compounds according to known methods for hydrolyzing Compound "F" 21-acetate to Compound "F," for example, in aqueous solution with potassium bicarbonate under oxygen-free conditions. The free 21-hydroxy compounds can be reesterified to produce the corresponding 21-acyloxy compounds using an esterifying agent, e.g., the anhydride or acid halide of an organic carboxylic acid containing from 1 to 12 carbon atoms, inclusive, in the same manner as disclosed above for the monohalogenated analogs of hydrocortisone.

The following examples are illustrative of the products and processes of this invention. In the examples which follow, the numeral following the name of a compound is used to indicate the relation of the compound to the reaction schemes depicted and described above.

PREPARATION 1

*6α-fluoro-11β,21-dihydroxy-4,17(20)-pregnadien-3-one 21-acetate*

To 500 mg. of 6-fluoro-11β,21-dihydroxy-4,17(20)-[cis]-pregnadien-3-one 21-acetate, prepared according to the procedure disclosed in Example 6 of U.S. 2,838,532, there is added 100 ml. of chloroform and 2 ml. of ethanol. The solution is cooled to approximately −10° C. and then anhydrous hydrogen chloride gas is bubbled into the solution for several hours while maintaining the temperature of the solution at approximately −10° C. to 0° C. The solution thus-obtained is washed with successive portions of water, saturated sodium bicarbonate solution and water, dried over sodium sulfate and then the solvent is removed under reduced pressure leaving a residue. The residue is purified by chromatography over a Florisil (synthetic magnesium silicate) column, using Skellysolve B hexanes containing increasing amounts of acetone to elute the column, followed by recrystallization from acetone Skellysolve B hexanes to give 6α-fluoro-11β,21-dihydroxy-4,17(20)-pregnadien-3-one 21-acetate, a crystalline solid.

Similarly, substituting other 21-acylates of 6-fluoro-11β,21-dihydroxy-4,17(20)-[cis]-pregnadien-3-one for 6-fluoro - 11β,21 - dihydroxy - 4,17(20) - [cis] - pregnadien-3-one 21-acetate is productive of other 21-acylates such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiary butylacetate, the 21-(β-cyclpentylpropionate), the 21-cyclohexanecarboxylate, the 21-cyclohexylacetate, the 2-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like, of 6α-fluoro-11β,21-dihydroxy-4,17(20)-pregnadien-3-one.

PREPARATION 1'a

*3-ethoxy-11-keto-3,5,17(20)-[cis]-pregnatrien-21-oic acid methyl ester*

A mixture of 10.0 g. of 3,11-diketo-4,17(20)-[cis]-pregnadien-21-oic acid methyl ester, 1.0 g. of p-toluenesulfonic acid monohydrate and 100 ml. of ethyl orthoformate was heated under reflux for one hour and then evaporated to dryness at reduced pressure. The semicrystalline residue was recrystallized from a mixture of methanol and pyridine to give 8.1 g. of 3-ethoxy-11-keto-3,5,17(20)-[cis]-pregnatrien-21-oic acid methyl ester melting at 146–149° C.

PREPARATION 1'b

*3,11-diketo-6-fluoro-4,17(20)-[cis]-pregnadien-21-oic acid methyl ester*

40 g. of 3-ethoxy-11-keto-3,5,17(20)-[cis]-pregnatrien-21-oic acid methyl ester was dissolved in 400 ml. of pyridine and the solution cooled to −15° C. Perchloryl fluoride was bubbled through the solution for 5 minutes. The thus-obtained reaction mixture was poured into 600 ml. of concentrated hydrochloric acid containing 2 l. of ice and extracted with methylene chloride. The methylene chloride extract was washed successively with dilute hydrochloric acid and water and dried over anhydrous sodium sulfate. The thus-obtained solution was then taken up in 1 l. of methylene chloride and poured onto a chromatographic column containing 1500 g. of Florisil (synthetic magnesium silicate). The chromatographic column was developed by eluting with commercial hexanes containing increasing proportions of acetone. Those fractions eluted with 9%, 12% and 15% acetone were combined and the solvent evaporated therefrom to yield 26 g. of a mixture containing 3,11-diketo-6β-fluoroand 3,11-diketo-6α-fluoro-4,17(20)-[cis]-pregnadien - 21-oic acid methyl ester which was used in Preparation 1'c without further purification.

PREPARATION 1'c

*6α-fluoro-11β,21-dihydroxy-4,17(20)-[cis]-pregnadien-3-one 21-acetate*

A solution of 7.4 g. of a mixture of 3,11-diketo-6α-fluoro-4,17(20)1[cis]-pregnadien-21-oic acid methyl ester and 3,11-diketo-6β-fluoro-4,17(20)-[cis]-pregnadien - 21-oic acid methyl ester in 150 ml. of benzene and 3.2 ml. of pyrrolidine containing 140 mg. of p-toluenesulfonic acid was heated under reflux for 1 hour. The solvent was then distilled in vacuo and the thus-obtained residue was dissolved in 100 ml. of ether and added to 3.0 g. of lithium aluminum hydride in 200 ml. of ether. The thus-obtained mixture was heated under reflux, with stirring, for 1 hour and then 25 ml. of ethyl acetate was added followed by the addition of 30 ml. of water. The organic layer was then decanted and evaporated to leave a residue which was dissolved in 300 of methanol and 20 ml. of 5% sodium hydroxide solution. The temperature of the thus-obtained methanolic solution was maintained at 60° C. for 30 minutes. Following adjustment of the solution to pH 7 with acetic acid, the solvent was distilled and the thus-obtained residue was partitioned between methylene chloride and 5% hydrochloric acid. The organic layer was freed from water and evaporated. The thus-obtained residue was dissolved in 10 ml. of acetic anhydride and 10 ml. of pyridine and maintained at ambient temperature for 17 hours. The reaction mixture was then poured into dilute hydrochloric acid and extracted with two 50-ml. portions of methylene chloride. The methylene chloride extracts were combined and evaporation of the solvent gave an oil which upon crystallization from ethyl acetate-commercial hexanes yielded 2.2 g. of 6α-fluoro-11β,21-dihydroxy-4,17(20)-[cis]-pregnadien-3 - one  21 - acetate having a melting point of 182–186° C.

PREPARATION 2a

*6α-fluoro-11β,21-dihydroxy-1,4,17(20)-pregnatrien-3-one*

Five 100-ml. portions of a medium, in 250-ml. Erlenmeyer flasks, containing 1% glucose, 2% corn steep liquor (60% solids) and tap water, are adjusted to a pH of 4.9. This medium is sterilized for 45 minutes at 15 pounds per square inch pressure and inoculated with a 1 to 2 day vegetative growth of *Septomyxa affinis* A.T.C.C. 6737. The Erlenmeyer flasks are shaken at room temperature (about 26 to 28° C.) for a period of 3 days. At the end of this period this 500-ml. volume is used as an inoculum for 10 l. of the same glucose-corn steep liquor medium which in addition contains 5 ml. of an antifoam compound (a mixture of lard oil and octadecanol). The fermentor is placed into the water-bath, adjusted to 28° C. and the contents stirred thoroughly (300 r.p.m.) and aerated (0.1 l. of air per minute to 10 l. of beer). After 20 hours of incubation, when a good growth has been developed, 1 g. of 6α-fluoro-11β,21-dihydroxy-4,17(20)-pregnadien-3-one 21-acetate plus 0.5 g. of 4-ketobisnor-4-cholen-22-al dissolved in 16 ml. of dimethylformamide is added and the incubation carried out at the same temperature (28° C.) and aeration for a period of 72 hours (final pH 8.3). The mycelium is filtered off and extracted with three 200-ml. portions of acetone. The beer is extracted with three 1-liter portions of methylene chloride and thereupon the acetone extracts and the extracts of the beer are combined, dried over anhydrous sodium sulfate and evaporated. The resulting residue is purified by chromatography over a Florisil (synthetic magnesium silicate) chromatgrophic column using Skellysolve B hexanes containing increasing amounts of acetone to elute the column, followed by recrystallization from acetone-Skellysolve B hexanes to give 6α-fluoro-11β,21-dihydroxy-1,4,17(20)-pregnatrien-3-one, a crystalline solid.

Similarly, the substitution of other 21-acylates of 6α-fluoro-11β,21-dihydroxy-4,17(20)-pregnadiene-3,20-dione, for example those listed in Preparation 1, for 6α-fluoro-11β,21-dihydroxy-4,17(20)-pregnadiene - 3,20 - dione 21-acetate is productive of 6α-fluoro - 11β,21 - dihydroxy-1,4,17(20)-pregnatrien-3-one.

Substituting species of other genera such as Corynebacterium, Didymella, Calonectria, Alternaria, Colletotrichum, Cylindrocarpon, Ophiobolus, Fusarium, Listeria, Erysipelothrix, Mycobacterium, Tricohtecium, Leptosphaeria, Cucurbitaria, Nocardia, and enzymes of fungi of the family Tuberculariaceae for Septomyxa is productive of 6α-fluoro-11β,21-dihydroxy -1, 4,17(20) - pregnatrien-3-one.

PREPARATION 2b

*6α-fluoro-11β,21-dihydroxy-1,4,17(20)-pregnatrien-3-one 21-acetate*

A solution is prepared containing 50 mg. of 6α-fluoro-11β,21-dihydroxy-1,4,17(20)-pregnatrien-3-one in 1 ml. of pyridine and 1 ml. of acetic anhydride. The solution is allowed to stand at room temperature for a period of about 21 hours and is thereupon poured into ice water to give crystals of 6α-fluoro-11β,21 - dihydroxy - 1,4,17(20)-pregnatrien-3-one 21-acetate, which is purified by recrystallization from acetone-Skellysolve B hexanes.

Other 21-acylates are prepared by allowing 6α-fluoro-11β,21-dihydroxy-1,4,17(20)-pregnatrien - 3 - one to react with the selected organic carboxylic acid, preferably a hydrocarbon carboxylic acid containing from 1 to 12 carbon atoms, inclusive, or the anhydride or acyl halide thereof, such as, for example, those listed above. Illustrative of the compounds thus produced are the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like of 6α-fluoro-11β,21-dihydroxy - 1,4,17(20) - pregnatrien-3-one.

If the corresponding acylating agent is solid an inert solvent such as toluene, xylene, or dioxane can be added to effect solution and to provide a liquid esterification medium.

If the esterifying agent is the free acid, the reaction is carried out in the presence of an esterification catalyst.

PREPARATION 3

*2α-methyl-6α-fluoro-11β,21-dihydroxy-4,17(20)-pregnadien-3-one 21-acetate*

A solution of 1.5 gm. of 2α-methyl-5α,11β,21-trihydroxy - 6β - fluoro - 17(20) - allopregnen - 3-one 3-ethylene ketal 21-acetate and 1.5 ml. of absolute alcohol in 150 ml. of chloroform is maintained at about −5 to −10° C. for about 2.5 hours while hydrogen chloride gas is bubbled through the solution. The reaction mixture is then poured into 300 ml. of ice and saturated aqueous sodium bicarbonate. The organic layer is separated, washed with aqueous sodium bicarbonate, then with water, and is dried over anhydrous sodium sulfate. The thus-obtained solution is then chromatographed over a Florisil column, using Skelly-solve B hexanes containing increasing amounts of acetone to elute the column, followed by recrystallization from aqueous methanol to give 2α - methyl - 6α - fluoro - 11β,21 - dihydroxy - 4,17(20)-pregnadien-3-one 21-acetate, a crystalline solid.

Similarly, substituting other 21-acylates of 2α-methyl-5α,11β,21 - trihydroxy - 6β - fluoro - 17(20) - allopregnen-3-one 3-ethylene ketal for 2α-methyl-5α,11β,21-trihydroxy - 6β - fluoro - 17(20) - allopregnen - 3 - one 3-ethylene ketal 21-acetate is productive of other 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like, of 2α-methyl-6α - fluoro - 11β,21 - dihydroxy - 4,17(20) - pregnadien-3-one.

PREPARATION 4a

*2-methyl-6α-fluoro-11β,21-dihydroxy-1,4,17(20)-pregnatrien-3-one*

Substituting a stoichiometric equivalent amount of 2α-methyl - 6α - fluoro - 11β,21 - dihydroxy - 4,17(20)-pregnadien-3-one 21-acetate and following the procedure of Preparation 2a is productive of 2-methyl-6α-fluoro-11β,21 - dihydroxy - 1,4,17(20) - pregnatrien - 3 - one, a crystalline solid.

Similarly, the substitution of other 21-acylates of 2α-methyl - 6α - fluoro - 11β,21 - dihydroxy - 4,17(20)-pregnadien-3-one 21-acetate in Preparation 2a is productive of 2 - methyl - 6α - fluoro - 11β,21 - dihydroxy-1,4,17(20)-pregnatrien-3-one.

PREPARATION 4b

*2-methyl-6α-fluoro-11β,21-dihydroxy-1,4,17(20)-pregnatrien-3-one 21-acetate*

Substituting 2 - methyl - 6α - fluoro - 11β,21 - dihydroxy - 1,4,17(20) - pregnatrien - 3 - one for 6α - fluoro-11β,21 - dihydroxy - 1,4,17(20) - pregnatrien - 3 - one and following the procedure of Preparation 2b is productive of 2 - methyl - 6α - fluoro - 11β,21 - dihydroxy-1,4,17(20)-pregnatrien-3-one 21-acetate.

Similarly, substituting other acylating agents is productive of other 21-acylates, for example those 21-acylates listed in Preparation 2b, of 2-methyl-6α-fluoro-11β,21-dihydroxy-1,4,17(20)-pregnatrien-3-one.

PREPARATION 5a

*2-ethoxyoxalyl-6α-methyl-11β21-dihydroxy-4,17(20)-pregnadien-3-one sodium enolate*

The starting material, 6α - methyl - 11β,21 - dihydroxy-4,17(20) - pregnadiene - 3 - one 21 - acetate, is prepared as disclosed in J.A.C.S. 78, 6213. In an atmosphere of nitrogen, 0.76 g. of ethyl oxalate followed by 0.205 g. of sodium methoxide (25% solution in methanol) was added to a solution of 1.0 g. of 6α-methyl-11β,21-dihydroxy-4,17(20)-pregnadien-3-one 21-acetate dissolved in 16 ml. of t-butanol. The temperature of addition was 65° C., and the reaction mixture was allowed to stir for a period of 10 to 15 minutes during which period the temperature dropped to 25° C. 16 ml. of ether was added, and stirring was continued for an additional period of 30 minutes. The product 2 - ethoxyoxalyl - 6α - methyl - 11β,21-dihydroxy-4,17(20)-pregnadien-3-one sodium enolate, was filtered and washed with ether. It was recovered as a yellow, crystalline solid, yield 1.3 g.

PREPARATION 5b

*2-ethoxyoxalyl-2,6α-dimethyl-11β,21-dihydroxy-4,17(20)-pregnadien-3-one*

A reaction mixture was prepared consisting of 1.3 g. of 2 - ethoxyoxalyl - 6α - methyl - 11β,21 - dihydroxy-4,17(20)-pregnadien-3-one sodium enolate, 1.5 g. of potassium carbonate, 4.5 ml. of methyl iodide and 30 ml. of acetone. The mixture was allowed to stir for 66 hours and was then diluted with 100 ml. of water and extracted with methylene chloride. The extract was washed with salt water, dried and evaporated to a solid residue. The residual product, 2 - ethoxyoxalyl - 2,6α - dimethyl - 11β, 21 - dihydroxy - 4,17(20) - pregnadien - 3 - one, was a light-colored, crystalline material.

In place of methyl iodide in the above procedure, other alkyl halides can be used, e.g., methyl bromide, ethyl bromide, butyl bromide, hexyl bromide, octyl bromide, phenyl bromide, etc., to produce the corresponding 2-alkylated or 2-phenylated product, e.g., 2-ethoxyoxalyl-2 - ethyl - 6α - methyl - 11β,21 - dihydroxy - 4,17(20)-pregnadien-3-one, and the like.

PREPARATION 5c

*2α,6α-dimethyl-11β,21-dihydroxy-4,17(20)-pregnadien-3-one*

A reaction mixture was composed of the total product of Preparation 5b above dissolved in 20 ml. of methanol and the resulting solution added to a solution of 0.8 ml. of 25% sodium methoxide dissolved in methanol. The reaction mixture was stirred under an atmosphere of nitrogen for a period of 2 hours and was then diluted with 100 ml. of water and extracted with methylene chloride. The extract was washed with salt water, dried and evaporated to an oily residue, 2α,6α-dimethyl-11β,21-dihydroxy-4,17(20)-pregnadien-3-one.

PREPARATION 5d

*2α,6α-dimethyl-11β,21-dihydroxy-4,17(20)-pregnadien-pregnadien-3-one*

A reaction mixture was composed of the entire product of Preparation 5c above dissolved in 5 ml. of pyridine to which was added 10 ml. of acetic anhydride. The reaction mixture was permitted to stand for a period of 17 hours and was then poured into ice water. The resulting oil was extracted with methylene chloride, and the extract washed successively with dilute hydrochloric acid, dilute sodium bicarbonate, and water. The solution was then dried and chromatographed on synthetic magnesium silicate. The column was eluted with 5% acetone-95% commercial hexane. Evaporation of the solvent yielded a crystalline residue which was recrystallized from dilute methanol to give pure 2α,6α-dimethyl-11β-hydroxy-21-acetoxy-4,17(20)-pregnadien-3-one, melting point 106 to 108° C.; $[\alpha]_D^{25}$+96 degrees (in chloroform);

$$\lambda_{max.}^{alcohol} \; 241 \; m\mu; \; a_M=14,525$$

*Analysis.*—Calculated for $C_{25}H_{36}O_4$: C, 74.96; H, 9.06. Found: C, 74.72; H, 9.10.

Similarly, substituting other acylating agents is productive of other 21-acylates, for example those 21-acylates listed in Preparation 2b, of 2,6α-dimethyl-11β,21-dihydroxy-4,17(20)-pregnadien-3-one.

PREPARATION 5e

*2,6α-dimethyl-11β,21-dihydroxy-1,4,17(20)-pregnatrien-3-one*

Substituting a stoichiometric equivalent amount of 2α, 6α - dimethyl - 11β,21 - dihydroxy - 4,17(20) - pregnadien-3-one, obtained according to Preparation 5c, for 6α - fluoro - 11β,21 - dihydroxy - 4,17(20) - pregnadien-3-one 21-acetate and following the procedure of Preparation 2a is productive of 2,6α-dimethyl-11β,21-dihydroxy-1,4,17(20)-pregnatrien-3-one, a crystalline solid.

PREPARATION 5f

*2,6α-dimethyl-11β,21-dihydroxy-1,4,17(20)-pregnatrien-3-one 21-acetate*

Substituting 2,6α - dimethyl - 11β,21 - dihydroxy - 1,4, 17(20) - pregnatrien - 3 - one for 6α - fluoro - 11β,21-dihydroxy-1,4,17(20)-pregnatrien-3-one and following the procedure of Preparation 2b is productive of 2,6α- dimethyl - 11β,21 - dihydroxy - 1,4,17(20) - pregnatrien-3-one 21-acetate, a crystalline solid.

Similarly, substituting other acylating agents is productive of other 21-acylates, for example, those 21-acylates listed in Preparation 2b, of 2,6α-dimethyl-11β,21-dihydroxy-1,4,17(20)-pregnatrien-3-one.

EXAMPLE 1

*11β,16α,21-trihydroxy-1,4,17(20)-pregnatrien-3-one 21-acetate (2)*

A mixture of 9.8 g. (0.0264 mol.) of 11β,21-dihydroxy-1,4,17(20)-pregnatrien-3-one 21-acetate (1), prepared according to the procedure disclosed in Example 10 of U.S. Patent 2,902,410, 2.76 g. (0.0248 mol.) of selenium dioxide, 33 ml. of water and 150 ml. of dioxane was heated at reflux for approximately 1 hour with stirring. The thus-obtained reaction mixture comprising 11β,16α,21 - trihydroxy - 1,4,17(20-pregnatrien-3-one 21-acetate was then cooled in an ice bath to about 25° C. 5.0 g. of a filter aid (synthetic magnesium silicate) was added to the cooled reaction mixture, stirred for about 15 minutes and filtered under vacuum through a synthetic magnesium silicate mat. The filtrate was added to 900 ml. of methylene chloride, followed by washing with four 200 ml. portions of water. The organic phase was then filtered and evaporated to a volume of about 100 ml. and poured onto an 800 g. Florisil (synthetic magnesium silicate) chromatographic column packed in Skellysolve B hexanes. The chromatographic column was developed by eluting with Skellysolve B hexanes containing increasing amounts of acetone. The eluate fractions were freed of solvent and those fractions eluted with Skellysolve B hexanes containing 20 to 25% acetone were combined and recrystallized from acetone-Skellysolve B hexanes to give 6.74 g. of product melting at 178–181° C. Four additional recrystallizations from acetone-Skellysolve B hexanes gave 11β,16α,21-trihydroxy - 1,4,17(20)-pregnatrien-3-one 21-acetate (2) having a melting point of 179–181° C., $[\alpha]_D + 83°$ (CHCl₃), $$\lambda_{max.}^{EtOH}\ 243\ m\mu$$

$a_M$ 15,600, and the following analysis:

*Analysis.*—Calcd. for $C_{23}H_{30}O_5$: C, 71.48; H, 7.82. Found: C, 71.68; H, 8.07.

Similarly, substituting other 11β,21 - dihydroxy-1,4,17(20)-pregnatrien - 3-one 21-acylates for 11β,21-dihydroxy-1,4,17(20)-pregnatrien-3-one 21-acetate is productive of the corresponding 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propionate, the 21-(2-butynoate), the 21-undecolate, the 21-cinnamate, the 21-maleate, the 21-citraconate, and the like, of 11β,16α,21-trihydroxy-1,4,17(20)-pregnatrien-3-one.

In like manner substituting a stoichiometric equivalent amount of

11β,21-dihydroxy - 4,17(20)-pregnadien-3-one 21-acetate (or other acylates),

6α-fluoro-11β,21-dihydroxy - 4,17(20)-pregnadien - 3-one 21-acetate (or other acylates), prepared according to Preparation 1 above, 6α-fluoro - 11β,21-dihydroxy - 1,4,17(20)-pregnatrien-3-one 21-acetate (or other acylates), prepared according to Preparation 2a and 2b above, 6α-methyl-11β,21-dihydroxy - 4,17(20)-pregnadien-3-one 21-acetate (or other acylates), and 6α-methyl - 11β,21-dihydroxy - 1,4,17(20)pregnatrien-3-one 21-acetate (or other 21-acylates), prepared according to the procedure disclosed by Spero et al., JACS, 78, 6213 (1956), 2α-methyl - 11β,21-dihydroxy - 1,4,17(20)-pregnadien-3-one 21-acetate (or other 21-acylates), prepared according to the procedure disclosed in Example 5 of U.S. Patent 2,852,538, 2-methyl - 11β,21-dihydroxy - 1,4,17(20)-pregnatrien-3-one 21-acetate (or other 21-acylates), prepared according to the procedure disclosed in British Patent 794,485 or in copending Application Serial No. 634,616, 2α-methyl - 6α-fluoro-11β,21-dihydroxy - 4,17(20)-pregnadien-3-one 21-acetate (or other 21-acylates), prepared according to Preparation 3 above, 2-methyl - 6α-fluoro-11β,21-dihydroxy - 1,4,17(20)-pregnatrien-3-one 21-acetate (or other 21-acylates), prepared according to Preparation 4a and 4b above, 2α,6α-dimethyl - 11β,21-dihydroxy-4,17(20)-pregnadien-3-one 21-acetate (or other 21-acylates), prepared according to Preparation 5a through 5d above, 2,6α-dimethyl-11β,21-dihydroxy - 1,4,17(20)-pregnatrien-3-one 21-acetate (or other 21-acylates), prepared according to Preparation 5e and 5f above, for 11β,21-dihydroxy - 1,4,17(20)-pregnatrien-3-one 21-acetate is productive of the 21-acetate (or other 21-acylates) of 11β,16α,21-trihydroxy-4,17(20)-pregnadien-3-one, 6α-fluoro - 11β,16α,21-trihydroxy - 4,17(20)-pregnadien-3-one, 6α-fluoro - 11β,16α,21 - trihydroxy - 1,4,17(20)-pregnatrien-3-one, 6α-methyl - 11β,16α,21-trihydroxy - 4,17(20)-pregnadien-3-one, 6α-methyl - 11β,16α,21-trihydroxy - 1,4,17(20)-pregnatrien-3-one, 2α-methyl - 11β,16α,21 - trihydroxy - 4,17(20)-pregnadien-3-one, 2-methyl - 11β,16α,21 - trihydroxy - 1,4,17(20)-pregnatrien-3-one, 2α-methyl - 6α-fluoro-11β,16α,21-trihydroxy - 4,17(20)-pregnadien-3-one, 2-methyl - 6α-fluoro - 11β,16α,21-trihydroxy-1,4,17(20)-pregnatrien-3-one, 2α,6α-dimethyl - 11β,16α,21-trihydroxy - 4,17(20)-pregnadien-3-one, and 2,6α-dimethyl - 11β,16α,21-trihydroxy - 1,4,17(20)-pregnatrien-3-one, respectively.

The term "other 21-acylates" as used in the preceding paragraph is inclusive of 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21- (o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like.

EXAMPLE 2A

*20α-chloro-11β,21-dihydroxy-1,4,16-pregnatrien-3-one 21-acetate (3)*

To a stirred solution of 965 mg. (0.0025 mol.) of 11β,16α,21-trihydroxy-1,4,17(20) - pregnatrien-3-one 21 - acetate (2), 100 ml. of methylene chloride and 556 mg. (0.003 mol.) of tri-n-butylamine at approximately 0° C. there was added dropwise over a 5 minute period, with continuous stirring, 393 mg. (0.24 mol.) of thionyl chloride dissolved in 25 ml. of methylene chloride whilst maintaining the temperature at 0° C. The thus-obtained reaction mixture comprising the 20α and 20β epimeric forms of 20-chloro-11β,21-dihydroxy-1,4,16-pregnatrien - 3 - one 21-acetate was stirred for 1 hour at 0° C. followed by washing with three 20 ml. portions of dilute hydrochloric acid and four 50 ml. portions of water. The washed reaction mixture was then filtered and the filtrate obtained was evaporated to a volume of about 25 ml. and poured onto an 80 g. Florisil chromatographic column packed wet in Skellysolve B hexanes. The chromatographic column was developed by eluting with Skellysolve B hexanes containing increasing amounts of acetone. The eluate fractions were freed of solvent and those fractions eluted with Skellysolve B hexanes containing 9 to 12% acetone were combined. Two recrystallizations from acetone-Skellysolve B hexanes gave 700 mg. of 20α-chloro-11β,21-dihydroxy-1,4,16-pregnatrien-3-one 21-acetate (3) having a melting point of 160–161° C., $$\lambda_{max.}^{EtOH} \ 242 \ m\mu$$

$a_M$ 15,500 and the following analysis:

*Analysis.*—Calcd. for $C_{23}H_{29}ClO_4$: C, 68.22; H, 7.22; Cl, 8.76. Found: C, 68.17; H, 7.32; Cl, 8.88.

20β-chloro-11β,21-dihydroxy-1,4,16-pregnatrien - 3- one 21-acetate is present in the mother liquors and can be recovered by further chromatography or countercurrent extraction, followed by crystallization.

Similarly, substituting a stoichiometric equivalent amount of other 21-acylates, such as those described in Example 1, of 11β,16α,21-trihydroxy-1,4,17(20)-pregnatrien-3-one for 11β,16α,21-trihydroxy-1,4,17(20)-pregnatrien-3-one 21-acetate is productive of the corresponding 21-acylates. Illustrative of the 21-acylates thus produced are for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like, of 20α-chloro-11β,21-dihydroxy-1,4,16-pregnatrien-3-one.

In like manner, substituting a stoichiometric equivalent amount of the 21-acetate (or other 21-acylates) of 11β,16α,21-trihydroxy-4,17(20)-pregnadien-3-one,
6α-fluoro-11β,16α,21-trihydroxy-4,17(20)-pregnatrien-3-one,
6α-fluoro-11β,16α,21-trihydroxy-1,4,17(20)-pregnatrien-3-one,
6α-fluoro-11β,16α,21-trihydroxy-1,4,17(20)-pregnadien-3-one,
6α-methyl-11β,16α,21-trihydroxy-1,4,17(20)-pregnatrien-3-one,
2α-methyl-11β,16α,21-trihydroxy-4,17(20)-pregnadien-3-one,
2-methyl-11β,16α,21-trihydroxy-1,4,17(20)-pregnatrien-3-one,
2α-methyl-6α-fluoro-11β,16α,21-trihydroxy-4,17(20)-pregnadien-3-one,
2-methyl-6α-fluoro-11β,16α,21-trihydroxy-1,4,17(20)-pregnatrien-3-one,
2α,6α-dimethyl-11β,16α,21-trihydroxy-4,17(20)-pregnadien-3-one,
and 2,6α-dimethyl-11β,16α,21-trihydroxy-1,4,17(20)-pregnatrien-3-one,
for 11β,16α,21-trihydroxy-1,4,17(20)-pregnatrien-3-one 21-acetate is productive of the 21-acetate (or other 21-acylate) of 20α-chloro-11β,21-dihydroxy-4,16-pregnadien-3-one,
6α-fluoro-20α-chloro-11β,21-dihydroxy-4,16-pregnadien-3-one,
6α-fluoro-20α-chloro-11β,21-dihydroxy-1,4,16-pregnatrien-3-one,
6α-methyl-20α-chloro-11β,21-dihydroxy-4,16-pregnadien-3-one,
6α-methyl-20α-chloro-11β,21-dihydroxy-1,4,16-pregnatrien-3-one,
2α-methyl-20α-chloro-11β,21-dihydroxy-4,16-pregnadien-3-one,
2-methyl-20α-chloro-11β,21-dihydroxy-1,4,16-pregnatrien-3-one,
2α-methyl-6α-fluoro-20α-chloro-11β,21-dihydroxy-4,16-pregnadien-3-one,
2-methyl-6α-fluoro-20α-chloro-11β,21-dihydroxy-1,4,16-pregnatrien-3-one,
2α,6α-dimethyl-20α-chloro-11β,21-dihydroxy-4,16-pregnadien-3-one,
and 2,6α-dimethyl-20α-chloro-11β,21-dihydroxy-1,4,16-pregnatrien-3-one, respectively.

The term "other 21-acylates" as used in the preceding paragraph is inclusive of 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like.

The mixture of the 20α and 20β epimeric forms of the 20-chloro compounds described in this example can be used in Example 3 without further treatment.

EXAMPLE 2B

*20α-bromo-11β,21-dihydroxy-1,4,16-pregnatrien-3-one 21-acetate (3)*

To a stirred solution of 965 mg. (0.0025 mol.) of 11β,16α,21-trihydroxy-1,4,17(20)-pregnatrien-3 - one 21 - acetate (2), 100 ml. of methylene chloride and 556 mg. (0.003 mol.) of tri-n-butylamine as approximately 0° C. there was added dropwise over a 5 minute period, with continuous stirring, 500 mg. (0.24 mol.) of thionyl bromide dissolved in 25 ml. of methylene chloride whilst maintaining the temperature at 0° C. The thus-obtained reaction mixture comprising the 20α and 20β epimeric forms of 20-bromo-11β,21-dihydroxy-1,4,16-pregnatrien-3-one 21-acetate was stirred for 1 hour at 0° C. followed by washing with three 20 ml. portions of dilute hydrochloric acid and four 50 ml. portions of water. The washed reaction mixture was then filtered and the filtrate obtained was evaporated to a volume of about 25 ml. and poured onto an 80 g. Florisil chromatographic column packed in Skellysolve B hexanes. The chromatographic column was developed by eluting with acetone-Skellysolve B hexanes containing increasing amounts of acetone. The eluate fractions were freed of solvent and those fractions eluted with Skellysolve B hexanes containing 9 to 12% acetone were combined and recrystallized from acetone-Skellysolve B hexanes to give 20α-bromo-11β,21-dihydroxy-1,4,16-pregnatrien-3-one 21-acetate (3), an analytical sample of which had a melting point of 138.5–139.5° C., $$\lambda_{max.}^{EtOH} \ 242 \ m\mu$$

$a_M$ 17,300 and the following analysis:

*Analysis.*—Calcd. for $C_{23}H_{29}BrO_4$: C, 61.47; H, 6.50; Br, 17.78. Found: C, 61.88; H, 6.82; Br, 17.78.

20β-bromo-11β,21-dihydroxy-1,4,16 - pregnatrien-3-one 21-acetate is present in the mother liquors and can be recovered by further chromatography or countercurrent extraction, followed by crystallization.

Similarly, substituting a stoichiometric equivalent amount of other 21-acylates, such as those described in Example 1, of 11β,16α,21-trihydroxy-1,4,17(20)-pregnatrien - 3 - one for 11β,16α,21-trihydroxy-1,4,17(20)- pregnatrien-3-one 21-acetate is productive of the corresponding 21-acylates. Illustrative of the 21-acylates thus produced are for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-($\beta$-cyclopentylpropionate), the 21-cyclohexanecarboxylate, the 21-cyclohexylacetate, the 21-benzoate, the 21-phenylacetate, the 21-($\beta$-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like, of 20$\alpha$-bromo-11$\beta$,21-dihydroxy-1,4,16-pregnatrien-3-one.

In like manner, substituting a stoichiometric equivalent amount of the 21-acetate (or other 21-acylates) of 11$\beta$,16$\alpha$,21-trihydroxy-4,17(20)-pregnadien-3-one, 6$\alpha$-fluoro-11$\beta$,16$\alpha$,21-trihydroxy-4,17(20)-pregnadien-3-one,
6$\alpha$-fluoro-11$\beta$,16$\alpha$,21-trihydroxy-1,4,17(20)-pregnatrien-3-one,
6$\alpha$-methyl-11$\beta$,16$\alpha$,21-trihydroxy-4,17(20)-pregnadien-3-one,
6$\alpha$-methyl-11$\beta$,16$\alpha$,21-trihydroxy-1,4,17(20)-pregnatrien-3-one,
2$\alpha$-methyl-11$\beta$,16$\alpha$,21-trihydroxy-4,17(20)-pregnadien-3-one,
2-methyl-11$\beta$,16$\alpha$,21-trihydroxy-1,4,17(20)-pregnatrien-3-one,
2$\alpha$-methyl-6$\alpha$-fluoro-11$\beta$,16$\alpha$,21-trihydroxy-4,17(20)-pregnadien-3-one,
2-methyl-6$\alpha$-fluoro-11$\beta$,16$\alpha$,21-trihydroxy-1,4,17(20)-pregnatrien-3-one,
2$\alpha$,6$\alpha$-dimethyl-11$\beta$,16$\alpha$,21-trihydroxy-4,17(20)-pregnadien-3-one,
and 2,6$\alpha$-dimethyl-11$\beta$,16$\alpha$,21-trihydroxy-1,4,17(20)-pregnatrien-3-one, for 11$\beta$,16$\alpha$,21-trihydroxy-1,4,17(20)-pregnatrien-3-one 21-acetate is productive of the 21-acetate (or other 21-acylates) of 20$\alpha$-bromo-11$\beta$,21-dihydroxy-4,16-pregnadien-3-one,
6$\alpha$-fluoro-20$\alpha$-bromo-11$\beta$,21-dihydroxy-4,16-pregnadien-3-one,
6$\alpha$-fluoro-20$\alpha$-bromo-11$\beta$,21-dihydroxy-1,4,16-pregnatrien-3-one,
6$\alpha$-methyl-20$\alpha$-bromo-11$\beta$,21-dihydroxy-4,16-pregnadien-3-one,
6$\alpha$-methyl-20$\alpha$-bromo-11$\beta$,21-dihydroxy-1,4,16-pregnatrien-3-one,
2$\alpha$-methyl-20$\alpha$-bromo-11$\beta$,21-dihydroxy-4,16-pregnadien-3-one,
2-methyl-20$\alpha$-bromo-11$\beta$,21-dihydroxy-1,4,16-pregnatrien-3-one,
2$\alpha$-methyl-6$\alpha$-fluoro-20$\alpha$-bromo-11$\beta$,21-dihydroxy-4,16-pregnadiene-3-one,
2-methyl-6$\alpha$-fluoro-20$\alpha$-bromo-11$\beta$,21-dihydroxy-1,4,16-pregnatrien-3-one,
2$\alpha$,6$\alpha$-dimethyl-20$\alpha$-bromo-11$\beta$,21-dihydroxy-4,16-pregnadien-3-one,
and 2,6$\alpha$-dimethyl-20$\alpha$-bromo-11$\beta$,21-dihydroxy-1,4,16-pregnatrien-3-one, respectively.

The term "other 21-acylates" as used in the preceding paragraph is inclusive of 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarylbutylacetate, the 21 - ($\beta$ - cyclopentylpropionate), the 21-cyclohexanecarboxylate, the 21-cyclohexylacetate, the 21-benzoate, the 21-phenylacetate, the 21-($\beta$-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like.

The mixture of the 20$\alpha$ and 20$\beta$ epimeric forms of the 20-bromo compounds described in this example can be used in Example 3 without further treatment.

EXAMPLE 3

*11$\beta$-hydroxy-20$\beta$,21-epoxy-1,4,16-pregnatrien-3-one (4)*

To a solution of 2.03 g. (0.005 mol.) of 20$\alpha$-chloro-11$\beta$,21-dihydroxy-1,4,16-pregnatrien-3-one 21-acetate (3) and 100 ml. of methanol cooled in an ice bath there was added, with vigorous swirling over about a 2 minute period, 100 ml. of 0.1 N sodium hydroxide solution. After standing in the ice bath for an additional 5 minutes, the reaction mixture was filtered and the white crystalline precipitate thus obtained was collected and dried to yield 1.57 g. of a product comprising 11$\beta$-hydroxy-20$\beta$,21-epoxy-1,4,16-pregnatrien-3-one having a melting point of 193–203° C. The thus-obtained white crystalline product was then dissolved in about 25 ml. of ethylene dichloride and poured onto a 120 g. Florisil chromatographic column packed in Skellysolve B hexanes. The chromatographic column was developed by eluting with Skellysolve B hexanes containing increasing amounts of acetone. The eluate fractions were freed of solvent and those fractions eluted with Skellysolve B hexanes-acetone (9:1) were recrystallized 3 times from acetone to give 11$\beta$-hydroxy-20$\beta$,21-epoxy-1,4,16-pregnatrien-3-one melting at 205–215° C. Three additional recrystallizations from methanol did not raise the melting point of the 11$\beta$-hydroxy-20$\beta$,21-epoxy-1,4,16-pregnatrien-3-one (4) which, following the methanol recrystallizations had a $$\lambda_{max.}^{EtOH}\ 242.5\ m\mu$$

$a_M$ 14,950, and the following analysis:

*Analysis.*—Calcd. for $C_{21}H_{26}O_3$: C, 77.27; H, 8.03. Found: C, 76.99; H, 8.05.

Similarly, substituting a stoichiometric equivalent amount of other 21-acylates, such as those described in Examples 2A and 2B, of 20$\alpha$-chloro- and 20$\alpha$-bromo-11,21-dihydroxy-1,4,16-pregnatrien-3-one for 20$\alpha$-chloro-11$\beta$,21-dihydroxy-1,4,16-pregnatrien-3-one 21-acetate is productive of 11$\beta$ - hydroxy - 20$\beta$,21-epoxy-1,4,16-pregnatrien-3-one.

In like manner, substituting a stoichiometric equivalent amount of the 21-acetate (or other 21-acylates) of 20$\alpha$-bromo- or 20$\alpha$-chloro-11$\beta$,21-dihydroxy-4,16-pregnadien-3-one,
6$\alpha$-fluoro-20$\alpha$-bromo- or 6$\alpha$-fluoro-20$\alpha$-chloro-11$\beta$,21-dihydroxy-4,16-pregnadien-3-one,
6$\alpha$-fluoro-20$\alpha$-bromo- or 6$\alpha$-fluoro-20$\alpha$-chloro-11$\beta$,21-dihydroxy-1,4,16-pregnatrien-3-one,
6$\alpha$-methyl-20$\alpha$-bromo- or 6$\alpha$-methyl-20$\alpha$-chloro-11$\beta$,21-dihydroxy-4,16-pregnadien-3-one,
6$\alpha$-methyl-20$\alpha$-bromo- or 6$\alpha$-methyl-20$\alpha$-chloro-11$\beta$,21-dihydroxy-1,4,16-pregnatrien-3-one,
2$\alpha$-methyl-20$\alpha$-bromo- or 2$\alpha$-methyl-20$\alpha$-chloro-11$\beta$,21-dihydroxy-4,16-pregnadien-3-one,
2-methyl-20$\alpha$-bromo- or 2-methyl-20$\alpha$-chloro-11$\beta$,21-dihydroxy-1,4,16-pregnatrien-3-one,
2$\alpha$-methyl-6$\alpha$-fluoro-20$\alpha$-bromo- or 2$\alpha$-methyl-6$\alpha$-fluoro-20$\alpha$-chloro-11$\beta$,21-dihydroxy-4,16-pregnadien-3-one,
2-methyl-6$\alpha$-fluoro-20$\alpha$-bromo- or 2-methyl-6$\alpha$-fluoro-20$\alpha$-chloro-11$\beta$,21-dihydroxy-1,4,16-pregnatrien-3-one,
2$\alpha$,6$\alpha$-dimethyl-20$\alpha$-bromo- or 2$\alpha$,6$\alpha$-dimethyl-20$\alpha$-chloro-11$\beta$,21-dihydroxy-4,16-pregnadien-3-one, and
2,6$\alpha$-dimethyl 20$\alpha$-bromo- or 2,6$\alpha$-dimethyl-20$\alpha$-chloro-11$\beta$,21-dihydroxy-4,16-pregnatrien-3-one, for
20$\alpha$-chloro-11$\beta$,21-dihydroxy-1,4,16-pregnatrien-3-one 21-acetate is productive of
11$\beta$-hydroxy-20$\beta$,21-epoxy-4,16-pregnadien-3-one,
6$\alpha$-fluoro-11$\beta$-hydroxy-20$\beta$,21-epoxy-4,16-pregnadien-3-one, 6α-fluoro-11β-hydroxy-20β,21-epoxy-1,4,16-pregnatrien-3-one,
6α-methyl-11β-hydroxy-20β,21-epoxy-4,16-pregnadien-3-one,
6α-methyl-11β-hydroxy-20β,21-epoxy-1,4,16-pregnatrien-3-one,
2α-methyl-11β-hydroxy-20β,21-epoxy-4,16-pregnadien-3-one,
2-methyl-11β-hydroxy-20β,21-epoxy-1,4,16-pregnatrien-3-one,
2α-methyl-6α-fluoro-11β-hydroxy-20β,21-epoxy-4,16-pregnadiene-3-one,
2-methyl-6α-fluoro-11β-hydroxy-20β,21-epoxy,1,4,16-pregnatrien-3-one,
2α,6α-dimethyl-11β-hydroxy-20β,21-epoxy-4,16-pregnadien-3-one, and
2,6α-dimethyl-11β-hydroxy-20β,21-epoxy-1,4,16-pregnatrien-3-one, respectively.

The term "other 21-acylates" as used in the preceding paragraph is inclusive of 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like.

In like manner, substituting the mixed 20α and 20β epimeric forms of the 20-chloro or 20-bromo compounds described in Examples 2A and 2B, respectively, is productive of a mixture comprising the 20α, 21-epoxy compounds, otherwise corresponding to the 20β,21-epoxy compounds described above, and the 20β,21-epoxy compounds. This mixture comprising the 20α,21-epoxy and 20β,21-epoxy compounds can be used in Example 4 without further treatment. The mixture comprising the 20α, 21-epoxy and 20β,21-epoxy compounds can be chromatographed or countercurrently extracted, followed by crystallization, to separate the 20α,21-epoxy compounds from the 20β,21-epoxy compounds and thus obtain them as separate entities.

EXAMPLE 4

*16α-fluoro-11β,21 - dihydroxy - 1,4,17(20)-pregnatrien-3-one (5α), 16β - fluoro - 11β,21-dihydroxy-1,4,17(20)-pregnatrien-3-one (5β), 20α-fluoro-11β,21-dihydroxy-1,4,16-pregnatrien-3-one (5'α) and 20β-fluoro-11β,21-dihydroxy-1,4,16-pregnatrien-3-one (5'β)*

500 ml. of methylene chloride and 108 g. (1.5 mol.) of tetrahydrofuran were placed in a gallon polyethylene bottle. The bottle was flushed with nitrogen, cooled in a Dry Ice-acetone bath to about −60° C. and 60 g. (3.0 mol.) of anhydrous hydrogen fluoride were added thereto. A solution containing 19.4 g. (0.06 mol.) of 11β-hydroxy-20β,21-epoxy-1,4,16-pregnatrien-3-one (4) dissolved in 2 l. of methylene chloride, which had previously been cooled to about −60° C., was poured into the methylene chloride - tetrahydrofuran - hydrogen fluoride solution. The reaction mixture was swirled, and then placed in an ice bath and kept at about 0° C. for about 4 hours. The reaction mixture was then cooled to about −50° C. and poured into a stirred solution of 414 g. (3.0 mol.) of potassium carbonate dissolved in 2 l. of water. After stirring for approximately 15 minutes, the reaction mixture was allowed to stand and phase separation into an organic (methylene chloride) and aqueous phase occurred. The organic (methylene chloride) phase was separated and the aqueous phase extracted with three 200 ml. portions of methylene dichloride. These organic (methylene chloride) extracts were combined with the first organic (methylene chloride) extract, washed once with 200 ml. of water, filtered and evaporated to dryness leaving 22 g. of a white solid residue comprising 16α-fluoro-11β,21-dihydroxy-1,4,17(20)-pregnatriene-3-one (5α),
16β-fluoro-11β,21-dihydroxy-1,4,17(20)-pregnatrien-3-one (5β),
20α-fluoro-11β,21-dihydroxy-1,4,16-pregnatrien-3-one (5'α) and
20β-fluoro-11β,21-dihydroxy-1,4,16-pregnatrien-3-one (5'β).

In like manner, substituting a stoichiometric equivalent amount of

11β,hydroxy-20β,21-epoxy-4,16-pregnadien-3-one,
6α-fluoro-11β-hydroxy-20β,21-epoxy-4,16-pregnadien-3-one,
6α-fluoro-11β-hydroxy-20β,21-epoxy-1,4,16-pregnatrien-3-one,
6α-methyl-11β-hydroxy-20β,21-epoxy-4,16-pregnadien-3-one,
6α-methyl-11β-hydroxy-20β,21-epoxy-1,4,16-pregnatrien-3-one,
2α-methyl-11β-hydroxy-20β,21-epoxy-4,16-pregnadien-3-one,
2-methyl-11β-hydroxy-20β,21-epoxy-1,4,16-pregnatrien-3-one,
2α-methyl-6α-fluoro-11β-hydroxy-20β,21-epoxy-4,16-pregnadiene-3-one,
2-methyl-6α-fluoro-11β-hydroxy-20β,21-epoxy-1,4,16-pregnatrien-3-one,
2α,6α-dimethyl-11β-hydroxy-20β,21-epoxy-4,16-pregnadien-3-one, and
2,6α-dimethyl-11β-hydroxy-20β,21-epoxy-1,4,16-pregnatrien-3-one, for
11β-hydroxy-20β,21-epoxy-1,4,16-pregnatrien-3-one is productive of a product comprising 16β-fluoro- and 16α-fluoro-11β,21-dihydroxy-4,17(20)-pregnadien-3-one (and 20β-fluoro- and 20α-fluoro-11β,21-dihydroxy-4,16-pregnadien-3-one),
6α,16β-difluoro- and 6α,16α-difluoro-11β,21-dihydroxy-4,17(20)-pregnadien-3-one (and 6α,20β-difluoro- and 6α,20α-difluoro-11β,21-dihydroxy-4,16-pregnadien-3-one),
6α,16β-difluoro- and 6α,16α-difluoro-11β,21-dihydroxy-1,4,17(20)-pregnatrien-3-one (and 6α,20β-difluoro- and 6α,20α-difluoro-11β,21-dihydroxy-1,4,16-pregnatrien-3-one),
6α-methyl-16β-fluoro- and 6α-methyl-16α-fluoro-11β,21-dihydroxy-4,17(20)-pregnadien-3-one (and 6α-methyl-20β-fluoro- and 6α-methyl-20α-fluoro-11β,21-dihydroxy-4,16-pregnadien-3-one),
6α-methyl-16β-fluoro- and 6α-methyl-16α-fluoro-11β,21-dihydroxy-1,4,17(20)-pregnatrien-3-one (and 6α-methyl-20β-fluoro- and 6α-methyl-20α-fluoro-11β,21-dihydroxy-1,4,16-pregnatrien-3-one),
2α-methyl-16β-fluoro- and 2α-methyl-16α-fluoro-11β,21-dihydroxy-4,17(20)-pregnadien-3-one (and 2α-methyl-20β-fluoro- and 2α-methyl-20α-fluoro-11β,21-dihydroxy-4,16-pregnadien-3-one),
2-methyl-16β-fluoro- and 2-methyl-16α-fluoro-11β,21-dihydroxy-1,4,17(20)-pregnatrien-3-one (and 2-methyl-20β-fluoro- and 2-methyl-20α-fluoro-11β,21-dihydroxy-1,4,16-pregnadien-3-one),
2α-methyl-6α,16β-difluoro- and 2α-methyl-6α,16α-difluoro-11β,21-dihydroxy-4,17(20)-pregnadien-3-one (and 2α-methyl-6α,20β-difluoro- and 2α-methyl-6α,20α-difluoro-11β,21-dihydroxy-4,16-pregnadien-3-one),
2-methyl-6α,16β-difluoro- and 2-methyl-6α,16α-difluoro-11β,21-dihydroxy-1,4,17(20)-pregnatrien-3-one (and 2-methyl-6α,20β-difluoro- and 2-methyl-6α,20α-difluoro-11β,21-dihydroxy-1,4,16-pregnatrien-3-one),
2α,6α-dimethyl-16β-fluoro- and 2α,6α-dimethyl-16α-fluoro-11β,21-dihydroxy-4,17(20)-pregnadien-3-one (and 2α,6α-dimethyl-20β-fluoro- and 2α,6α-dimethyl-20α-fluoro-11β,21-dihydroxy-4,16-pregnadien-3-one) and 2,6α-dimethyl-16β-fluoro- and 2,6α-dimethyl-16α-fluoro-11β,21-dihydroxy-1,4,17(20)-pregnatrien-3-one (and 2,6α-dimethyl-2β-fluoro- and 2,6α-dimethyl-2α-fluoro-11β,21-dihydroxy-1,4,16-pregnatrien-3-one), respectively.

In like manner, substituting the mixture comprising the 20α,21-epoxy and 20β,21-epoxy compounds described in Example 3 is productive of a mixture comprising the 16α-fluoro, 16β-fluoro, 20α-fluoro and 20β-fluoro compounds described in this example.

EXAMPLE 5

*16α - fluoro-11β,21-dihydroxy-1,4,17(20)-pregnatrien-3-one 21-acetate (6α), 16β-fluoro-11β,21-dihydroxy-1,4,17(20)-pregnatrien-3-one 21-acetate (6β), 20α-fluoro-11β,21 - dihydroxy-1,4,16-pregnatrien-3-one 21-acetate (6'α) and 20β-fluoro-11β,21-dihydroxy-1,4,16-pregnatrien-3-one 21-acetate (6'β)*

To the white solid residue (22 g.) comprising

16α-fluoro-11β,21-dihydroxy-1,4,17(20)-pregnatrien-3-one (5α),
16β-fluoro-11β,21-dihydroxy-1,4,17(20)-pregnatrien-3-one (5β),
20α-fluoro-11β,21-dihydroxy-1,4,16-pregnatrien-3-one (5'α) and
20β-fluoro-11β,21-dihydroxy-1,4,16-pregnatrien-3-one (5'β), obtained in Example 4, there was added 140 ml. of acetic anhydride and 140 ml. of pyridine. After standing at about 25° C. for about 18 hours, the reaction mixture was poured into 2 l. of ice water, stirred for about 15 minutes and then extracted with three 200 ml. portions of methylene chloride. The methylene chloride extracts were combined, washed with two 200 ml. portions of water, filtered and evaporated to dryness yielding 22 g. of a white solid residue comprising 16α-fluoro-11β,21-dihydroxy-1,4,17(20)-pregnatrien-3-one 21-acetate,
16β-fluoro-11β,21-dihydroxy-1,4,17(20)-pregnatrien-3-one 21-acetate,
20α-fluoro-11β,21-dihydroxy-1,4,16-pregnatrien-3-one 21-acetate and
20β-fluoro-11β,21-dihydroxy-1,4,16-pregnatrien-3-one 21-acetate.

Several residues obtained according to the reaction described immediately above were combined and 33.5 g. of the combined residue comprising 16α-fluoro-11β,21-dihydroxy-1,4,17(20)-pregnatrien-3-one 21-acetate,
16β-fluoro-11β,21-dihydroxy-1,4,17(20)-pregnatrien-3-one 21-acetate,
20α-fluoro-11β,21-dihydroxy-1,4,16-pregnatrien-3-one 21-acetate and
20β-fluoro-11β,21-dihydroxy-1,4,16-pregnatrien-3-one 21-acetate, was taken up in 100 ml. of methylene chloride and poured onto a 2 kg. Florisil chromatographic column packed in Skellysolve B hexanes. The chromatographic column was developed by eluting with a constant concentration of acetone-Skellysolve B hexanes (8:92, by volume). The eluate fractions were freed of solvent. Those fractions which papergram analysis showed to contain the 20α-fluoro and 20β-fluoro compounds only were combined and recrystallized from ethyl acetate to yield an analytical sample of the mixed 20α and 20β epimeric forms of 20-fluoro-11β,21-dihydroxy-1,4,16-pregnatrien-3-one 21-acetate (6'), having a melting point of 173–178° C., [α]$_D$ +80° (CHCl$_3$), and the following analysis:

*Analysis.*—Calcd. for C$_{23}$H$_{29}$FO$_4$: C, 71.11; H, 7.52; F, 4.89. Found: C, 71.25; H, 7.52; F, 4.59.

The mixed 20α and 20β epimeric forms can be separated from each other using procedures known in the art, for example, chromatography or countercurrent extraction, followed by crystallization, to yield 20α-fluoro-11β,21-dihydroxy-1,4,16-pregnatrien-3-one 21-acetate (6'α) and
20β-fluoro-11β,21-dihydroxy-1,4,16-pregnatrien-3-one 21-acetate (6'β).

Those fractions which papergram analysis showed to contain the 20α-fluoro, 20β-fluoro, 16α-fluoro and 16β-fluoro compounds were dissolved in methylene chloride and poured onto a second Florisil chromatographic column and the chromatographic column was developed by eluting with a constant concentration of acetone-Skellysolve B hexanes (8:92, by volume). The eluate fractions were freed of solvent and those fractions which papergram analysis showed to contain mostly the 16-fluoro compounds (the 16α-fluoro epimer predominating) were combined. A portion of the combined fractions was recrystallized from ethyl acetate to yield an analytical sample of 16α-fluoro-11β,21-dihydroxy-1,4,17(20)-pregnatrien-3-one 21-acetate (6α), having a melting point of 190–191° C., $\lambda_{max.}^{EtOH}$ 242.5 mμ

$a_M$ 15,300 and the following analysis:
*Analysis.*—Calcd. for C$_{23}$H$_{29}$FO$_4$: C, 71.11; H, 7.52; F, 4.89. Found: C, 71.21; H, 7.84; F, 4.77.

16β - fluoro-11β,21-dihydroxy-1,4,17(20)-pregnatrien-3-one 21-acetate (6β) is present in the mother liquor following the crystallization of 16α-fluoro-11β,21-dihydroxy-1,4,17(20)-pregnatrien-3-one 21-acetate (6α) and can be recovered by further chromatography and/or crystallization.

The remainder of the combined fractions, which contain a mixture of 16β- and 16α-fluoro-11β,21-dihydroxy-1,4,17(20)-pregnatrien-3-one 21-acetate (the 16α epimer predominating), from the second column was used in the following example without further purification.

Similarly, by allowing the residue from Example 4 to react with the appropriate hydrocarbon carboxylic acid, or the acid anhydride and acid halides thereof, there is produced a product comprising other 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate and the like, of the 16α and 16β epimeric forms of 16-fluoro-11β,21-dihydroxy-1,4,17(20)-pregnatrien-3-one.

If the esterifying agent is the free acid, the reaction is carried out in the presence of an esterification catalyst.

If the corresponding acylating agent is solid, an inert solvent such as, toluene, xylene, or dioxane can be added to effect solution and to provide a liquid esterifying medium.

In like manner substituting a stoichiometric equivalent amount of products comprising 16β-fluoro- and 16α-fluoro-11β,21-dihydroxy-4,17(20)-pregnadien-3-one (and 20β-fluoro- and 20α-fluoro-11β,21-dihydroxy-4,16-pregnadien-3-one),
6α,16β-difluoro- and 6α,16α-difluoro-11β,21-dihydroxy-4,17(20)-pregnadien-3-one (and 6α,20β-difluoro- and 6α,20α-difluoro-11β,21-dihydroxy-4,16-pregnadiene-3-one),
6α,16β-difluoro- and 6α,16-difluoro-11β,21-dihydroxy-1,4,17(20)-pregnatrien-3-one (and 6α,20β-difluoroand 6α,20α-difluoro-11β,21-dihydroxy-1,4,6-pregnatrien-3-one),
6α-methyl-16β-fluoro- and 6α-methyl-16α-fluoro-11β,21-dihydroxy-4,17(20)-pregnadien-3-one (and 6α-methyl-20β-fluoro and 6α-methyl-20α-fluoro-11β,21-dihydroxy-4,16-pregnadiene-3-one),
6α-methyl-16β-fluoro- and 6α-methyl-16α-fluoro-11β,21-dihydroxy-1,4,17(20)-pregnatriene-3-one (and 6α-methyl-20β-fluoro- and 6α-methyl-20α-fluoro-11β,21-dihydroxy-1,4,16-pregnatrien-3-one),
2α-methyl-16β-fluoro- and 2α-methyl-16α-fluoro-11β,21-dihydroxy-4,17(20)-pregnadien-3-one (and 2α-methyl-20β-fluoro and 2α-methyl-20a-fluoro-11β,21-dihydroxy-4,16-pregnadien-3-one),
2-methyl-16β-fluoro- and 2-methyl-16α-fluoro-11β,21-dihydroxy-1,4,17(20)-pregnatrien-3-one (and 2-methyl-20β-fluoro- and 2-methyl-20α-fluoro-11β,21-dihydroxy-1,4,16-pregnatrien-3-one),
2α-methyl-6α,16β-difluoro- and 2α-methyl-6α,16α-difluoro-11β,21-dihydroxy-4,17(20)-pregnadien-3-one (and 2α-methyl-6α,20β-difluoro- and 2α-methyl-6α,20α-difluoro-11β,21-dihydroxy-4,16-pregnadien-3-one),
2-methyl-6α,16β-difluoro- and 2-methyl-6α,16α-difluoro-11β,21-dihydroxy-1,4,17(20)-pregnatrien-3-one (and 2-methyl-6α,20β-difluoro- and 2-methyl-6α,20α-difluoro-11β,21-dihydroxy-1,4,16-pregnatrien-3-one),
2α,6α-dimethyl-16β-fluoro- and 2α,6α-dimethyl-16α-fluoro-11β-21-dihydroxy-4,17(20)-pregnadien-3-one (and 2α,6α-dimethyl-20β-fluoro- and 2α,6α-dimethyl-20α-fluoro-11β,21-dihydroxy-4,16-pregnatrien-3-one),
and 2,6α-dimethyl-16β-fluoro- and 2,6α-dimethyl-16α-fluoro-11β,21-dihydroxy-1,4,17(20)-pregnatrien-3-one (and 2,6α-dimethyl-20β-fluoro- and 2,6α-dimethyl-20α-fluoro-11β,21-dihydroxy-1,4,16-pregnatrien-3-one),
disclosed in Example 4, for the product comprising 16β-fluoro- and 16α-fluoro-11β,21-dihydroxy-1,4,17(20)-pregnatrien-3-one and 20β-fluoro- and 20α-fluoro-11β,21-dihydroxy-1,4,16-pregnatrien-3-one and acylating with the appropriate acylating agent is productive of a product comprising the 21-acylates, such as, for example, the 21-acetate, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate and the like, of
16β-fluoro- and 16α-fluoro-11β,21-dihydroxy-4,17(20)-pregnadien-3-one (and 20β-fluoro- and 20α-fluoro-11β,21-dihydroxy-4,16-pregnadien-3-one),
6α,16β-difluoro- and 6α,16α-difluoro-11β,21-dihydroxy-4,17(20)-pregnadien-3-one (and 6α,20β-difluoro- and 6α,20α-difluoro-11β,21-dihydroxy-4,16-pregnadien-3-one),
6α,16β-difluoro- and 6α,16α-difluoro-11β,21-dihydroxy-1,4,17(20)-pregnatrien-3-one (and 6α,20β-difluoro- and 6α,20α-difluoro-11β,21-dihydroxy-1,4,16-pregnatrien-3-one),
6α-methyl-16β-fluoro- and 6α-methyl-16α-fluoro-11β,21-dihydroxy-4,17(20)-pregnadien-3-one (and 6α-methyl-20β-fluoro- and 6α-methyl-20α-fluoro-11β,21-dihydroxy-4,16-pregnadien-3-one),
6α-methyl-16β-fluoro- and 6α-methyl-16α-fluoro-11β,21-dihydroxy-1,4,17(20)-pregnatrien-3-one (and 6α-methyl-20β-fluoro- and 6α-methyl-20α-fluoro-11β,21-dihydroxy-1,4,16-pregnatrien-3-one),
2α-methyl-16β-fluoro- and 2α-methyl-16α-fluoro-11β,21-dihydroxy-4,17(20)-pregnadien-3-one (and 2α-methyl-20β-fluoro- and 2α-methyl-20α-fluoro-11β,21-dihydroxy-4,16-pregnatrien-3-one),
2-methyl-16β-fluoro- and 2-methyl-16α-fluoro-11β,21-dihydroxy-1,4,17(20)-pregnatrien-3-one (and 2-methyl-20β-fluoro- and 2-methyl-20α-fluoro-11β,21-dihydroxy-1,4,16-pregnatrien-3-one),
2α-methyl-6α,16β-difluoro- and 2α-methyl-6α,16α-difluoro-11β-21-dihydroxy-4,17(20)-pregnadien-3-one (and 2α-methyl-6α,20β-difluoro- and 2α-methyl-6α,20α-difluoro-11β,21-dihydroxy-4,16-pregnadien-3-one),
2-methyl-6α,16β-difluoro- and 2-methyl-6α,16α-difluoro-11β,21-dihydroxy-1,4,17(20)-pregnatrien-3-one (and 2-methyl-6α,20β-difluoro- and 2-methyl-6α,20α-difluoro-11β,21-dihydroxy-1,4,16-pregnatrien-3-one),
2α,6α-dimethyl-16β-difluoro- and 2α,6α-dimethyl-16α-fluoro-11β,21-dihydroxy-4,17(20)-pregnadien-3-one (and 2α,6α-dimethyl-20β-fluoro- and 2α,6α-dimethyl-20α-fluoro-11β,21-dihydroxy-4,16-pregnadien-3-one),
and 2,6α-dimethyl-16β-fluoro- and 2,6α-dimethyl-16α-fluoro-11β,21-dihydroxy-1,4,17(20)-pregnatrien-3-one (and 2,6α-dimethyl-20β-fluoro- and 2,6α-dimethyl-20α-fluoro-11β,21-dihydroxy-1,4,16-pregnatrien-3-one), respectively.

If desired, the above-described mixed products can be separated in the manner described above or according to other procedures known in the art.

EXAMPLE 6

*16α-fluoro-11β,17α,21-trihydroxy-1,4 - pregnadiene-3,20-dione 21-acetate (7α) and 16β-fluoro-11β,17α,21-trihydroxy-1,4-pregnadiene-3,20-dione 21-acetate (7β)*

4.3 g. (0.011 mol.) of the product comprising 16α-fluoro-11β,21-dihydroxy-1,4,17(20)-pregnatrien-3-one 21-acetate (6α) and 16β-fluoro-11β,21-dihydroxy-1,4,17(20)-pregnatrien-3-one 21-acetate (6β) obtained from the second chromatographic column in Example 5, 180 ml. of tertiary butanol, 5 ml. of pyridine, 43 ml. of a 2 mg./ml. tertiary butanol solution of osmium tetroxide and 13.7 ml. of a 2N tertiary butanol solution of N-methylmorpholine oxide hydrogen peroxide complex were stirred at about 28° C. for about 16 hours. There was then added to the reaction mixture about 100 ml. of a freshly prepared 1% solution of sodium hydrosulfite, followed by stirring for about 5 minutes and filtration through a synthetic magnesium silicate mat. The filtrate was then evaporated, under vacuum, while maintaining the temperature below 35° C., leaving a residue. The residue was taken up in about 200 ml. of methylene chloride, washed with two 50 ml. of portions of dilute hydrochloric acid, two 50 ml. portions of water, filtered and evaporated to dryness yielding 4.1 g. of a crude product comprising 16α-fluoro-11β,17α,21-trihydroxy-1,4-pregnadiene-3,20-dione 21-acetate and 16β-fluoro-11β,17α,21-trihydroxy-1,4-pregnadiene - 3,20 - dione 21-acetate. The crude residual product was dissolved in about 100 ml. of methylene chloride and poured onto a first chromatographic column containing 300 g. of Florisil packed in Skellysolve B hexane. The chromatographic column was developed by eluting with Skellysolve B hexanes containing increasing amounts of acetone. The eluate fractions were freed of solvent and analyzed by papergram analysis. Those fractions (eluted with 10% acetone in Skellysolve B hexanes) which papergram analysis showed to contain 16α-fluoro-11β,17α,21-trihydroxy-1,4-pregnadiene-3,20-dione 21-acetate were combined, dissolved in methylene chloride, and rechromatographed using a second chromatographic column containing 30 g. of Florisil packed in Skellysolve B hexanes. The second chromatographic column was developed by eluting with Skellysolve B hexanes containing increasing proportions of acetone. The eluate fractions from the second chromatographic column were freed of solvent and analyzed by papergram analysis.

Those fractions which papergram analysis showed to contain the 16α-fluoro epimer were combined and recrystallized from ethyl acetate to give 16α,fluoro-11β,17α,21-trihydroxy-1,4-pregnadiene-3,20-dione 21 - acetate (7α) having a melting point of 219–220° C., $$\lambda_{max}^{EtOH}\ 243\ m\mu$$

$a_M$ 16,100 and the following analysis:

*Analysis.*—Calcd. for $C_{23}H_{29}FO_6$; C, 65.70; H, 6.95; F, 4.52. Found: C, 65.23; H, 7.01; F, 4.52.

Those fractions (eluted with 15% acetone in Skellysolve B hexanes) from the first chromatographic column which papergram analysis showed to contain a mixture of 16α - fluoro - 11β,17α,21-trihydroxy-1,4-pregnadiene-3,20-dione 21-acetate and 16β-fluoro-11β,7α,21-trihydroxy-1,4-pregnadiene-3,20-dione 21-acetate were combined (160 mg.), dissolved in methylene chloride, and rechromatographed using a chromatographic column containing 12 g. of Florisil packed in Skellysolve B hexanes. The third chromatographic column was developed by eluting with Skellysolve B hexanes containing increasing proportions of acetone. The eluate fractions from the third cromatagraphic column were freed of solvent and analyzed by papergram analysis. Those fractions which papergram analysis showed to contain the 16β-epimer were combined and recrystallized from ethyl acetate to give 16β-fluoro-11β,17α,21-trihydroxy-1,4-pregnadiene-3,20 - dione 21-acetate (7β) having a melting point of 174–177° C.

Similarly, substituting other 21-acylates, such as those described in Example 5, of the product comprising the 16α and 16β epimeric forms of 16-fluoro-11β,21-dihydroxy-1,4,17(20)-pregnatrien-3-one for the product comprising the 16α and 16β epimeric forms of 16-fluoro-11β,21-dihydroxy-1,4,17(20)-pregnatrien-3-one 21-acetate, is productive of a product comprising the 16α and 16β-epimeric forms of other 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21 - (β - cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like, of 16-fluoro-11β,17α,21-dihydroxy-1,4-pregnadiene-3,20-dione.

The 16α and 16β epimeric forms of the other 21-acylates of 16 - fluoro-11β,17α,21-trihyroxy-1,4-pregnadiene-3,20-dione, described in the preceding paragraph, can be separated from each other according to the procedure described above for the separation of 16α-fluoro-11β,17α,21-trihydroxy-1,4-pregnadiene - 3,20 - dione 21-acetate from 16β-fluoro-11β,17α,21-trihydroxy-1,4-pregnadiene-3,20 dione 21-acetate.

In like manner, substituting a stoichiometric equivalent amount of a product comprising the 21-acylates of the 16α and 16β epimeric forms of 16-fluoro-11β,21-dihydroxy-4,17(20)-pregnadien-3-one,
6α,16-difluoro-11β,21-dihydroxy-4,17(20)-pregadien-3-one,
6α,16-difluoro-11β,21-dihydroxy-1,4,17(20)-pregnatrien-3-one,
6α-methyl-16-fluoro-11β,21-dihydroxy-4,17(20)-pregnadien-3-one,
6α-methyl-16-fluoro-11β,21-dihydroxy-1,4,17(20)-pregnatrien-3-one,
2α-methyl-16-fluoro-11β,21-dihydroxy-4,17(20)-pregnadien-3-one,
2α-methyl-16-fluoro-11β,21-dihydroxy-1,4,17(20)-pregnatrien-3-one,
2α-methyl-6α,16-difluoro-11β,21-dihydroxy-4,17(20)-pregnadien-3-one,
2-methyl-6α,16-difluoro-11β,21-dihydroxy-1,4,17(20)-pregnatrien-3-one,
2α,6α-dimethyl-16-fluoro-11β,21-dihydroxy-4,17(20)-pregnadien-3-one,
and 2,6α-dimethyl-16-fluoro - 11β,21 - dihydroxy - 1,4,17(20)-pregnatrien-3-one, disclosed in Example 5, for the product comprising the 16α and 16β epimeric forms of 16-fluoro-11β,21-dihydroxy-1,4,17(20)-pregnatrien-3-one 21-acetate is productive of the 21-acylates, such as, for example, the 21-acetate, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluene), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like of the 16α and 16β epimeric forms of 16-fluoro-11β,17α,21-trihydroxy-4-pregnene-3,20-dione,
6α,16-difluoro-11β,17α,21-trihydroxy-4-pregnene-3,20-dione,
6α,16-difluoro-11β,17α,21-trihydroxy-1,4-pregadiene-3,20-dione,
6α-methyl-16-fluoro-11β,17α,21-trihydroxy-4-pregnene-3,20-dione,
6α-methyl-16-fluoro-11β,17α,21-trihydroxy-1,4-pregnadiene-3,20-dione,
2α-methyl-16-fluoro-11β,17α,21-trihydroxy-4-pregnene-3,20-dione,
2-methyl-16-fluoro-11β,17α,21-trihydroxy-1,4-pregnadiene-3,20-dione,
2α-methyl-6α,16-difluoro-11β,17α,21-trihydroxy-4-pregnene-3,20-dione,
2-methyl-6α,16-difluoro-11β,17α,21-trihydroxy-1,4-pregnadiene-3,20-dione,
2α,6α-dimethyl-16-fluoro-11β,17α,21-trihydroxy-4-pregnene-3,20-dione,
and 2,6α-dimethyl-16-fluoro-11β,17α,21-trihydroxy-1,4-pregnadiene-3,20-dione, respectively.

The 16α and 16β epimeric forms of these compounds can be separated from each other according to the procedure described above for the separation of 16α-fluoro-11β,17α,21-trihydroxy-1,4 - pregnadiene - 3,20 - dione 21-acetate from 16β-fluoro-11β,17α,21-trihydroxy-1,4 - pregnadiene-3,20-dione 21-acetate.

EXAMPLE 7

*16α-fluoro-17α,21 - dihydroxy - 1,4,9(11) - pregnatriene-3,20-dione 21-acetate (8α) and 16β-fluoro-11β,17α,21-dihydroxy-1,4,9(11)-pregnatriene - 3,20 - dione 21-acetate (8β)*

Following the procedure of Example 1 of U.S. Patent No. 2,838,499, substituting a stoichiometric equivalent amount of 16α-fluoro-11β,17α,21-trihydroxy-1,4-pregnadiene-3,20-dione 21-acetate (7α) for 1-dehydro-6α-fluorohydrocortisone acetate is productive of 16α-fluoro-17α, 21-dihydroxy-1,4,9(11)-pregnatriene-3,20 - dione 21-acetate (8α), a crystalline solid.

Similarly, substituting 16β - fluoro - 11β,17α,21 - trihydroxy-1,4-pregnadiene-3,20-dione 21-acetate (7β) in the above example is productive of 16β-fluoro-17α,21-dihydroxy-1,4,9(11)-pregnatriene-3,20-dione 21-acetate (8β), a crystalline solid.

In like manner substituting other 21-acylates of the 16α and 16β epimeric forms of 16-fluoro-11β,17α,21-trihydroxy-1,4-pregnadiene-3,20-dione is productive of the corresponding 21-acylates, such as, for example, the 21-formate, the 21-propionate, the 21-butyrate, the 21-valerate, the 21-hexanoate, the 21-laurate, the 21-trimethylacetate, the 21-isobutyrate, the 1-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 1-cinnamate, the 21-maleate, the 21-citraconate, and the like, of the 16α and 16β epimeric forms of 16-fluoro-17α,21-dihydroxy-1,4,9(11)-pregnatriene-3,20-dione.

Likewise, substituting the 21-acylates of the 16α and 16β epimeric forms of 16-fluoro-11β,17α,21-trihydroxy-4-pregnene-3,20-dione,
6α,16-difluoro-11β,17α,21-trihydroxy-4-pregnene-3,20-dione,
6α,16-difluoro-11β,17α,21-trihydroxy-1,4-pregnadiene-3,20-dione,
6α-methyl-16-fluoro-11β,17α,21-trihydroxy-4-pregnene-3,20-dione,
6α-methyl-16-fluoro-11β,17α,21-trihydroxy-1,4-pregnadiene-3,20-dione,
2α-methyl-16-fluoro-11β,17α,21-trihydroxy-4-pregnene-3,20-dione,
2-methyl-16-fluoro-11β,17α,21-trihydroxy-1,4-pregnadiene-3,20-dione,
2α-methyl-6α,16-difluoro-11β,17α,21-trihydroxy-4-pregnene-3,20-dione,
2-methyl-6α,16-difluoro-11β,17α,21-trihydroxy-1,4-pregnadiene-3,20-dione,
2α,6α-dimethyl-16-fluoro-11β,17α,21-trihydroxy-4-pregnene-3,20-dione,
and 2,6α-dimethyl-16-fluoro-11β,17α,21-trihydroxy-1,4-pregnadiene-3,20-dione, disclosed in Example 6, is productive of the corresponding 21-acylates, such as, for example, the 21-acetate, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like, of the 16α and 16β epimeric forms of 16-fluoro-17α,21-dihydroxy-4,9(11)-pregnadiene-3,20-dione,
6α,16-difluoro-17α,21-dihydroxy-4,9(11)-pregnadiene-3,20-dione,
6α,16-difluoro-17α,21-dihydroxy-1,4,9(11)-pregnatriene-3,20-dione,
6α-methyl-16-fluoro-17α,21-dihydroxy-4,9(11)-pregnadiene-3,20-dione,
6α-methyl-16-fluoro-17α,21-dihydroxy-1,4,9(11)-pregnatriene-3,20-dione,
2α-methyl-16-fluoro-17α,21-dihydroxy-4,9(11)-pregnadiene-3,20-dione,
2-methyl-16-fluoro-17α,21-dihydroxy-1,4,9(11)-pregnatriene-3,20-dione,
2α-methyl-6α,16-difluoro-17α,21-dihydroxy-4,9(11)-pregnadiene-3,20-dione,
2-methyl-6α,16-difluoro-17α,21-dihydroxy-1,4,9(11)-pregnatriene-3,20-dione,
2α,6α-dimethyl-16-fluoro-17α,21-dihydroxy-4,9(11)-pregnadiene-3,20-dione, and
2,6α-dimethyl-16-fluoro-17α,21-dihydroxy-1,4,9(11)-pregnatriene-3,20-dione, respectively.

EXAMPLE 8

*16α - fluoro - 9α - bromo - 11β,17α,21 - trihydroxy - 1,4-pregnadiene-3,20-dione 21-acetate (9α) and 16β-fluoro-9α - bromo - 11β,17α,21 - trihydroxy - 1,4-pregnadiene-3,20-dione 21-acetate (9β)*

Following the procedure of Example 2 of U.S. Patent 2,838,499, substituting a stoichiometric equivalent amount of 16α-fluoro-17α,21-dihydroxy - 1,4,9(11) - pregnatriene-3,20-dione 21-acetate (8α) for 6α-fluoro-17α,21dihydroxy-1,4,9(11)-pregnatriene-3,20-dione 21-acetate is productive of 16α - fluoro-9α-bromo-11β,17α,21-trihydroxy-1,4-pregnadiene-3,20-dione 21-acetate (9α), a crystalline solid.

Similarly, substituting 16β-fluoro - 17α,21 - dihydroxy-1,4,9(11)-pregnatriene-3,20-dione 21-acetate (8β) in the above example is productive of 16β-fluoro-9α-bromo-11β,17α,21-trihydroxy-1,4-pregnadiene-3,20-dione 21-acetate (9β), a crystalline solid.

In like manner, substituting other 21-acylates of the 16α and 16β epimeric forms of 16-fluoro-17α,21-dihydroxy-1,4-pregnadiene-3,20-dione is productive of the corresponding 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarylbutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like, of the 16α and 16β epimeric forms of 16-fluoro-9α-bromo-11β,17α,21-trihydroxy-1,4-pregnadiene-3,20-dione.

Likewise, substituting the 21 acylates of the 16α and 16β epimeric forms of 16-fluoro-17α,21-dihydroxy-4,9(11)-pregnadiene-3,20-dione,
6α,16-difluoro-17α,21-dihydroxy-4,9(11)-pregnadiene-3,20-dione,
6α,16-difluoro-17α,21-dihydroxy-1,4,9(11)-pregnatriene-3,20-dione,
6α-methyl-16-fluoro-17α,21-dihydroxy-4,9(11)-pregnadiene-3,20-dione,
6α-methyl-16-fluoro-17α,21-dihydroxy-1,4,9(11)-pregnatriene-3,20-dione,
2α-methyl-16-fluoro-17α,21-dihydroxy-4,9(11)-pregnadiene-3,20-dione,
2-methyl-16-fluoro-17α,21-dihydroxy-1,4,9(11)-pregnatriene-3,20-dione,
2α-methyl-6α,16-difluoro-17α,21-dihydroxy-4,9(11)-pregnadiene-3,20-dione,
2-methyl-6α,16-difluoro-17α,21-dihydroxy-1,4,9(11)-pregnatriene-3,20-dione,
2α,6α-dimethyl-16-fluoro-17α,21-dihydroxy-4,9(11)-pregnadiene-3,20-dione, and
2,6α-dimethyl-16-fluoro-17α,21-dihydroxy-1,4,9(11)-pregnatriene-3,20-dione disclosed in Example 7, is productive of the corresponding 21-acylates, such as, for example, the 21-acetate, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like, of the 16α and 16β epimeric forms of 16-fluoro-9α-bromo-11β,17α,21-trihydroxy-4-pregnene-3,20-dione,
6α,16-difluoro-9α-bromo-11β,17α,21-trihydroxy-4-pregnene-3,20-dione,
6α,16-difluoro-9α-bromo-11β17α,21-trihydroxy-1,4-pregnadiene-3,20-dione,
6α-methyl-16-fluoro-9α-bromo-11β,17α,21-trihydroxy-4-pregnene-3,20-dione, 6α-methyl-16-fluoro-9α-bromo-11β,17α,21-trihydroxy-1,4-pregnadiene-3,20-dione,
2α-methyl-16-fluoro-9α-bromo-11β,17α,21-trihydroxy-4-pregnene-3,20-dione,
2-methyl-16-fluoro-9α-bromo-11β,17α,21-trihydroxy-1,4-pregnadiene-3,20-dione,
2α-methyl-6α,16-difluoro-9α-bromo-11β,17α,21-trihydroxy-4-pregnene-3,20-dione,
2-methyl-6α,16-difluoro-9-bromo-11β,17α,21-trihydroxy-1,4-pregnadiene-3,20-dione,
2α,6α-dimethyl-16-fluoro-9α-bromo-11β,17α,21-trihydroxy-4-pregnene-3,20-dione, and
2,6-dimethyl-16-fluoro-9α-bromo-11β,17α,21-trihydroxy-1,4-pregnadiene-3,20-dione, respectively.

Similarly, following the procedure of Example 2 of U.S. Patent 2,838,499, substituting another N-haloamide or and N-haloimide such as N-iodosuccinimide or N-chlorosuccinimide, is productive of the corresponding 9α-halo products.

EXAMPLE 9

*16α - fluoro - 9β,11β - epoxy - 17α,21 - dihydroxy - 1,4-pregnadiene-3,20-dione 21-acetate (10α) and 16β-fluoro - 9β,11β - epoxy - 17α,21 - dihydroxy - 1,4 - pregnadiene-3,20-dione 21-acetate (10β)*

Following the procedure of Example 3 of U.S. Patent 2,838,499, substituting a stoichiometric equivalent amount of 16α - fluoro-9α-bromo-11β,17α,21-trihydroxy-1,4-pregnadiene-3,20-dione 21-acetate (9α) for 6α-fluoro-9α-bromo-11β,17,21-trihydroxy-1,4-pregnadiene-3,20 - dione 21-acetate is productive of 16α-fluoro-9β,11β-epoxy-17α, 21 - dihydroxy - 1,4 - pregnadiene - 3,20 - dione 21-acetate (10α), a crystalline solid.

Similarly, substituting 16β-fluoro-9α-bromo-11β,17α,21-trihydroxy-1,4-pregnadiene-3,20-dione 21-acetate (9β) in the above example is productive of 16β-fluoro-9β,11β-epoxy - 17α,21 - dihydroxy - 1,4 - pregnadiene - 3,20-dione 21-acetate (10β), a crystalline solid.

In like manner, substituting other 21-acylates of the 16α and 16β epimeric forms of 16-fluoro-9α-bromo-11β, 17α,21-trihyroxy-1,4-pregnadiene-3,20-dione is productive of the corresponding 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarylbutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like, of the 16α and 16β epimeric forms of 16-fluoro-9β,11β-epoxy-17α,21-dihydroxy-1,4-pregnadiene-3,20-dione.

Likewise, substituting the 21-acylates of the 16α and 16β epimeric forms of 16-fluoro-9α-bromo-11β,17α,21-trihydroxy-4-pregnene-3, 20-dione,
6α,16-difluoro-9α-bromo-11β,17α,21-trihydroxy-4-pregnene-3,20-dione,
6α,16-difluoro-9α-bromo-11β,17α,21-trihydroxy-1,4-pregnadiene-3,20-dione,
6α-methyl-16-fluoro-9α-bromo-11β,17α,21-trihydroxy-4-pregnene-3,20-dione,
6α-methyl-16-fluoro-9α-bromo-11β,17α,21-trihydroxy-1,4-pregnadiene-3,20-dione,
2α-methyl-16-fluoro-9α-bromo-11β,17α,21-trihydroxy-4-pregnene-3,20-dione,
2-methyl-16-fluoro-9α-bromo-11β,17α,21-trihydroxy-1,4-pregnadiene-3,20-dione,
2α-methyl-6α,16-difluoro-9α-bromo-11β,17α,21-trihydroxy-4-pregnene-3,20-dione,
2-methyl-6α,16-difluoro-9α-bromo-11β,17α,21-trihydroxy-1,4-pregnadiene-3,20-dione,
2α,6α-dimethyl-16-fluoro-9α-bromo-11β,17α,21-trihydroxy-4-pregnene-3,20-dione, and
2,6α-dimethyl-16-fluoro-9α-bromo-11β,17α,21-trihydroxy-1,4-pregnadiene-3,20-dione, disclosed in Example 8, is productive of the corresponding 21-acylates, such as, for example, the 21-acetate, the 21-formate, the 21 - propionate, the 21 - butyrate, the 21-valerate, the 21-hexanoate, the 21-laurate, the 21-trimethylacetate, the 21-isobutyrate, the 21-isovalerate, the 21 - tertiarybutylacetate, the 21 - (β - cyclopentylpropionate), the 21 - cyclohexanecarboxylate, the 21 - cyclohexylacetate, the 21 - benzoate, the 21 - phenylacetate, the 21 - (β - phenylpropionate), the 21 - (o-, m-, p-toluate), the 21 - hemisuccinate, the 21 - hemiadipate, the 21 - acrylate, the 21 - crotonate, the 21 - propiolate, the 21 - (2 - butynoate), the 21 - undecolate, the 21-cinnamate, the 21 - maleate, the 21 - citraconate, and the like, of the 16α and 16β epimeric forms of 16-fluoro-9β,11β-epoxy-17α,21-dihydroxy-4-pregnene-3,20-dione,
6α,16-difluoro-9β,11β-epoxy-17α,21-dihydroxy-4-pregnene-3,20-dione,
6α,16-difluoro-9β,11β-epoxy-17α,21-dihydroxy-1,4-pregnadiene-3,20-dione,
6α-methyl-16-fluoro-9β,11β-epoxy-17α,21-dihydroxy-4-pregnene-3,20-dione,
6α-methyl-16-fluoro-9β,11β-epoxy-17α,21-dihydroxy-1,4-pregnadiene-3,20-dione,
2α-methyl-16-fluoro-9β,11β-epoxy-17α,21-dihydroxy-4-pregnene-3,20-dione,
2-methyl-16-fluoro-9β,11β-epoxy-17α,21-dihydroxy-1,4-pregnadiene-3,20-dione,
2α-methyl-6α,16-difluoro-9β,11β-epoxy-17α,21-dihydroxy-4-pregnene-3,20-dione,
2-methyl-6α,16-difluoro-9β,11β-epoxy-17α,21-dihydroxy-1,4-pregnadiene-3,20-dione,
2α,6α-dimethyl-16-fluoro-9β,11β-epoxy-17α,21-dihydroxy-4-pregnene-3,20-dione,
and 2,6α-dimethyl-16-fluoro-9β,11β-epoxy-17α,21-dihydroxy-1,4-pregnadiene-3,20-dione, respectively.

Similarly, substituting the other 9α-halo products, obtained according to the procedure of Example 8, in this example is productive of the 9β,11β-epoxy products described above.

EXAMPLE 10

*9α,16α-difluoro-11β,17α,21-trihydroxy-1,4-pregnadiene-3,20-dione 21-acetate (11α) and 9α,16β-difluoro-11β, 17α,21-trihydroxy-1,4-pregnadiene-3,20-dione 21-acetate (11β)*

Following the procedure of Example 4 of U.S. Patent 2,838,499, substituting a stoichiometric equivalent amount of 16α - fluoro - 9β,11β - epoxy - 17α,21 - dihydroxy-1,4 - pregnadiene - 3,20 - dione 21 - acetate (10α) for 6α - fluoro - 9β,11β - epoxy - 17α,21 - dihydroxy - 1,4-pregnadiene - 3,20 - dione 21 - acetate is productive of 9α,16α - difluoro - 11β,17α,21 - trihydroxy - 1,4 - pregnadiene - 3,20 - dione 21 - acetate (11α), having a melting point of 265–268° C. and the following analysis:

*Analysis.*—Calcd. for $C_{23}H_{28}F_2O_6$: C, 63.00; H, 6.44; F, 8.67. Found: C, 62.61; H, 6.59; F, 8.60.

9α,16α - difluoro - 11β,17α,21 - trihydroxy - 1,4 - pregnadiene - 3,20 - dione 21 - acetate has approximately 75 times the antiinflammatory activity of hydrocortisone.

Similarly, substituting 16β - fluoro - 9β,11β - epoxy-17α,21 - dihydroxy - 1,4 - pregnadiene - 3,20 - dione 21 - acetate (10β) in the above example is productive of 9α,16β - difluoro - 11β,17α,21 - trihydroxy - 1,4 - pregnadiene - 3,20 - dione 21 - acetate, a crystalline solid.

In like manner, substituting other 21 - acylates of the 16α and 16β epimeric forms of 16 - fluoro - 9β,11β-epoxy - 17α,21 - dihydroxy - 1,4 - pregnadiene - 3,20-dione 21-acetate is productive of the corresponding 21-acylates, such as, for example, the 21-formate, the 21- propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21 - (β - cyclopentylpropionate), the 21 - cyclohexanecarboxylate, the 21 - cyclohexylacetate, the 21 - benzoate, the 21 - phenylacetate, the 21 - (β - phenylpropionate), the 21 - (o-, m-, p-toluate), the 21 - hemisuccinate, the 21 - hemiadipate, the 21 - acrylate, the 21-crotonate, the 21 - propiolate, the 21 - (2 - butynoate), the 21 - undecolate, the 21 - cinnamate, the 21 - maleate, the 21 - citraconate, and the like, of the 16α and 16β epimeric forms of 9α,16 - fluoro - 11β,17α,21 - trihydroxy - 1,4 - pregnadiene - 3,20 - dione.

Likewise, substituting the 21-acylates of the 16α and 16β epimeric forms of 16-fluoro-9β,11β-epoxy-17α,21-dihydroxy-4-pregnene-3,20-dione,
6α,16-difluoro-9β,11β-epoxy-17α,21-dihydroxy-4-pregnene 3,20-dione,
6α,16-difluoro-9β,11β-epoxy-17α,21-dihydroxy-1,4-pregnadiene-3,20-dione,
6α-methyl-16-fluoro-9β,11β-epoxy-17α,21-dihydroxy-4-pregnene-3,20-dione,
6α-methyl-16-fluoro-9β,11β-epoxy-17α,21-dihydroxy-1,4-pregnadiene-3,20-dione,
2α-methyl-16-fluoro-9β,11β-epoxy-17α,21-dihydroxy-4-pregnene-3,20-dione,
2-methyl-16-fluoro-9β,11β-epoxy-17α,21-dihydroxy-1,4-pregnadiene-3,20-dione,
2α-methyl-6α,16-difluoro-9β,11β-epoxy-17α,21-dihydroxy-4-pregnene-3,20-dione,
2-methyl-6α,16-difluoro-9β,11β-epoxy-17α,21-dihydroxy-1,4-pregnadiene-3,20-dione,
2α-6α-dimethyl-16-fluoro-9β,11β-epoxy-17α,21-dihydroxy-4-pregnene-3,20-dione,
and 2,6α-dimethyl-16-fluoro-9β,11β-epoxy-17α,21-dihydroxy-1,4-pregnadiene-3,20-dione, disclosed in Example 9, is productive of the corresponding 21-acylates, such as, for example, the 21-acetate, the 21-formate, the 21 - propionate, the 21 - butyrate, the 21-valerate, the 21-hexanoate, the 21-laurate, the 21-trimethylacetate, the 21-isobutyrate, the 21-isovalerate, the 21 - tertiarybutylacetate, the 21 - (β - cyclopentylpropionate), of the 16α and 16β epimeric forms of 9α,16-difluoro-11β,17α,21-trihydroxy-4-pregnene-3,20-dione,
6α,9α,16-trifluoro-11β,17α,21-trihydroxy-4-pregnene-3,20-dione,
6α,9α,16-trifluoro-11β,17α,21-trihydroxy-1,4-pregnadiene-3,20-dione,
6α-methyl-9α,16-difluoro-11β,17α,21-trihydroxy-4-pregnene-3,20-dione,
6α-methyl-9α,16-difluoro-11β,17α,21-trihydroxy-1,4-pregnadiene-3,20-dione,
2α-methyl-9α,16-difluoro-11β,17α,21-trihydroxy-4-pregnene-3,20-dione,
2-methyl-9α,16-difluoro-11β,17α,21-trihydroxy-1,4-pregnadiene-3,20-dione,
2α-methyl-6α,9α,16-trifluoro-11β,17α,21-trihydroxy-4-pregnene-3,20-dione,
2-methyl-6α,9α,16-trifluoro-11β,17α,21-trihydroxy-1,4-pregnadiene-3,20-dione,
2α,6α-dimethyl-9α,16-difluoro-11β,17α,21-trihydroxy-4-pregnene-3,20-dione,
and 2,6α-dimethyl-9α,16-difluoro-11β,17α,21-trihydroxy-1,4-pregnadiene-3,20-dione, respectively.

EXAMPLE 11

*16α-fluoro-11β,17α,21-trihydroxy - 1,4 - pregnadiene-3,20-dione (12α), 16β - fluoro-11β,17α,21 - trihydroxy - 1,4-pregnadiene - 3,20 - dione (12β), 9α,16α-difluoro - 11β,17α,21-trihydroxy - 1,4 - pregnadiene-3,20-dione (13α) and 9α,16β-difluoro-11β,17α,21 - trihydroxy - 1,4-pregnadiene-3,20-dione (13β)*

Following the procedure of Example 5 of U.S. Patent 2,838,499, substituting a stoichiometric equivalent amount of 16α-fluoro-11β,17α,21 - trihydroxy - 1,4-pregnadiene-3, 20-dione 21-acetate (7α) (or other 21-acylates) for 1-dehydro-6α,9α-difluorohydrocortisone acetate is productive of 16α-fluoro-11β,17α,21 - trihydroxy - 1,4-pregnadiene-3, 20-dione (12α).

Similarly, substituting 9α,16α-difluoro - 11β,17α,21-trihydroxy-1,4-pregnadiene-3,20-dione 21-acetate (11α) (or other 21-acylates) in the above example is productive of 9α,16α-difluoro-11β,17α,21 - trihydroxy - 1,4-pregnadiene-3,20-dione (13α).

In like manner, substituting 16β-fluoro-11β,17α,21-trihydroxy-1,4-pregnadiene-3,20-dione 21-acetate (7β) (or other 21-acylates) and 9α,16β-difluoro-11β,17α,21-trihydroxy-1,4-pregnadiene-3,20-dione 21-acetate (11β) (or other 21-acylates) is productive of 16β-fluoro-11β,17α,21-trihydroxy-1,4-pregnadiene-3,20-dione (12β) and 9α,16β-difluoro-11β,17α,21-trihydroxy-1,4-pregnadiene - 3,20-dione (13β).

Similarly, substituting the 21-acetate (or other 21-acylates) of the 16α and 16β epimeric forms of 16-fluoro-11β,17α,21-trihydroxy-4-pregnene-3,20-dione,
6α,16-difluoro-11β,17α,21-trihydroxy-4-pregnene-3,20-dione,
6α,16-difluoro-11β,17α,21-trihydroxy-1,4-pregnadiene-3,20-dione,
6α-methyl-16-fluoro-11β,17α,21-trihydroxy-4-pregnene-3,20-dione,
6α-methyl-16-fluoro-11β,17α,21-trihydroxy-1,4-pregnadiene-3,20-dione,
2α-methyl-16-fluoro-11β,17α,21-trihydroxy-4-pregnene-3,20-dione,
2-methyl-16-fluoro-11β,17α,21-trihydroxy-1,4-pregnadiene-3,20-dione,
2α-methyl-6α,16-difluoro-11β,17α,21-trihydroxy-4-pregnene-3,20-dione,
2-methyl-6α,16-difluoro-11β,17α,21-trihydroxy-1,4-pregnadiene-3,20-dione,
2α,6α-dimethyl-16-fluoro-11β,17α,21-trihydroxy-4-pregnene-3,20-dione and
2,6α-dimethyl-16-fluoro-11β,17α,21-trihydroxy-1,4-pregnadiene-3,20-dione, the products of Example 6, and 9α,16-difluoro-11β,17α,21-trihydroxy-4-pregnene-3,20-dione,
6α,9α,16-trifluoro-11β,17α,21-trihydroxy-4-pregnene-3,20-dione,
6α,9α,16-trifluoro-11β,17α,21-trihydroxy-1,4-pregnadiene-3,20-dione,
6α-methyl-9α,16-difluoro-11β,17α,21-trihydroxy-4-pregnene-3,20-dione,
6α-methyl-9α,16-difluoro-11β,17α,21-trihydroxy-1,4-pregnadiene-3,20-dione,
2α-methyl-9α,16-difluoro-11β,17α,21-trihydroxy-4-pregnene-3,20-dione,
2-methyl-9α,16-difluoro-11β,17α,21-trihydroxy-1,4-pregnadiene-3,20-dione,
2α-methyl-6α,9α,16-trifluoro-11β,17α,21-trihydroxy-4-pregnene-3,20-dione,
2-methyl-6α,9α,16-trifluoro-11β,17α,21-trihydroxy-1,4-pregnadiene-3,20-dione,
2α,6α-dimethyl-9α,16-difluoro-11β,17α,21-trihydroxy-4-pregnene-3,20-dione,
and 2,6α-dimethyl-9α,16-difluoro-11β,17α,21-trihydroxy-1,4-pregnadiene-3,20-dione, the product of Example 10, is productive of the 16α and 16β epimeric forms of 16-fluoro-11β,17α,21-trihydoxy-4-pregnene-3,20-dione,
6α,16-difluoro-11β,17α,21-trihydroxy-4-pregnene-3,20-dione, 6α,16-difluoro-11β,17α,21-trihydroxy-1,4-pregnadiene-3,20-dione,
6α-methyl-16-fluoro-11β,17α,21-trihydroxy-4-pregnene-3,20-dione,
6α-methyl-16-fluoro-11β,17α,21-trihydroxy-1,4-pregnadiene-3,20-dione,
2α-methyl-16-fluoro-11β,17α,21-trihydroxy-4-pregnene-3,20-dione,
2-methyl-16-fluoro-11β,17α,21-trihydroxy-1,4-pregnadiene-3,20-dione,
2α-methyl-6α,16-difluoro-11β,17α,21-trihydroxy-4-pregnene-3,20-dione,
2-methyl-6α,16-difluoro-11β,17α,21-trihydroxy-1,4-pregnadiene-3,20-dione,
2α,6α-dimethyl-16-fluoro-11β,17α,21-trihydroxy-4-pregnene-3,20-dione and
2,6α-dimethyl-16-fluoro-11β,17α,21-trihydroxy-1,4-pregnadiene-3,20-dione, and
9α,16-difluoro-11β,17α,21-trihydroxy-4-pregnene-3,20-dione,
6α,9α,16-trifluoro-11β,17α,21-trihydroxy-4-pregnene-3,20-dione,
6α,9α,16-trifluoro-11β,17α,21-trihydroxy-1,4-pregnadiene-3,20-dione,
6α-methyl-9α,16-difluoro-11β,17α,21-trihydroxy-4-pregnene-3,20-dione,
6α-methyl-9α,16-difluoro-11β,17α,21-trihydroxy-1,4-pregnadiene-3,20-dione,
2α-methyl-9α,16-difluoro-11β,17α,21-trihydroxy-4-pregnene-3,20-dione,
2-methyl-9α,16-difluoro-11β,17α,21-trihydroxy-1,4-pregnadiene-3,20-dione,
2α-methyl-6α,9α,16-trifluoro-11β,17α,21-trihydroxy-4-pregnene-3,20-dione,
2-methyl-6α,9α,16-trifluoro-11β,17α,21-trihydroxy-1,4-pregnadiene-3,20-dione,
2α,6α-dimethyl-9α,16α-difluoro-11β,17α,21-trihydroxy-4-pregnene-3,20-dione and
2,6α-dimethyl-9α,16α-difluoro-11β,17α,21-trihydroxy-1,4-pregnadiene-3,20-dione, respectively.

The free 21-alcohols described in Example 11 can be re-esterified by allowing them to react with the selected organic carboxylic acid, preferably a hydrocarbon carboxylic acid containing from 1 to 12 carbon atoms, inclusive, or the anhydride or acyl halide thereof, to produce the 21-acylates, such as, for example, the 21-acetate, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenyl acetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like, corresponding to the free 21-alcohols.

If the corresponding acylating agent is solid, an inert solvent such as toluene, xylene, or dioxane can be added to effect solution and to provide a liquid esterification medium.

EXAMPLE 12

*16α-fluoro- and 9α,16α-difluoro-11β,17α,21-trihydroxy-1,4-pregnadiene-3,20-dione 21-methanesulfonate (14α) and 16β-fluoro- and 9α,16β-difluoro-11β,17α,21-trihydroxy-1,4-pregnadiene-3,20-dione 21-methanesulfonate (14β)*

Following the procedure of Example 1 of U.S. Patent 2,838,538, substituting a stochiometric equivalent amount of 16α-fluoro-11β,17α,21-trihydroxy-1,4-pregnadiene-3,20-dione (12α) for 6α-fluoro-11β,17α,21-trihydroxy-4-pregnene-3,20-dione is productive of 16α-fluoro-11β,17α,21-trihydroxy-1,4-pregnadiene-3,20-dione 21-methanesulfonate (14α), a crystalline solid.

Similarly, substituting 9α,16α-difluoro-11β,17α,21-trihydroxy-1,4-pregnadiene-3,20-dione (13α) in the above example is productive of 9α,16α-difluoro-11β,17α,21-trihydroxy-1,4-pregnadiene-3,20-dione 21-methanesulfonate (14α), a crystalline solid.

In like manner, substituting 16β-fluoro-11β,17α,21-trihydroxy-1,4-pregnadiene-3,20-dione and 9α,16β-difluoro-11β,17α,21-trihydroxy-1,4-pregnadiene-3,20-dione is productive of 16β-fluoro-11β,17α,21-trihydroxy-1,4-pregnadiene-3,20-dione 21-methanesulfonate (14β) and 9α,16β-difluoro-11β,17α,21-trihydroxy-1,4-pregnadiene-3,20-dione 21-methanesulfonate (14β).

Similarly, substituting the 16α and 16β epimeric forms of 16-fluoro-11β,17α,21-trihydroxy-4-pregnene-3,20-dione,
6α,16-difluoro-11β,17α,21-trihydroxy-4-pregnene-3,20-dione,
6α,16-difluoro-11β,17α,21-trihydroxy-1,4-pregnadiene-3,20-dione,
6α-methyl-16-fluoro-11β,17α,21-trihydroxy-4-pregnene-3,20-dione,
6α-methyl-16-fluoro-11β,17α,21-trihydroxy-1,4-pregnadiene-3,20-dione,
2α-methyl-16-fluoro-11β,17α,21-trihydroxy-4-pregnene-3,20-dione,
2-methyl-16-fluoro-11β,17α-21-trihydroxy-1,4-pregnadiene-3,20-dione,
2α-methyl-6α,16-difluoro-11β,17α,21-trihydroxy-4-pregnene-3,20-dione,
2-methyl-6α,16-difluoro-11β,17α,21-trihydroxy-1,4-pregnadiene-3,20-dione,
2α,6α-dimethyl-16-fluoro-11β,17α,21-trihydroxy-4-pregnene-3,20-dione,
2,6α-dimethyl-16-fluoro-11β,17α,21-trihydroxy-1,4-pregnadiene-3,20-dione,
9α,16-difluoro-11β,17α,21-trihydroxy-4-pregnene-3,20-dione,
6α,9α,16-trifluoro-11β,17α,21-trihydroxy-4-pregnene-3,20-dione,
6α,9α,16-trifluoro-11β,17α,21-trihydroxy-1,4-pregnadiene-3,20-dione,
6α-methyl-9α,16-difluoro-11β,17α,21-trihydroxy-4-pregnene-3,20-dione,
6α-methyl-9α,16-difluoro-11β,17α,21-trihydroxy-1,4-pregnadiene-3,20-dione,
2α-methyl-9α,16-difluoro-11β,17α,21-trihydroxy-4-pregnene-3,20-dione,
2-methyl-9α,16-difluoro-11β,17α,21-trihydroxy-1,4-pregnadiene-3,20-dione,
2α-methyl-6α,9α,16-trifluoro-11β,17α,21-trihydroxy-4-pregnene-3,20-dione,
2-methyl-6α,9α,16-trifluoro-11β,17α,21-trihydroxy-1,4-pregnadiene-3,20-dione,
2α,6α-dimethyl-9α,16α-difluoro-11β,17α,21-trihydroxy-4-pregnene-3,20-dione,
and 2,6α-dimethyl-9α,16α-difluoro-11β,17α,21-trihydroxy-1,4-pregnadiene-3,20-dione, disclosed in Example 11, is productive of the 21-methanesulfonate corresponding thereto.

EXAMPLE 13

*16α-fluoro- and 9α,16α-difluoro-21-iodo-11β,17α-dihydroxy-1,4-pregnadiene-3,20-dione (15α) and 16β-fluoro- and 9α,16β-difluoro-21-iodo-11β,17α-dihydroxy-1,4-pregnadiene-3,20-dione (15β)*

Following the procedure of Example 2 of U.S. Patent 2,838,539, substituting a stoichiometric equivalent amount of 16α-fluoro-11β,17α,21-trihydroxy-1,4-pregnadiene-3,20-dione 21-methanesulfonate (14α) for 6α,9α-difluoro-11β,17α,21-trihydroxy-4-pregnene-3,20-dione 21-methanesulfonate is productive of 16α-fluoro-21-iodo-11β,17α-dihydroxy-1,4-pregnadiene-3,20-dione (15α), a crystalline solid.

Similarly, substituting 9α,16α-difluoro-11β,17α,21-trihydroxy-1,4-pregnadiene-3,20-dione 21-methanesulfonate in the above example is productive of 9α,16α-difluoro-21-iodo-11β,17α-dihydroxy-1,4 - pregnadiene - 3,20 - dione (15α), a crystalline solid.

In like manner, substituting 16β-fluoro-11β,17α,21-trihydroxy-1,4-pregnadiene-3,20-dione 21-methanesulfonate and 9α,16β-difluoro-11β,17α,21-trihydroxy-1,4 - pregnadiene-3,20-dione 21-methanesulfonate is productive of 16β-fluoro-21-iodo-11β,17α-dihydroxy-1,4-pregnadiene - 3,20-dione (15β) and 9α,16β-difluoro-21-iodo-11β,17α-dihydroxy-1,4-pregnadiene-3,20-dione (15β).

Similarly, substituting the 21-methanesulfonate of the 16α and 16β epimeric forms of 16-fluoro-11β,17α,21-trihydroxy-4-pregnene-3,20-dione,
6α,16-difluoro-11β,17α,21-trihydroxy-4-pregnene-3,20-dione,
6α,16-difluoro-11β,17α,21-trihydroxy-1,4-pregnadiene-3,20-dione,
6α-methyl-16-fluoro-11β,17α,21-trihydroxy-4-pregnene-3,20-dione,
6α-methyl-16-fluoro-11β,17α,21-trihydroxy-1,4-pregnadiene-3,20-dione,
2α-methyl-16-fluoro-11β,17α,21-trihydroxy-4-pregnene-3,20-dione,
2-methyl-16-fluoro-11β,17α,21-trihydroxy-1,4-pregnadiene-3,20-dione,
2α-methyl-6α,16-difluoro-11β,17α,21-trihydroxy-4-pregnene-3,20-dione,
2-methyl-6α,16-difluoro-11β,17α,21-trihydroxy-1,4-pregnadiene-3,20-dione,
2α,6α-dimethyl-16-fluoro-11β,17α,21-trihydroxy-4-pregnene-3,20-dione,
2,6α-dimethyl-16-fluoro-11β,17α,21-trihydroxy-1,4-pregnadiene-3,20-dione,
9α,16-difluoro-11β,17α,21-trihydroxy-4-pregnene-3,20-dione,
6α,9α,16-trifluoro-11β,17α,21-trihydroxy-4-pregnene-3,20-dione,
6α,9α,16-trifluoro-11β,17α,21-trihydroxy-1,4-pregnadiene-3,20-dione,
6α-methyl-9α,16-difluoro-11β,17α,21-trihydroxy-4-pregnene-3,20-dione,
6α-methyl-9α,16-difluoro-11β,17α,21-trihydroxy-1,4-pregnadiene-3,20-dione,
2α-methyl-9α,16-difluoro-11β,17α,21-trihydroxy-4-pregnene-3,20-dione,
2-methyl-9α,16-difluoro-11β,17α,21-trihydroxy-1,4-pregnadiene-3,20-dione,
2α-methyl-6α,9α,16-trifluoro-11β,17α,21-trihydroxy-4-pregnene-3,20-dione,
2-methyl-6α,9α,16-trifluoro-11β,17α,21-trihydroxy-1,4-pregnadiene-3,20-dione,
2α,6α-dimethyl-9α,16α-difluoro-11β,17α,21-trihydroxy-4-pregnene-3,20-dione,
and 2,6α-dimethyl-9α,16α-difluoro-11β,17α,21-trihydroxy-1,4-pregnadiene-3,20-dione, disclosed in Example 12, is productive of the 16α and 16β epimeric forms of 16-fluoro-21-iodo-11β,17α-dihydroxy-4-pregnene-3,20-dione,
6α,16-difluoro-21-iodo-11β,17α-dihydroxy-4-pregnene-3,20-dione,
6α,16-difluoro-21-iodo-11β,17α-dihydroxy-1,4-pregnadiene-3,20-dione,
6α-methyl-16-fluoro-21-iodo-11β,17α-dihydroxy-4-pregnene-3,20-dione,
6α-methyl-16-fluoro-21-iodo-11β,17α-dihydroxy-1,4-pregnadiene-3,20-dione,
2α-methyl-16-fluoro-21-iodo-11β,17α-dihydroxy-4-pregnene-3,20-dione,
2-methyl-16-fluoro-21-iodo-11β,17α-dihydroxy-1,4-pregnadiene-3,20-dione,
2α-methyl-6α,16-difluoro-21-iodo-11β,17α-dihydroxy-4-pregnene-3,20-dione,
2-methyl-6α,16-difluoro-21-iodo-11β,17α-dihydroxy-1,4-pregnadiene-3,20-dione,
2α,6α-dimethyl-16-fluoro-21-iodo-11β,17α-dihydroxy-4-pregnene-3,20-dione,
2,6α-dimethyl-16-fluoro-21-iodo-11β,17α-dihydroxy-1,4-pregnadiene-3,20-dione,
9α,16-difluoro-21-iodo-11β,17α-dihydroxy-4-pregnene-3,20-dione,
6α,9α,16-trifluoro-21-iodo-11β,17α-dihydroxy-4-pregnene-3,20-dione,
6α,9α,16-trifluoro-21-iodo-11β,17α-dihydroxy-1,4-pregnadiene-3,20-dione,
6α-methyl-9α,16-difluoro-21-iodo-11β,17α-dihydroxy-4-pregnene-3,20-dione,
6α-methyl-9α,16-difluoro-21-iodo-11β,17α-dihydroxy-1,4-pregnadiene-3,20-dione,
2α-methyl-9α,16-difluoro-21-iodo-11β,17α-dihydroxy-4-pregnene-3,20-dione,
2-methyl-9α,16-difluoro-21-iodo-11β,17α-dihydroxy-1,4-pregnadiene-3,20-dione,
2α-methyl-6α,9α,16-trifluoro-21-iodo-11β,17α-dihydroxy-4-pregnene-3,20-dione,
2-methyl-6α,9α,16-trifluoro-21-iodo-11β,17α-dihydroxy-1,4-pregnadiene-3,20-dione,
2α,6α-dimethyl-9α,16-difluoro-21-iodo-11β,17α-dihydroxy-4-pregnene-3,20-dione,
and 2,6α-dimethyl-9α,16-difluoro-21-iodo-11β,17α-dihydroxy-1,4-pregnadiene-3,20-dione, respectively.

EXAMPLE 14

*16α,21-difluoro- and 9α,16α,21-trifluoro - 11β,17α - dihydroxy-1,4-pregnadiene-3,20-dione (16α) and 16β,21-difluoro- and 9α,16β,21-trifluoro-11β,17α - dihydroxy-1,4-pregnadiene-3,20-dione (16β)*

Following the procedure of Example 3 of U.S. Patent 2,838,539, substituting a stoichiometric equivalent amount of 16α-fluoro-21-iodo-11β,17α - dihydroxy-1,4-pregnadiene-3,20-dione (15α) for 6α,9α-difluoro-21-iodo-11β,17α-dihydroxy-4-pregnene-3,20-dione is productive of 16α,21-difluoro-11β,17α-dihydroxy-1,4 - pregnadiene-3,20 - dione (16α), a crystalline solid, obtained by elution of the chromatographic column with hexanes containing increasing proportions of acetone and crystallization from acetone-hexanes.

Similarly, substituting 9α,16α-difluoro-21-iodo-11β,17α-dihydroxy-1,4-pregnadiene-3,20-dione in the above example is productive of 9α,16α,21-trifluoro-11β,17α-dihydroxy-1,4-pregnadiene-3,20-dione (16α), a crystalline solid.

In like manner, substituting 16β-fluoro-21-iodo-11β,17α-dihydroxy-1,4-pregnadiene-3,20-dione and 9α,16β-difluoro-21-iodo-11β,17α-dihydroxy-1,4-pregnadiene - 3,20 - dione is productive of 16β,21-difluoro-11β,17α-dihydroxy-1,4-pregnadiene-3,20-dione (16β) and 9α,16β,21-trifluoro-11β,17α - dihydroxy-1,4-pregnadiene - 3,20 - dione (16β).

Similarly, substituting the 16α and 16β epimeric forms of 16-fluoro-21-iodo-11β,17α-dihydroxy-4-pregnene-3,20-dione,
6α,16-difluoro-21-iodo-11β,17α-dihydroxy-4-pregnene-3,20-dione,
6α,16-difluoro-21-iodo-11β,17α-dihydroxy-1,4-pregnadiene-3,20-dione,
6α-methyl-16-fluoro-21-iodo-11β,17α-dihydroxy-4-pregnene-3,20-dione,
6α-methyl-16-fluoro-21-iodo-11β,17α-dihydroxy-1,4-pregnadiene-3,20-dione,
2α-methyl-16-fluoro-21-iodo-11β,17α-dihydroxy-4-pregnene-3,20-dione,
2-methyl-16-fluoro-21-iodo-11β,17α-dihydroxy-1,4-pregnadiene-3,20-dione, 2α-methyl-6α,16-difluoro-21-iodo-11β,17α-dihydroxy-4-pregnene-3,20-dione,
2-methyl-6α,16-difluoro-21-iodo-11β,17α-dihydroxy-1,4-pregnadiene-3,20-dione,
2α,6α-dimethyl-16-fluoro-21-iodo-11β,17α-dihydroxy-4-pregnene-3,20-dione,
2,6α-dimethyl-16-fluoro-21-iodo-11β,17α-dihydroxy-1,4-pregnadiene-3,20-dione,
9α,16-difluoro-21-iodo-11β,17α-dihydroxy-4-pregnene-3,20-dione,
6α,9α,16-trifluoro-21-iodo-11β,17α-dihydroxy-4-pregnene-3,20-dione,
6α,9α,16-trifluoro-21-iodo-11β,17α-dihydroxy-1,4-pregnadiene-3,20-dione,
6α-methyl-9α,16-difluoro-21-iodo-11β,17α-dihydroxy-4-pregnene-3,20-dione,
6α-methyl-9α,16-difluoro-21-iodo-11β,17α-dihydroxy-1,4-pregnadiene-3,20-dione,
2α-methyl-9α,16-difluoro-21-iodo-11β,17α-dihydroxy-4-pregnene-3,20-dione,
2α-methyl-6α,9α,16-trifluoro-21-iodo-11β,17α-dihydroxy-4-pregnene-3,20-dione,
2-methyl-6α-9α,16-difluoro-21-iodo-11β,17α-dihydroxy-1,4-pregnadiene-3,20-dione,
2α,6α-dimethyl-9α,16-difluoro-21-iodo-11β,17α-dihydroxy-4-pregnene-3,20-dione,
and 2,6α-dimethyl-9α,16-difluoro-21-iodo-11β,17α-dihydroxy-1,4-pregnadiene-3,20-dione, disclosed in Example 13, is productive of the 16α and 16β epimeric forms of 16,21-difluoro-11β,17α-dihydroxy-4-pregnene-3,20-dione,
6α,16,21-trifluoro-11β,17α-dihydroxy-4-pregnene-3,20-dione,
6α,16,21-trifluoro-11β,17α-dihydroxy-1,4-pregnadiene-3,20-dione,
6α-methyl-16,21-difluoro-11β,17α-dihydroxy-4-pregnene-3,20-dione,
6α-methyl-16,21-difluoro-11β,17α-dihydroxy-1,4-pregnadiene-3,20-dione,
2α-methyl-16,21-difluoro-11β,17α-dihydroxy-4-pregnene-3,20-dione,
2-methyl-16,21-difluoro-11β,17α-dihydroxy-1,4-pregnadiene-3,20-dione,
2α-methyl-6α,16,21-trifluoro-11β,17α-dihydroxy-4-pregnene-3,20-dione,
2-methyl-6α,16,21-trifluoro-11β,17α-dihydroxy-1,4-pregnadiene-3,20-dione,
2α,6α-dimethyl-16,21-difluoro-11β,17α-dihydroxy-4-pregnene-3,20-dione,
2,6α-dimethyl-16,21-difluoro-11β,17α-dihydroxy-1,4-pregnadiene-3,20-dione,
9α,16,21-trifluoro-11β,17α-dihydroxy-4-pregnene-3,20-dione,
6α,9α,16,21-tetrafluoro-11β,17α-dihydroxy-4-pregnene-3,20-dione,
6α,9α,16,21-tetrafluoro-11β,17α-dihydroxy-1,4-pregnadiene-3,20-dione,
6α-methyl-9α,16,21-trifluoro-11β,17α-dihydroxy-4-pregnene-3,20-dione,
6α-methyl-9α,16,21-trifluoro-11β,17α-dihydroxy-1,4-pregnadiene-3,20-dione,
2α-methyl-9α,16,21-trifluoro-11β,17α-dihydroxy-4-pregnene-3,20-dione,
2-methyl-9α,16,21-trifluoro-11β,17α-dihydroxy-1,4-pregnadiene-3,20-dione,
2α-methyl-6α,9α,16,21-tretafluoro-11β,17α-dihydroxy-4-pregnene-3,20-dione,
2-methyl-6α,9α,16,21-tetrafluoro-11β,17α-dihydroxy-1,4-pregnadiene-3,20-dione,
2α,6α-dimethyl-9α,16,21-trifluoro-11β,17α-dihydroxy-4-pregnene-3,20-dione,
and 2,6α-dimethyl-9α,16,21-trifluoro-11β,17α-dihydroxy-1,4-pregnadiene-3,20-dione, respectively.

EXAMPLE 15

16α,21 - difluoro - and 9α,16α,21 - trifluoro - 11β,17α-dihydroxy - 1,4 - pregnadiene - 3,20 - dione (16α) and 16β,21 - difluoro - and 9α,16β,21 - trifluoro - 11β, 17α-dihydroxy - 1,4 - pregnadiene-3,20-dione (16β) directly from 16α-fluoro- and 9α,16α-difluoro-11β,17α,21-trihydroxy-1,4-pregnadiene-3,20-dione 21-methanesulfonate (14α) and 16β-fluoro- and 9α,16β-difluoro-11β, 17α,21-trihydroxy-1,4-pregnadiene-3,20-dione 21-methanesulfonate (14β)

Following the procedure of Example 4 of U.S. Patent 2,838,539, substituting a stoichiometric equivalent amount of 16α-fluoro-11β,17α,21-trihydroxy - 1,4 - pregnadiene-3,20-dione 21-methanesulfonate (14α) for 6α,9α-difluoro-11β,17α,21 - trihydroxy-4-pregnene-3,20-dione 21 - methanesulfonate is productive of 16α,21-difluoro-11β,17α-dihydroxy-1,4-pregnadiene-3,20-dione (16α), a crystalline solid, obtained by elution of the chromatographic column with hexanes containing increasing proportions of acetone and crystallization from ethyl acetate-hexanes.

Similarly, substituting 9α,16α-difluoro-11β,17α,21-trihydroxy-1,4-pregnadiene-3,20-dione 21-methanesulfonate in the above example is productive of 9α,16α,21-trifluoro-11β,17α-dihydroxy-1,4-pregnadiene-3,20-dione (16α), a crystalline solid.

In like manner, substituting 16β-fluoro-11β,17α,21-trihydroxy-1,4-pregnadiene-3,20-dione 21-methanesulfonate and 9α,16β - difluoro - 11β,17α,21 - trihydroxy-1,4-pregnadiene-3,20-dione 21-methanesulfonate is productive of 16β,21 - difluoro - 11β,17α - dihydroxy - 1,4 - pregnadiene-3,20-dione (16β) and 9α,16β,21-trifluoro-11β,17α-dihydroxy-1,4-pregnadiene-3,20-dione (16β).

Similarly, substituting the 21-methanesulfonate of the 16α and 16β epimeric forms of 16-fluoro-11β,17α,21-trihydroxy-4-pregnene-3,20-dione,
6α,16-difluoro-11β,17α,21-trihydroxy-4-pregnene-3,20-dione,
6α,16-difluoro-11β,17α,21-trihydroxy-1,4-pregnadiene-3,20-dione,
6α-methyl-16-fluoro-11β,17α,21-trihydroxy-4-pregnene-3,20-dione,
6α-methyl-16-fluoro-11β,17α,21-trihydroxy-1,4-pregnadiene-3,20-dione,
2α-methyl-16-fluoro-11β,17α,21-trihydroxy-4-pregnene-3,20-dione,
2-methyl-16-fluoro-11β,17α,21-trihydroxy-1,4-pregnadiene-3,20-dione,
2α-methyl-6α,16-difluoro-11β,17α,21-trihydroxy-4-pregnene-3,20-dione,
2-methyl-6α,16-difluoro-11β,17α,21-trihydroxy-1,4-pregnadiene-3,20-dione,
2α,6α-dimethyl-16-fluoro-11β,17α,21-trihydroxy-4-pregnene-3,20-dione,
2,6α-dimethyl-16-fluoro-11β,17α,21-trihydroxy-1,4-pregnadiene-3,20-dione,
9α,16-difluoro-11β,17α,21-trihydroxy-4-pregnene-3,20-dione,
6α,9α,16-trifluoro-11β,17α,21-trihydroxy-4-pregnene-3,20-dione,
6α,9α,16-trifluoro-11β,17,21-trihydroxy-1,4-pregnadiene-3,20-dione,
6α-methyl-9α,16-difluoro-11β,17α,21-trihydroxy-4-pregnene-3,20-dione,
6α-methyl-9α,16-difluoro-11β,17α,21-trihydroxy-1,4-pregnadiene-3,20-dione,
2α-methyl-9α,16-difluoro-11β,17α,21-trihydroxy-4-pregnene-3,20-dione,
2-methyl-9α,16-difluoro-11β,17α,21-trihydroxy-1,4-pregnadiene-3,20-dione,
2α-methyl-6α,9α,16-trifluoro-11β,17α,21-trihydroxy-4-pregnene-3,20-dione,
2-methyl-6α,9α,16-trifluoro-11β,17α,21-trihydroxy-1,4-pregnene-3,20-dione, 2α,6α-dimethyl-9α,16α-difluoro-11β,17α,21-trihydroxy-4-pregnene-3,20-dione.
and 2,6α-dimethyl-9α,16α-difluoro-11β,17α,21-trihydroxy-1,4-pregnadiene-3,20-dione, disclosed in Example 12, is productive of the 16α and 16β epimeric forms of 16,21-difluoro-11β,17α-dihydroxy-4-pregnene-3,20-dione,
6α,16,21-trifluoro-11β,17α-dihydroxy-4-pregnene-3,20-dione,
6α,16,21-trifluoro-11β,17α-dihydroxy-1,4-pregnadiene-3,20-dione,
6α-methyl-16,21-difluoro-11β,17α-dihydroxy-4-pregnene-3,20-dione,
6α-methyl-16,21-difluoro-11β,17α-dihydroxy-1,4-pregnadiene-3,20-dione,
2α-methyl-16,21-difluoro-11β,17α-dihydroxy-4-pregnene-3,20-dione,
2-methyl-16,21-difluoro-11β,17α-dihydroxy-1,4-pregnadiene-3,20-dione,
2α-methyl-6α,16,21-trifluoro-11β,17α-dihydroxy-4-pregnene-3,20-dione,
2-methyl-6α,16,21-trifluoro-11β,17α-dihydroxy-1,4-pregnadiene-3,20-dione,
2α,6α-dimethyl-16,21-difluoro-11β,17α-dihydroxy-4-pregnene-3,20-dione,
2,6α-dimethyl-16,21-difluoro-11β,17α-dihydroxy-1,4-pregnadiene-3,20-dione,
9α,16,21-trifluoro-11β,17α-dihydroxy-4-pregnene-3,20-dione,
6α,9α,16,21-tetrafluoro-11β,17α-dihydroxy-4-pregnene-3,20-dione,
6α,9α,16,21-tetrafluoro-11β,17α-dihydroxy-1,4-pregnadiene-3,20-dione,
6α-methyl-9α,16,21-trifluoro-11β,17α-dihydroxy-4-pregnene-3,20-dione,
6α-methyl-9α,16,21-trifluoro-11β,17α-dihydroxy-1,4-pregnadiene-3,20-dione,
2α-methyl-9α,16,21-trifluoro-11β,17α-dihydroxy-4-pregnene-3,20-dione,
2-methyl-9α,16,21-trifluoro-11β,17α-dihydroxy-1,4-pregnadiene-3,20-dione,
2α-methyl-6α,9α,16,21-tetrafluoro-11β,17α-dihydroxy-4-pregnene-3,20-dione,
2-methyl-6α,9α,16,21-tetrafluoro-11β,17α-dihydroxy-1,4-pregnadiene-3,20-dione,
2α,6α-dimethyl-9α,16,21-trifluoro-11β,17α-dihydroxy-4-pregnene-3,20-dione,
and 2,6α-dimethyl-9α,16,21-trifluoro-11β,17α-dihydroxy-1,4-pregnadiene-3,20-dione, respectively.

EXAMPLE 16

*16α,21-difluoro- and 9α,16α,21-trifluoro-11β,17α-dihydroxy-1,4-pregnadiene-3,20-dione 17-acetate (17α) and the corresponding 16β-fluoro compounds*

A solution of 2.0 g. of 16α,21-difluoro-11β,17α-dihydroxy-1,4-pregnadiene-3,20-dione, 5 ml. of distilled acetic anhydride, 500 mg. of p-toluenesulfonic acid and 5 ml. of acetic acid is stirred at 25° C. under a stream of nitrogen for 3 hours. The mixture is then stirred vigorously for about 30 minutes. The mixture is poured with vigorous stirring into 500 ml. of water. The precipitated solid is separated by filtration, dried, and the 16α,21 - difluoro - 11β,17α - dihydroxy - 1,4 - pregnadiene-3,20-dione 17-acetate (17α) thus obtained is recrystallized from ethyl acetate.

Substituting another hydrocarbon carboxylic acid anhydride for the acetic anhydride is productive of other 16α,21 - difluoro - 11β,17α - dihydroxy - 1,4 - pregnadiene-3,20-dione 17-acylates, such as, for example the 17-formate, the 17-propionate, the 17-butyrate, the 17-valerate, the 17-hexanoate, the 17-laurate, the 17-trimethylacetate, the 17-isobutyrate, the 17-isovalerate, the 17-tertiary-butylacetate, the 17-(β-cyclopentylpropionate), the 17-cyclohexanecarboxylate, the 17-cyclohexylacetate, the 17-benzoate, the 17-phenylacetate, the 17-(β-phenylpropionate), the 17-(o-, m-, p-toluate), the 17-hemisuccinate, the 17-hemiadipate, the 17-acrylate, the 17-crotonate, the 17-propiolate, the 17-(2-butynoate), the 17-undecolate, the 17-cinnamate, the 17-maleate, the 17-citraconate, and the like.

Similarly, 16,21 - difluoro - 11β,17α - dihydroxy - 1,4-pregnadiene-3,20-dione,
9α,16β,21-trifluoro - 11β,17α - dihydroxy-1,4-pregnadiene-3,20-dione, and
9α,16β,21 - trifluoro - 11β,17α-dihydroxy-1,4-pregnadiene-3,20-dione are converted to their 17-acetates and other 17-acylates, such as those named in the preceding paragraph, by substituting the appropriate steroid free 21-alcohol for 16α,21 - difluoro-11β,17α-dihydroxy - 1,4-pregnadiene-3,20-dione.

Similarly substituting the 16α and 16β epimeric forms 16,21-difluoro-11β,17α-dihydroxy-4-pregnene-3,20-dione,
6α,16,21-trifluoro-11β,17α-dihydroxy-4-pregnene-3,20-dione,
6α,16,21-trifluoro-11β,17α-dihydroxy-1,4-pregnadiene-3,20-dione,
6α-methyl-16,21-difluoro-11β,17α-dihydroxy-4-pregnene-3,20-dione,
6α-methyl-16,21-difluoro-11β,17α-dihydroxy-1,4-pregnadiene-3,20-dione,
2α-methyl-16,21-difluoro-11β,17α-dihydroxy-4-pregnene-3,20-dione,
2-methyl-16,21-difluoro-11β,17α-dihydroxy-1,4-pregnadiene-3,20-dione,
2α-methyl-6α,16,21-trifluoro-11β,17α-dihydroxy-4-pregnene-3,20-dione,
2-methyl-6α,16,21-trifluoro-11β,17α-dihydroxy-1,4-pregnadiene-3,20-dione,
2α,6α-dimethyl-16,21-difluoro-11β,17α-dihydroxy-4-pregnene-3,20-dione,
2,6α-dimethyl-16,21-difluoro-11β,17α-dihydroxy-1,4-pregnadiene-3,20-dione,
9α,16,21-trifluoro-11β,17α-dihydroxy-4-pregnene-3,20-dione,
6α,9α,16,21-tetrafluoro-11β,17α-dihydroxy-4-pregnene-3,20-dione,
6α,9α,16,21-tetrafluoro-11β,17α-dihydroxy-1,4-pregnadiene-3,20-dione,
6α-methyl-9α,16,21-trifluoro-11β,17α-dihydroxy-4-pregnene-3,20-dione,
6α-methyl-9α,16,21-trifluoro-11β,17α-dihydroxy-1,4-pregnadiene-3,20-dione,
2α-methyl-9α,16,21-trifluoro-11β,17α-dihydroxy-4-pregnene-3,20-dione,
2-methyl-9α,16,21-trifluoro-11β,17α-dihydroxy-1,4-pregnadiene-3,20-dione,
2α-methyl-6α,9α,16,21-tetrafluoro-11β,17α-dihydroxy-4-pregnene-3,20-dione,
2-methyl-6α,9α,16,21-tetrafluoro-11β,17α-dihydroxy-1,4-pregnadiene-3,20-dione,
2α,6α-dimethyl-9α,16,21-trifluoro-11β,17α-dihydroxy-4-pregnene-3,20-dione, and
2,6α-dimethyl-9α,16,21-trifluoro-11β,17α-dihydroxy-1,4-pregnadiene-3,20-dione, disclosed in Examples 14 (or 15), is productive of the corresponding 17-acetates (or other 17-acylates).

EXAMPLE 17

*16α - fluoro- and 9α,16α - difluoro-11β,17α,21-trihydroxy-1,4 - pregnadiene-3,20-dione 21-phosphate (18α) and 16β-fluoro- and 9α,16β-fluoro-11β,17α,21-trihydroxy-1,4-pregnadiene-3,20-dione 21-phosphate (18β)*

Following the procedure disclosed by Hirschmann et al., Chem. and Ind., 1958, 682, substituting a stoichiometric equivalent amount of 16α-fluoro-21-iodo-11β,17α-dihydroxy-1,4-pregnadiene-3,20-dione (15α) for 11β,17α-dihydroxy-21-iodo-4-pregnene-3,20-dione is productive of 16α-fluoro-11β,17α,21-trihydroxy-1,4-pregnadiene-3,20-dione 21-phosphate (18α), a crystalline solid.

Similarly, substituting 9α,16α-difluoro-21-iodo-11β,17α-dihydroxy-1,4-pregnadiene-3,20-dione in the above example is productive of 9α,16α-difluoro-11β,17α,21-trihydroxy-1,4-pregnadiene-3,20-dione 21-phosphate (18α), a crystalline solid.

In like manner substituting 16β-fluoro-21-iodo-11β,17α-dihydroxy-1,4-pregnadiene-3,20-dione and 9α,16β-difluoro-21-iodo-11β,17α-dihydroxy-1,4-pregnadiene-3,20-dione is productive of 16β-fluoro-11β,17α,21-trihydroxy-1,4-pregnadiene-3,20-dione 21-phosphate (19β) and 9α,16β-difluoro-11β,17α,21-trihydroxy-1,4-pregnadiene-3,20-dione 21-phosphate (19β).

Similarly, substituting the 16α and 16β epimeric forms of 16-fluoro-21-iodo-11β,17α-dihydroxy-4-pregnene-3,20-dione,
6α,16-difluoro-21-iodo-11β,17α-dihydroxy-4-pregnene-3,20-dione,
6α,16-difluoro-21-iodo-11β,17α-dihydroxy-1,4-pregnadiene-3,20-dione,
6α-methyl-16-fluoro-21-iodo-11β,17α-dihydroxy-4-pregnene-3,20-dione,
6α-methyl-16-fluoro-21-iodo-11β,17α-dihydroxy-1,4-pregnadiene-3,20-dione,
2α-methyl-16-fluoro-21-iodo-11β,17α-dihydroxy-4-pregnene-3,20-dione,
2-methyl-16-fluoro-21-iodo-11β,17α-dihydroxy-1,4-pregnadiene-3,20-dione,
2α-methyl-6α,16-difluoro-21-iodo-11β,17α-dihydroxy-4-pregnene-3,20-dione,
2-methyl-6α,16-difluoro-21-iodo-11β,17α-dihydroxy-1,4-pregnadiene-3,20-dione,
2α,6α-dimethyl-16-fluoro-21-iodo-11β,17α-dihydroxy-4-pregnene-3,20-dione,
2,6α-dimethyl-16-fluoro-21-iodo-11β,17α-dihydroxy-1,4-pregnadiene-3,20-dione,
9α,16-difluoro-21-iodo-11β,17α-dihydroxy-4-pregnene-3,20-dione,
6α,9α,16-trifluoro-21-iodo-11β,17α-dihydroxy-4-pregnene-3,20-dione,
6α,9α,16-trifluoro-21-iodo-11β,17α-dihydroxy-1,4-pregnadiene-3,20-dione,
6α-methyl-9α,16-difluoro-21-iodo-11β,17α-dihydroxy-4-pregnene-3,20-dione,
6α-methyl-9α,16-difluoro-21-iodo-11β,17α-dihydroxy-1,4-pregnadiene-3,20-dione,
2α-methyl-9α,16-difluoro-21-iodo-11β,17α-dihydroxy-4-pregnene-3,20-dione,
2-methyl-9α,16-difluoro-21-iodo-11β,17α-dihydroxy-1,4-pregnadiene-3,20-dione,
2α-methyl-6α,9α,16-trifluoro-21-iodo-11β,17α-dihydroxy-4-pregnene-3,20-dione,
2-methyl-6α,9α,16-trifluoro-21-iodo-11β,17α-dihydroxy-1,4-pregnadiene-3,20-dione,
2α,6α-dimethyl-9α,16-difluoro-21-iodo-11β,17α-dihydroxy-4-pregnene-3,20-dione,
2,6α-dimethyl-9α,16-difluoro-21-iodo-11β,17α-dihydroxy-1,4-pregnadiene-3,20-dione, disclosed in Example 13, is productive of 16-fluoro-11β,17α,21-trihydroxy-4-pregnene-3,20-dione 21-phosphate,
6α,16-difluoro-11β,17α,21-trihydroxy-4-pregnene-3,20-dione 21-phosphate,
6α,16-difluoro-11β,17α,21-trihydroxy-1,4-pregnadiene-3,20-dione 21-phosphate,
6α-methyl-16-fluoro-11β,17α,21-trihydroxy-4-pregnene-3,20-dione 21-phosphate,
6α-methyl-16-fluoro-11β,17α,21-trihydroxy-1,4-pregnadiene-3,20-dione 21-phosphate,
2α-methyl-16-fluoro-11β,17α,21-trihydroxy-4-pregnene-3,20-dione 21-phosphate,
2-methyl-16-fluoro-11β,17α,21-trihydroxy-1,4-pregnadiene-3,20-dione 21-phosphate,
2α-methyl-6α,16-difluoro-11β,17α,21-trihydroxy-4-pregnene-3,20-dione 21-phosphate,
2-methyl-6α,16-difluoro-11β,17α,21-trihydroxy-1,4-pregnadiene-3,20-dione 21-phosphate,
2α,6α-dimethyl-16-fluoro-11β,17α,21-trihydroxy-4-pregnene-3,20-dione 21-phosphate,
2,6α-dimethyl-16-fluoro-11β,17α,21-trihydroxy-1,4-pregnadiene-3,20-dione 21-phosphate,
9α,16-difluoro-11β,17α,21-trihydroxy-4-pregnene-3,20-dione 21-phosphate,
6α,9α,16-trifluoro-11β,17α,21-trihydroxy-4-pregnene-3,20-dione 21-phosphate,
6α,9α,16-trifluoro-11β,17α,21-trihydroxy-1,4-pregnadiene-3,20-dione 21-phosphate,
6α-methyl-9α,16-difluoro-11β,17α,21-trihydroxy-4-pregnene-3,20-dione 21-phosphate,
6α-methyl-9α,16-difluoro-11β,17α,21-trihydroxy-1,4-pregnadiene-3,20-dione 21-phosphate,
2α-methyl-9α,16-difluoro-11β,17α,21-trihydroxy-4-pregnene-3,20-dione 21-phosphate,
2-methyl-9α,16-difluoro-11β,17α,21-trihydroxy-1,4-pregnadiene-3,20-dione 21-phosphate,
2α-methyl-6α,9α,16-trifluoro-11,17α,21-trihydroxy-4-pregnene-3,20-dione 21-phosphate,
2-methyl-6α,9α,16-trifluoro-11β,17α,21-trihydroxy-1,4-pregnadiene-3,20-dione 21-phosphate,
2α,6α-dimethyl-9α,16-difluoro-11β,17α,21-trihydroxy-4-pregnene-3,20-dione 21-phosphate, and
2,6α-dimethyl-9α,16-difluoro-11β,17α,21-trihydroxy-1,4-pregnadiene-3,20-dione 21-phosphate, respectively.

EXAMPLE 18

*The 11-keto compounds*

Following the procedure of Example 7 of U.S. Patent 2,838,539, substituting a stoichiometric equivalent amount of 16α-fluoro-11β,17α,21-trihydroxy-1,4-pregnadiene-3,20-dione 21-acetate (7α) for 6α,9α,21-trifluoro-11β,17α-dihydroxy-4-pregnene-3,20-dione is productive of 16α-fluoro-17α,21-dihydroxy-1,4-pregnadiene-3,11,20-trione 21-acetate.

Similarly, other 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarylbutylacetate, the 21-(β-cyclopentylpropionate), the 21-cyclohexanecarboxylate, the 21-cyclohexylacetate, the 21-benzoate, the 21-pehnylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like, of 16α-fluoro-17α,21-dihydroxy-1,4-pregnadiene-3,11,20-trione are obtained by substituting the corresponding 21-acylates of 16α-fluoro-11β,17α,21-trihydroxy-1,4-pregnadiene-3,20-dione.

Likewise, substituting 9α,16α-difluoro-11β,17α,21-trihydroxy-1,4-pregnadiene-3,20-dione 21-acetate (or other 21-acylates) (11α) is productive of 9α,16α-difluoro-17α,21-dihydroxy-1,4-pregnadiene-3,11,20-trione 21-acetate (or other 21-acylates).

In like manner substituting 16β-fluoro- and 9α,16β-difluoro-11β,17α,21-trihydroxy-1,4-pregnadiene-3,20-dione 21 acetate (or other 21-acylates) is productive of 16β-fluoro- and 9α,16β-difluoro-17α,21-dihydroxy-1,4-pregnadiene-3,11,20-trione 21-acetate (or other 21-acylates).

Similarly, substituting the 16α and 16β epimeric forms of the 21-acetate (or other 21-acylates) of 16-fluoro-11β,17α,21-trihydroxy-4-pregnene-3,20-dione,
6α,16-difluoro-11β,17α,21-trihydroxy-4-pregnene-3,20-dione,
6α,16-difluoro-11β,17α,21-trihydroxy-1,4-pregnadiene-3,20-dione, 6α-methyl-16-fluoro-11β,17α,21-trihydroxy-4-pregnene-3,20-dione,
6α-methyl-16-fluoro-11β,17α,21-trihydroxy-1,4-pregnadiene-3,20-dione,
2α-methyl-16-fluoro-11β,17α,21-trihydroxy-4-pregnene-3,20-dione,
2-methyl-16-fluoro-11β,17α,21-trihydroxy-1,4-pregnadiene-3,20-dione,
2α-methyl-6α,16-difluoro-11β,17α,21-trihydroxy-4-pregnene-3,20-dione,
2-methyl-6α,16-difluoro-11β,17α,21-trihydroxy-1,4-pregnadiene-3,20-dione,
2α,6α-dimethyl-16-fluoro-11β,17α,21-trihydroxy-4-pregnene-3,20-dione and
2,6α-dimethyl-16-fluoro-11β,17α,21-trihydroxy-1,4-pregnadiene-3,20-dione, disclosed in Example 6; the 16α and 16β epimeric forms of the 21-acetate (or other 21-acylates) of 9α,16-difluoro-11β,17α,21-trihydroxy-4-pregnene-3,20-dione,
6α,9α,16-trifluoro-11β,17α,21-trihydroxy-4-pregnene-3,20-dione,
6α,9α,16-trifluoro-11β,17α,21-trihydroxy-1,4-pregnadiene-3,20-dione,
3,20-dione,
6α-methyl-9α,16-difluoro-11β,17α,21-trihydroxy-4-pregnene-3,20-dione,
6α-methyl-9α,16-difluoro-11β,17α,21-trihydroxy-1,4-pregnadiene-3,20-dione,
2α-methyl-9α,16-difluoro-11β,17α,21-trihydroxy-4-pregnene-3,20-dione,
2-methyl-9α,16-difluoro-11β,17α,21-trihydroxy-1,4-pregnadiene-3,20-dione,
2α-methyl-6α,9α,16-trifluoro-11β,17α,21-trihydroxy-4-pregnene-3,20-dione,
2-methyl-6α,9α,16-trifluoro-11β,17α,21-trihydroxy-1,4-pregnadiene-3,20-dione,
2α,6α-dimethyl-9α,16-difluoro-11β,17α,21-trihydroxy-4-pregnene-3,20-dione,
and 2,6α-dimethyl-9α,16-difluoro-11β,17α,21-trihydroxy-1,4-pregnadiene-3,20-dione, disclosed in Example 10; the 16α and 16β epimeric forms of 16,21-difluoro-11β,17α-dihydroxy-1,4-pregnadiene-3,20-dione,
9α,16,21-trifluoro-11β,17α-dihydroxy-1,4-pregnadiene-3,20-dione,
16,21-difluoro-11β,17α-dihydroxy-4-pregnene-3,20-dione,
6α,16,21-trifluoro-11β,17α-dihydroxy-4-pregnene-3,20-dione,
6α,16,21-trifluoro-11β,17α-dihydroxy-1,4-pregnadiene-3,20-dione,
6α-methyl-16,21-difluoro-11β,17α-dihydroxy-4-pregnene-3,20-dione,
6α-methyl-16,21-difluoro-11β,17α-dihydroxy-1,4-pregnadiene-3,20-dione,
2α-methyl-16,21-difluoro-11β,17α-dihydroxy-4-pregnene-3,20-dione,
2-methyl-16,21-difluoro-11β,17α-dihydroxy-1,4-pregnadiene-3,20-dione,
2α-methyl-6α,16,21-trifluoro-11β,17α-dihydroxy-4-pregnene-3,20-dione,
2-methyl-6α,16,21-trifluoro-11β,17α-dihydroxy-1,4-pregnadiene-3,20-dione,
2α,6α-dimethyl-16,21-difluoro-11β,17α-dihydroxy-4-pregnene-3,20-dione,
2,6α-dimethyl-16,21-difluoro-11β,17α-dihydroxy-1,4-pregnadiene-3,20-dione,
9α,16,21-trifluoro-11β,17α-dihydroxy-4-pregnene-3,20-dione,
6α,9α,16,21-tetrafluoro-11β,17α-dihydroxy-4-pregnene-3,20-dione,
6α,9α,16,21-tetrafluoro-11β,17α-dihydroxy-1,4-pregnadiene-3,20-dione,
6α-methyl-9α,16,21-trifluoro-11β,17α-dihydroxy-4-pregnene-3,20-dione,
6α-methyl-9α,16,21-trifluoro-11β,17α-dihydroxy-1,4-pregnadiene-3,20-dione,
2α-methyl-9α,16,21-trifluoro-11β,17α-dihydroxy-4-pregnene-3,20-dione,
2-methyl-9α,16,21-trifluoro-11β,17α-dihydroxy-1,4-pregnadiene-3,20-dione,
2α-methyl-6α,9α,16,21-tetrafluoro-11β,17α-dihydroxy-4-pregnene-3,20-dione,
2-methyl-6α,9α,16,21-tetrafluoro-11β,17α-dihydroxy-1,4-pregnadiene-3,20-dione,
2α,6α-dimethyl-9α,16,21-trifluoro-11β,17α-dihydroxy-4-pregnene-3,20-dione,
and 2,6α-dimethyl-9α,16,21-trifluoro-11β,17α-dihydroxy-1,4-pregnadiene-3,20-dione, disclosed in Example 14 (or 15) and the 17-acylates thereof disclosed in Example 16; and the 16α and 16β epimeric forms of 16-fluoro-11β,17α,21-trihydroxy-1,4-pregnadiene-3,20-dione 21-phosphate,
9α,16-difluoro-11β,17α,21-trihydroxy-1,4-pregnadiene-3,20-dione 21-phosphate,
16-fluoro-11β,17α,21-trihydroxy-4-pregnene-3,20-dione 21-phosphate,
6α,16-difluoro-11β,17α,21-trihydroxy-4-pregnene-3,20-dione 21-phosphate,
6α,16-difluoro-11β,17α,21-trihydroxy-1,4-pregnadiene-3,20-dione 21-phosphate,
6α-methyl-16-fluoro-11β,17α,21-trihydroxy-4-pregnene-3,20-dione 21-phosphate,
6α-methyl-16-fluoro-11β,17α,21-trihydroxy-1,4-pregnadiene-3,20-dione 21-phosphate,
2α-methyl-16-fluoro-11β,17α,21-trihydroxy-4-pregnene-3,20-dione 21-phosphate,
2-methyl-16-fluoro-11β,17α,21-trihydroxy-1,4-pregnadiene-3,20-dione 21-phosphate,
2α-methyl-6α,16-difluoro-11β,17α,21-trihydroxy-4-pregnene-3,20-dione 21-phosphate,
2-methyl-6α,16-difluoro-11β,17α,21-trihydroxy-1,4-pregnadiene-3,20-dione 21-phosphate,
2α,6α-dimethyl-16-fluoro-11β,17α,21-trihydroxy-4-pregnene-3,20-dione 21-phosphate,
2,6α-dimethyl-16-fluoro-11β,17α,21-trihydroxy-1,4-pregnadiene-3,20-dione 21-phosphate,
9α,16-difluoro-11β,17α,21-trihydroxy-4-pregnene-3,20-dione 21-phosphate,
6α,9α,16-trifluoro-11β,17α,21-trihydroxy-4-pregnene-3,20-dione 21-phosphate,
6α,9α,16-trifluoro-11β,17α,21-trihydroxy-1,4-pregnadiene-3,20-dione 21-phosphate,
6α-methyl-9α,16-difluoro-11β,17α,21-trihydroxy-4-pregnene-3,20-dione 21-phosphate,
6α-methyl-9α,16-difluoro-11β,17α,21-trihydroxy-1,4-pregnadiene-3,20-dione 21-phosphate,
2α-methyl-9α,16-difluoro-11β,17α,21-trihydroxy-4-pregnene-3,20-dione 21-phosphate,
2-methyl-9α,16-difluoro-11β,17α,21-trihydroxy-1,4-pregnadiene-3,20-dione 21-phosphate,
2α-methyl-6α,9α,16-trifluoro-11β,17α,21-trihydroxy-4-pregnene-3,20-dione 21-phosphate,
2-methyl-6α,9α,16-trifluoro-11β,17α,21-trihydroxy-1,4-pregnadiene-3,20-dione 21-phosphate,
2α,6α-dimethyl-9α,16-difluoro-11β,17α,21-trihydroxy-4-pregnene-3,20-dione 21-phosphate,
and 2,6α-dimethyl-9α,16-difluoro-11β,17α,21-trihydroxy-1,4-pregnadiene-3,20-dione 21-phosphate, disclosed in Example 17, is productive of the 16α and 16β epimeric forms of the 21-acetate (or other 21-acylates) of 16-fluoro-17α,21-dihydroxy-4-pregnene-3,11,20-trione, 6α,16-difluoro-17α,21-dihydroxy-4-pregnene-3,11,20-trione,
6α,16-difluoro-17α,21-dihydroxy-1,4-pregnadiene-3,11,20-trione,
6α-methyl-16-fluoro-17α,21-dihydroxy-4-pregnene-3,11,20-trione,
6α-methyl-16-fluoro-17α,21-dihydroxy-1,4-pregnadiene-3,11,20-trione,
2α-methyl-16-fluoro-17α,21-dihydroxy-4-pregnene-3,11,20-trione,
2-methyl-16-fluoro-17α,21-dihydroxy-1,4-pregnadiene-3,11,20-trione,
2α-methyl-6α,16-difluoro-17α,21-dihydroxy-4-pregnene-3,11,20-trione,
2-methyl-6α,16-difluoro-17α,21-dihydroxy-1,4-pregnadiene-3,11,20-trione,
2α,6α-dimethyl-16-fluoro-17α,21-dihydroxy-4-pregnene-3,11,20-trione, and
2,6α-dimethyl-16-fluoro-17α,21-dihydroxy-1,4-pregnadiene-3,11,20-trione;

the 16α and 16β epimeric forms of the 21-acetate (or other 21-acylates) of

9α,16-difluoro-17α,21-dihydroxy-4-pregnene-3,11,20-trione,
6α,9α,16-trifluoro-17α,21-dihydroxy-4-pregnene-3,11,20-trione,
6α,9α,16-trifluoro-17α,21-dihydroxy-1,4-pregnadiene-3,11,20-trione,
6α-methyl-9α,16-difluoro-71α,21-dihydroxy-4-pregnene-3,11,20-trione,
6α-methyl-9α,16-difluoro-17α,21-dihydrovy-1,4-pregnadiene-3,11,20-trione,
2α-methyl-9α,16-difluoro-17α,21-dihydroxy-4-pregnene-3,11,20-trione,
2-methyl-9α,16-difluoro-17α,21-dihydroxy-1,4-pregnadiene-3,11,20-trione,
2α-methyl-6α,9α,16-trifluoro-17α,21-dihydroxy-4-pregnene-3,11,20-trione,
2-methyl-6α,9α,16-trifluoro-17α,21-dihydroxy-1,4-pregnadiene-3,11,20-trione,
2α,6α-dimethyl-9α,16-difluoro-17α,21-dihydroxy-4-pregnene-3,11,20-trione;
and 2,6α-dimethyl-9α,16-difluoro-17α,21-dihydroxy-4-pregnane-3,11,20-trione;

the 16α and 16β epimeric forms of 16,21-difluoro-17α-hydroxy-1,4-pregnadiene-3,11,20-trione,
9α,16-21-trifluoro-17α-hydroxy-1,4-pregnadiene-3,11,20-trione,
16,21-difluoro-17α-hydroxy-4-pregnene-3,11,20-trione,
6α,16,21-trifluoro-17α-hydroxy-4-pregnene-3,11,20-trione,
6α,16,21-trifluoro-17α-hydroxy-1,4-pregnadiene-3,11,20-trione,
6α-methyl-16,21-difluoro-17α-hydroxy-4-pregnene-3,11,20-trione,
6α-methyl-16,21-difluoro-17α-hydroxy-1,4-pregnadiene-3,11,20-trione,
2α-methyl-16,21-difluoro-17α-hydroxy-4-pregnene-3,11,20-trione,
2-methyl-16,21-difluoro-17α-hydroxy-1,4-pregnadiene-3,11,20-trione,
2α-methyl-6α,16,21-trifluoro-17α-hydroxy-4-pregnene-3,11,20-trione,
2-methyl-6α,16,21-trifluoro-17α-hydroxy-1,4-pregnadiene-3,11,20-trione,
2α-methyl-6α,16-difluoro-17α,21-dihydroxy-4-pregnene-3,11,20-trione,
2,6α-dimethyl-16,21-difluoro-17α-hydroxy-1,4-pregnadiene-3,11,20-trione,
9α,16,21-trifluoro-17α-hydroxy-4-pregnene-3,11,20-trione,
6α,9α,16,21-tetrafluoro-17α-hydroxy-4-pregnene-3,11,20-trione,
6α,9α,16,21-tetrafluoro-17α-hydroxy-1,4-pregnadiene-3,11,20-trione,
6α-methyl-9α,16,21-trifluoro-17α-hydroxy-4-pregnene-3,11,20-trione,
6α-methyl-9α,16,21-trifluoro-17α-hydroxy-1,4-pregnadiene-3,11,20-trione,
2α-methyl-9α,16,21-trifluoro-17α-hydroxy-4-pregnene-3,11,20-trione,
2-methyl-9α,16,21-trifluoro-17α-hydroxy-1,4-pregnadiene-3,11,20-trione,
2α-methyl-6α,9α,16-trifluoro-17α,21-dihydroxy-4-pregnene-3,11,20-trione,
2-methyl-6α,9α,16,21-tetrafluoro-17α-hydroxy-1,4-pregnadiene-3,11,20-trione,
2α,6α-dimethyl-9α,16,21-trifluoro-17α-hydroxy-4-pregnene-3,11,20-trione,
2,6α-dimethyl-9α,16,21-trifluoro-17α-hydroxy-1,4-pregnadiene-3,11,20-trione,
and the 17-acylates thereof;

the 16α and 16β epimeric forms of 16-fluoro-17α,21-dihydroxy-1,4-pregnadiene-3,11,20-trione 21-phosphate,
9α,16-difluoro-17α,21-dihydroxy-1,4-pregnadiene-3,11,20-trione 21-phosphate,
16-fluoro-17α,21-dihydroxy-4-pregnene-3,11,20-trione 21-phosphate,
6α,16-difluoro-17α,21-dihydroxy-4-pregnene-3,11,20-trione 21-phosphate,
6α,16-difluoro-17α,21-dihydroxy-1,4-pregnadiene-3,11,20-trione 21-phosphate,
6α-methyl-16-fluoro-17α,21-dihydroxy-4-pregnene-3,11,20-trione 21-phosphate,
6α-methyl-16-fluoro-17α,21-dihyroxy-1,4-pregnadiene-3,11,20-trione 21-phosphate,
2α-methyl-16-fluoro-17α,21-dihydroxy-4-pregnene-3,11,20-trione 21-phosphate,
2-methyl-16-fluoro-17α,21-dihydroxy-1,4-pregnadiene-3,11,20-trione 21-phosphate,
2α-methyl-6α,16-difluoro-17α,21-dihydroxy-4-pregnene-3,11,20-trione 21-phosphate,
2-methyl-6α,16-difluoro-17α,21-dihydroxy-1,4-pregnadiene-3,11,20-trione 21-phosphate,
2α,6α-dimethyl-16-fluoro-17α,21-dihydroxy-4-pregnene-3,11,20-trione 21-phosphate,
2,6α-dimethyl-16-fluoro-17α,21-dihydroxy-1,4-pregnadiene-3,11,20-trione 21-phosphate,
9α,16-difluoro-17α,21-dihydroxy-4-pregnene-3,11,20-trione 21-phosphate,
6α,9α,16-trifluoro-17α,21-dihydroxy-4-pregnene-3,11,20-trione 21-phosphate,
6α,9α,16-trifluoro-17α,21-dihydroxy-1,4-pregnadiene-3,11,20-trione 21-phosphate,
6α-methyl-9α,16-difluoro-17α,21-dihydroxy-4-pregnene-3,11,20-trione 21-phosphate,
6α-methyl-9α,16-difluoro-17α,21-dihydroxy-1,4-pregnadiene-3,11,20-trione 21-phosphate,
2α,methyl-9α,16-difluoro-17α,21-dihydroxy-4-pregnene-3,11,20-trione 21-phosphate,
2-methyl-9α,16-difluoro-17α,21-dihydroxy-1,4-pregnadiene-3,11,20-trione 21-phosphate,
2α-methyl-6α,9α,16-trifluoro-17α,21-dihydroxy-4-pregnene-3,11,20-trione 21-phosphate,
2-methyl-6α,9α,16-trifluoro-17α,21-dihydroxy-1,4-pregnadiene-3,11,20-trione 21-phosphate,
2α,6α-dimethyl-9α,16-difluoro-17α,21-dihydroxy-4-pregnene-3,11,20-trione 21-phosphate,
and 2,6α-dimethyl-9α,16-difluoro-17α,21-dihydroxy-1,4-pregnadiene-3,11,20-trione 21-phosphate, respectively.

The 11-keto-21-acylated steroids described in this example are converted to the corresponding 11-keto-free 21-alcohol steroids by substituting a stoichiometric equivalent amount of the selected 11-keto-21-acylated steroid for 6α,9α-difluoro-11β,17α,21-trihydroxy-4-pregnene-3,20-dione 21-acetate and following the procedure disclosed in Example 5 of U.S. Patent 2,838,499.

The above described 16-fluoro-11-keto compounds possess the same activities as the corresponding 16-fluoro-11β-hydroxy compounds, though to a modified degree.

Example 19

*16-bromo-11β-hydroxy-4,17(20)-pregnadiene-3-one-21-al (21, Q=Br)*

A solution of 1.85 grams of 11β-hydroxy-21-acetoxy-4,16,20-pregnatrien-3-one (20) in 80 ml. of acetone is cooled in an ice bath while a solution of 2.2 g. of N-bromo-acetamide, 2.0 g. of sodium acetate-trihydrate, 2.2 ml. of acetic acid and 40 ml. of water is added dropwise while stirring the reaction mixture. Stirring is continued for 3 hours, after which the acetone is removed by distillation at reduced pressure. Ether is then added and the ether solution washed with sodium bicarbonate solution, dried over sodium sulfate, and the ether removed by distillation at reduced pressure. The residue is crystallized from ethyl acetate-Skellysolve B hexane hydrocarbons to give 16-bromo-11β-hydroxy-4,17(20)-pregnadien-3-one-21-al (22).

In the same manner, reaction of 11β-hydroxy-21-acetoxy-4,16,20-pregnatrien-3-one (20) with a solution of hypochlorous acid or N-chloroacetamide produces 16-chloro - 11β - hydroxy - 4,17(20)-pregnadien-3-one-21-al (21).

Similarly, 16 - bromo - 11β-hydroxy-4,17(20)-pregnadien-3-one-21-al (21) and the corresponding 16-chloro compound are prepared from 11β-hydroxy-21-acyloxy-4,16,20-pregnatrien-3-one (20) wherein, instead of the 21-position being occupied by an acetoxy group, the acyl radical is that of an organic carboxylic acid, particularly a hydrocarbon carboxylic acid of from one to twelve carbon atoms, inclusive, for example, a saturated straight-chain aliphatic acid, e.g., formic, acetic, propionic, butyric, valeric, hexanoic, lauric, a saturated branched-chain aliphatic acid, e.g., trimethylacetic, isobutyric, isovaleric, tertiary butylacetic, a cycloaliphatic saturated acid, e.g., β-cyclopentylpropionic, cyclohexanecarboxylic, cyclohexylacetic, an alkaryl acid, e.g., benzoic, phenylacetic, β-phenylpropionic, o-, m-, p-toluic, a saturated dibasic acid (which can be converted into water-soluble, e.g., sodium, salts), e.g., succinic, adipic, a mono-basic unsaturated acid, e.g., acrylic, crotonic, undecylenic, propiolic, undecolic, cinnamic, dibasic unsaturated acids (which can be converted into water-soluble, e.g., sodium, salts), e.g., maleic and citraconic, or the acid anhydrides and acid halides thereof.

The 16-iodo-11β-hydroxy-4,17(20)-pregnadien-3-one-21-al is prepared by refluxing sodium iodide in admixture with 16-bromo-11β-hydroxy-4,17(20)-pregnadien-3-one-21-al (21) in acetone, precipitating the crude material with water, distilling at reduced pressure and crystallizing the residue from ethyl acetate-Skellysolve B hexane hydrocarbons to yield the purified 16-iodo product.

Example 20

*16-bromo-11β,21-dihydroxy-4,17(20)-pregnadien-3-one (22, Q=Br)*

A solution of 4.08 g. of 16-bromo-11β-hydroxy-4,17(20)-pregnadien-3-one-21-al (21) in 50 ml. of methanol is cooled and to this is added, while stirring, a solution of 400 mg. of sodium borohydride in 5 ml. of water. The solution is stirred at 0° C. for 10 minutes. One ml. of acetic acid is then added, followed by 50 ml. of water. The resulting mixture is concentrated under vacuum to produce a colorless precipitate of 16-bromo-11β,21-dihydroxy-4,17(20)-pregnadien-3-one (22) which is then purified by recrystallization from methanol-water.

Following the same procedure 16-chloro-11β,21-dihydroxy-4,17(20)-pregnadien-3-one is produced from 16-chloro-11β-hydroxy-4,17(20)-pregnadien-3-one-21-al as the starting material.

The 16-iodo-11β,21-dihydroxy-4,17(20)-pregnadien-3-one is prepared in the same manner as the 16-iodo compound of Example 19, substituting for the starting material therein the 16-bromo-11β,21-dihydroxy-4,17(20)-pregnadien-3-one (22).

Treatment of the 16-iodo-11β,21-dihydroxy-4-17(20)-pregnadien-3-one with aqueous silver fluoride solution accompanied by constant stirring for 2 hours is productive of crude 16-fluoro-11β,21-dihydroxy-4,17(20)-pregnadien-3-one, which is then purified chromatographically over Florisil magnesium silicate and the product eluted with methylene chloride containing 4% acetone; recrystallization from ethyl acetate-Skellysolve B hexane hydrocarbons yields the purified final product.

Example 21

*16-bromo-11β-hydroxy-21-acetoxy-4,17(20)-pregnatrien-3-one (23, Q=Br)*

To a solution of 410 mg. of 16-bromo-11β,21-dihydroxy-4,17(20)-pregnadien-3-one dissolved in 5 ml. of pyridine is added 2 ml. of acetic anhydride. The resulting solution is allowed to stand at room temperature for 2 hours and then is diluted with 20 ml. of water. The resulting gummy precipitate is extracted with methylene chloride and the methylene chloride then washed successively with water, dilute hydrochloric acid solution and sodium bicarbonate solution and, finally, is dried over sodium sulfate. Evaporation of the solvent leaves a partially crystalline residue which is recrystallized from ethyl acetate-Skellysolve B hexane hydrocarbons to yield pure 16-bromo-11β-hydroxy-21-acetoxy-4,17(20)-pregnadien-3-one (23).

Following the same procedure as above but starting with 16-chloro-11β,21-dihydroxy-4,17(20)-pregnadien-3-one, there is produced the 16-chloro-11β-hydroxy-21-acetoxy-4,17(20)-pregnadien-3-one.

Similarly, 21-acyloxy derivatives other than 21-acetoxy are prepared by esterification of the 21-hydroxy group of the starting material by reaction with the appropriate esterification agent, e.g., acid anhydride, acid chloride or acid bromide. Examples of such 16-halo-11β-hydroxy-21-acyloxy-4,17(20)-pregnadien-3-ones prepared in this manner include those wherein the acyl group is the acyl radical of, for example, those acids described in Example 19 above.

Example 22

*16-iodo-11β-hydroxy-21-acetoxy-4,17(20)-pregnadien-3-one (23, Q=I)*

To a solution of 450 mg. of 16-bromo-11β-hydroxy-21-acetoxy-4,17(20)-pregnadien-3-one (23) in 25 ml. of acetone is added 800 mg. of sodium iodide and the resulting mixture refluxed for 30 minutes. Water is added to precipitate 475 mg. of crude 16-iodo-11b-hydroxy-21-acetoxy-4,17(20)-pregnadien-3-one as a yellow powder which is removed by filtration and dried at room temperature under vacuum. The crude 16-iodo-11β-hydroxy-21-acetoxy-4,17(20)-pregnadien-3-one is extracted with methylene chloride and chromatographed over Florisil magnesium silicate. Elution with methylene chloride containing 4% acetone and recrystallization from ethyl acetate-Skellysolve B hexane hydrocarbons produces the purified 16 - iodo - 11β - hydroxy - 21-acetoxy-4,17(20)-pregnadien-3-one.

Similarly, substitution for the above starting material of other 21-esters of the 16-bromo compound as in Example 21, such as, for example, those in which the acyl radical is that of an acid as described in Example 19 above, is productive of the corresponding 16-iodo-11β-hydroxy-21-acyloxy-4,17(20)-pregnadien-3-one.

Example 23

16-fluoro-11β-hydroxy-21-acetoxy-4,17(20)-pregnadien-3-one (23, Q=F)

A solution of 475 mg. of 16-iodo-11β-hydroxy-21-acetoxy-4,17(20)-pregnadien-3-one in 75 ml. of acetonitrile maintained at 40° C. is treated, while constantly stirring, with 3 portions of 0.75 ml. each of 50% aqueous silver fluoride solution added at hourly intervals. Stirring is continued for an additional 2 hours. The acetonitrile is then removed by distillation at reduced pressure and the resulting brown residue extracted with methylene chloride and chromatographed over Florisil magnesium silicate. The product, 16-fluoro-11β-hydroxy-21-acetoxy-4,17(20)-pregnadien-3-one, is eluted with methylene chloride containing 4% acetone and purified by recrystallization from ethyl acetate-Skellysolve B hexane hydrocarbons.

Alternatively, 16-bromo-11β-hydroxy-21-acetoxy-4,17(20)-pregnadien-3-one may be treated directly with silver fluoride in acetonitrile, following the foregoing procedure except for the starting material, to give the 16-fluoro-11β-hydroxy-21-acetoxy-4,17(20)-pregnadien-3-one.

In the same manner other 21-esters of the above 16-fluoro compound can be prepared by substitution of the appropriate 16-iodo- or 16-bromo-21-acyloxy compounds wherein the acyl radical is that of, for example, an acid such as those described in Example 19 above.

Example 24

16-bromohydrocortisone acetate (24, Q=Br)

A solution of 451 mg. of 16-bromo-11β-hydroxy-21-acetoxy-4,17(20)-pregnadien-3-one (23) in 25 ml. of tertiary butyl alcohol and 0.5 ml. of pyridine is stirred at room temperature while a solution of 62 mg. of osmium tetroxide in 3 ml. of tertiary butyl alcohol is added. To the resulting mixture is then added a solution containing 93 mg. of hydrogen peroxide in 2 ml. of tertiary butyl alcohol. After stirring for 1 hour, the reaction mixture no longer gives a positive test for hydrogen peroxide with acidified starch-iodide paper. At this time, water is added and the mixture is concentrated at reduced pressure to remove the tertiary butyl alcohol. The product is extracted with methylene chloride, and the extracts are washed with dilute hydrochloric acid and water and dried over sodium sulfate. The dried methylene chloride solution is then chromatographed over Florisil magnesium silicate and the product, 16-bromohydrocortisone acetate, is eluted from the column with methylene chloride containing 7% acetone. On recrystallization from acetone, 16-bromohydrocortisone acetate of high purity is obtained.

Substitution of other 16-bromo-11β-hydroxy-21-acyloxy-4,17(20)-pregnadien-3-ones for the 21-acetate employed above and produced as in Example 23, wherein the acyl group is the acyl radical of an acid, such as, for example, those acids described in Example 19, is productive of the corresponding 21-esters of 16-bromohydrocortisone.

Example 25

16-chlorohydrocortisone acetate (24, Q=Cl)

Following the procedure of Example 24, but substituting an equivalent weight of 16-chloro-11β-hydroxy-21-acetoxy-4,17(20)-pregnadien-3-one for the corresponding 16-bromo compound employed therein, there is produced the 16-chlorohydrocortisone acetate.

Substitution of other 16-chloro-11β-hydroxy-21-acyloxy-4,17(20)-pregnadien-3-ones for the 21-acetate of the present example, wherein the acyl group is the acyl radical of an acid and produced as in Example 24, such as, for example, those acids indicated in Example 19, is productive of the corresponding 21-esters of 16-chlorohydrocortisone.

Example 26

16-fluorohydrocortisone acetate (24, Q=F)

A solution of 390 mg. of 16-fluoro-11β-hydroxy-21-acetoxy-4,17(20)-pregnadien-3-one in 25 ml. of tertiary butyl alcohol and 0.5 ml. of pyridine is stirred at room temperature. To this is added a solution of 62 mg. of osmium tetroxide in 3 ml. of tertiary butyl alcohol and a solution of 93 mg. of hydrogen peroxide in 2 ml. of tertiary butyl alcohol. The mixture is stirred for 1 hour, then concentrated at reduced pressure to a volume of 10 ml., at which time 30 ml. of water is slowly added. The resulting mixture containing a crystalline precipitate is refrigerated for 3 hours and then filtered. The precipitate is washed with water and dried under vacuum. Recrystallization from acetone gives 16-fluorohydrocortisone acetate of high purity.

Where the 21-acyloxy radical has been modified from the acetoxy group as related in Example 22, the corresponding 16-fluoro-21-acyloxy-hydrocortisone is obtained from the procedure of the present example.

Substitution of other 16-fluoro-11β-hydroxy-21-acyloxy-4,17(20)-pregnadien-3-ones for the 21-acetate employed above, wherein the acyl group is the acyl radical of an acid, such as, for example, those indicated in Example 19, is productive of the corresponding 21-esters of 16-fluorohydrocortisone.

Example 27

16-fluorohydrocortisone acetate (24, Q=F)

A mixture of 700 mg. of 16-bromohydrocortisone acetate and 800 mg. of sodium iodide in 25 ml. of acetone is refluxed for 30 minutes, after which water is added slowly to precipitate crude 16-iodohydrocortisone acetate as a pale yellow solid. This precipitate is filtered, washed with water and dried at room temperature under vacuum. Without further purification the crude 16-iodohydrocortisone acetate is dissolved in 75 ml. of acetonitrile at 40° C. and 0.75 ml. of 50% aqueous silver fluoride solution is added. The mixture is stirred in the dark for 1 hour, at which time a second 0.75 ml. portion of aqueous silver fluoride is added, followed in 1 hour by a third portion of the same amount of silver fluoride, the mixture being stirred constantly and protected from the light. Stirring is continued for an additional 2½ hours, the mixture being kept in the dark and maintained at 40° C. during this period. The acetonitrile is then removed by distillation at reduced pressure, and the dark brown residue is extracted with methylene chloride, filtered to remove silver salts and chromatographed over Florisil magnesium silicate. The material eluted from the column with methylene chloride containing 7% acetone is recrystallized from acetone to give 16-fluorohydrocortisone acetate of high purity.

Example 28

16-iodohydrocortisone acetate (24, Q=I)

A mixture of 700 mg. of 16-bromohydrocortisone acetate and 800 mg. of sodium iodide in 25 ml. of acetone is refluxed for 30 minutes. Crude 16-iodohydrocortisone acetate precipitates as a pale yellow solid by slow addition of water to the refluxed product. The precipitate is filtered, washed with water and recrystallized from ethyl acetate-Skellysolve B hexane hydrocarbons to give pure 16-iodohydrocortisone acetate.

Substitution of other 21-esters of 16-bromohydrocortisone for the 16-bromohydrocortisone acetate employed above, in which the acyl group is the acyl radical of an acid, such as, for example, those acids indicated in Example 19, is productive of the corresponding 21-esters of 16-iodohydrocortisone.

Example 29

16-bromohydrocortisone (25, Q=Br)

A solution of 483 mg. of 16-bromohydrocortisone acetate in 25 ml. of methanol is treated with 3 ml. of 2 N sulfuric acid and allowed to stand at room temperature overnight. Water is added and a portion of the methanol is removed by distillation at reduced pressure to produce a crystalline precipitate of 16-bromohydrocortisone which is purified by recrystallization from acetone.

In the same manner other 21-esters of 16-bromohydrocortisone, such as, for example, those in which the acyl group is the acyl radical of an acid as indicated in Example 20, may be hydrolyzed to yield the 16-bromohydrocortisone.

Example 30

16-chlorohydrocortisone (25, Q=Cl)

Following the procedure of Example 29, but substituting an equivalent weight of 16-chlorohydrocortisone acetate for the 16-bromohydrocortisone acetate employed therein, there is produced the 16-chlorohydrocortisone.

In the same manner other 21-esters of 16-chlorohydrocortisone, such as, for example, those in which the acyl group is the acyl radical of an acid as indicated in Example 19, may be hydrolyzed to yield 16-chlorohydrocortisone.

Example 31

16-fluorohydrocortisone (25, Q=F)

A solution of 422 mg. of 16-fluorohydrocortisone acetate in 100 ml. of methanol is freed of dissolved air by bubbling nitrogen through it for 10 minutes. To this solution is added a solution of 400 mg. of potassium bicarbonate in 40 ml. of water similarly freed of dissolved air. The resulting solution is stirred at room temperature in a nitrogen atmosphere for 6 hours after which a solution of 1 ml. of acetic acid in 60 ml. of ice water is added. The mixture is concentrated at reduced pressure until precipitation of the product occurred. The mixture is refrigerated for 4 hours, the product is filtered, washed with water, and dried under vacuum. The resulting crude 16-fluorohydrocortisone is purified by recrystallization from acetone.

In the same manner other 21-esters of 16-fluoro-hydrocortisone, such as, for example, those in which the acyl group is the acyl radical of an acid as indicated in Example 19, may be hydrolyzed to give the 16-fluorohydrocortisone.

Example 32

16-iodohydrocortisone (25, Q=Cl)

Following the procedure of Example 29, but substituting an equivalent weight of 16-iodohydrocortisone acetate for the 16-bromohydrocortisone acetate employed therein, there is produced the 16-iodohydrocortisone.

Similarly, other 21-esters of 16-iodohydrocortisone, such as, for example, those in which the acyl group is the acyl radical of an acid as indicated in Example 19, may be hydrolyzed to give the 16-iodohydrocortisone.

Example 33

16-fluoro-1-dehydrohydrocortisone (26, Q=F)

Six 100-ml. portions of a medium containing 1% glucose, 2% corn steep liquor (60% solids) and tap water is adjusted to pH 4.9 in 250-ml Erlenmeyer flasks. The medium is sterilized and then inoculated with a 1 to 2 day growth of *Septomyxa affinis*, more particularly identified as *Septomyxa affinis* (Sherb.) Wr., American Type Culture Collection 6737. The flasks are shaken at room temperature for 3 days. At the end of this period, the 600-ml. volume is used as an inoculum for 10 l. of the same glucose-corn steep liquor medium which in addition contained 10 ml. of an antifoaming agent (a mixture of lard oil and octadecanol). The medium is stirred (300 r.p.m.) at 28° C. and aerated (0.5 l. air/10 l. of medium) for 17 hours. At this time, 2 g. of 16-fluoro-hydrocortisone and 1 g. of 3-ketobisnor-4-cholen-22-al, dissolved in 115 ml. of dimethylformamide, is added and the incubation continued at the same temperature and aeration rate for 24 hours to accomplish dehydrogenation at the 1–2 position. The mycelium is then filtered off and the steroidal material extracted from the filtrate with methylene chloride. The methylene chloride extracts are concentrated to approximately 100 ml. and chromatographed over 200 g. of Florisil magnesium silicate. Elution with Skellysolve B hexane hydrocarbons-acetone (7:3) gives material which on recrystallization from acetone yields 16-fluoro-1-dehydrocortisone of high purity.

Example 34

16-bromo-1-dehydrohydrocortisone (26, Q=F)

Following exactly the procedure of Example 33 but substituting 16-bromohydrocortisone for the 16-fluorohydrocortisosne employed therein is productive of the 16-bromo-1-dehydrohydrocortisone.

In the same manner the 16-chloro-1-dehydrohydrocortisone and the 16-iodo-1-dehydrohydrocortisone are prepared by substituting for the starting material the 16-chlorohydrocortisone and 16-iodohydrocortisone, respectively.

Example 35

Tablet containing 16α-fluoro-11β,17α,21-trihydroxy-1,4-pregnadiene-3,20-dione 21-acetate A batch of 10,000 compressed tablets, each containing 1 mg. of 16α-fluoro-11β,17α,21-trihydroxy-1,4-pregnadiene-3,20-dione 21-acetate, is prepared from the following ingredients:

16α - fluoro - 11β,17α,21 - trihydroxy - 1,4 - pregnadiene-3,20-dione 21-acetate _____gm__ 10
Lactose _____gm__ 2000

The finely powdered steroid and lactose are thoroughly mixed and granulated with syrup-starch paste. Starch and calcium stearate are used as lubricants in the formation of the compressed tablets in the usual way.

Tablets containing 1 mg. of 16α-fluoro-11β,17α,21-trihydroxy-1,4-pregnadiene-3,20-dione 21-aceate are useful in the treatment of inflammatory conditions of the skin, eyes, and ears of humans and valuable domestic animals. A suitable dosage is 1 tablet given 1 to 3 times daily.

Similarly, 9α,16β- and 9α,16α-difluoro-11β,17α,21-trihydroxy-1,4-pregnadiene-3,20-dione 21-acetate can be substituted for the steroid ingredient in the above composition.

Similarly, the other 16-fluoro steroids produced as products in Examples 6, 10, 11, 14 (or 15), 16, 17, and 18 can be substituted for the active ingredient of the tablet of Example 35.

Example 36

6α-methyl-11β,16α,21-trihydroxy-4,17(20)-pregnadien-3-one 21-acetate

A mixture of 167 g. (0.432 mole) of 6α-methyl-11β,21-dihydroxy-4,17(20)-pregnadien-3-one 21-acetate, 46.7 g. of selenium dioxide, 2500 ml. of dioxane and 584 ml. of water was heated at reflux for approximately one hour with stirring. The thus-obtained reaction mixture comprising 6α-methyl-11β,16α,21-trihydroxy-4,17(20)-pregnadien-3-one 21-acetate was then cooled to room temperature. 80 g. of Magnesol (synthetic magnesium silicate) was added to the cooled reaction mixture, stirred for about 15 minutes and separated by filtration. The filtrate was diluted with water and extracted with methylene chloride followed by drying of the extract over anhydrous sodium sulfate. The dried extract was then evaporated to a viscous oil, taken up in methylene chloride, and poured onto a 4 kg. Florisil (synthetic magnesium silicate) chromatographic column packed wet in commercial hexanes.

The chromatographic column was developed by eluting with commercial hexanes containing increasing amounts of acetone. The eluate fractions were freed of solvent and those fractions eluted with commercial hexanes containing 15 and 25% acetone were combined and recrystallized from acetone-commercial hexanes to yield 99.8 g. of a material melting in the range of 174–181° C. Two recrystallizations of a portion of this material from acetone yielded prisms of 6α-methyl-11β,16α,21-trihydroxy-4,17(20)-pregnadien-3-one 21-acetate having a melting point of 176–180° C. and the following analysis:

Analysis.—Calcd. for $C_{24}H_{34}O_5$: C, 71.61; H, 8.51. Found: C, 71.22; H, 9.05.

EXAMPLE 37

*20α-chloro-6α-methyl-11β,21-dihydroxy-4,16-pregnadien-3-one 21-acetate*

To a stirred mixture of 50.0 g. (0.124 mole) of 6α-methyl-11β,16α,21-trihydroxy-4,17(20)-pregnadien-3-one 21-acetate, 5 l. of methylene chloride and 28 g. of tri-n-butylamine at approximately 0° C. there was added over a 5 minute period, with continuous stirring, a solution of 20 g. of thionyl chloride dissolved in 250 ml. of cold methylene chloride whilst maintaining the reaction temperature at about 0° C. The thus-obtained reaction mixture comprising the 20α- and 20β-epimeric forms of 20-chloro - 6α - methyl - 11β,21-dihydroxy-4,16-pregnadiene-3,20-dione 21-acetate was stirred for one hour at about 0° C. followed by washing successively with 1540 ml. of 0.1 N hydrochloric acid and water. The washed reaction mixture was then dried over anhydrous sodium sulfate and evaporated to dryness leaving a crude residue. The crude residue was then taken up in methylene chloride and poured onto a 1 kg. Florisil chromatographic column packed wet in commercial hexanes. The chromatographic column was developed by eluting with commercial hexanes containing increasing amounts of acetone. The eluate fractions were freed of solvent and those fractions eluted with commercial hexanes containing 10% acetone were combined and recrystallized from acetone-commercial hexanes to yield 32.65 g. of material having a melting point of 160–164° C. A further recrystallization of a portion of this material from acetone yielded crystalline plates of 20α-chloro-6α-methyl - 11β,21 - dihydroxy-4,16-pregnadien-3-one 21-acetate having a melting point of 161–163° C., $[\alpha]_D+106$ (CHCl$_3$), $$\lambda_{max}^{alc.}\ 241.5\ m\mu\ (\epsilon 15{,}650)$$

and the following analysis:

Analysis.—Calcd. for $C_{24}H_{33}O_4Cl$: C, 68.47; H, 7.90; Cl, 8.42. Found: C, 68.71; H, 7.82; Cl, 8.66.

20β-chloro-6α-methyl-11β,21-dihydroxy - 4,16 - pregnadien-3-one 21-acetate is present in the mother liquors and can be recovered by further chromatography or countercurrent extraction, followed by crystallization.

The mixture of the 20α and 20β epimeric forms of the 20-chloro compounds described in this example can be used in Example 38 without further treatment.

EXAMPLE 38

*6α-methyl-11β-hydroxy-20β,21-epoxy-4,16-pregnadien-3-one*

To a mixture of 68.4 g. (0.162 mole) of 20-chloro-6α-methyl-11β,21-dihydroxy-4,16 - pregnadien-3-one 21-acetate and 3420 ml. of methanol cooled in an ice-bath to 5 C. there was added with stirring 136 ml. of 10% aqueous sodium hydroxide. Stirring was continued for about 30 minutes whilst maintaining the temperature of the reaction mixture at about 5 to 10° C. Following the addition of 5 l. of water, the reaction mixture was filtered and the product collected, washed with water and dried to yield 51.5 g. of a crude mixture comprising 6α-methyl-11β-hydroxy-20α,21-epoxy- and 6α - methyl - 11β - hydroxy-20β,21-epoxy-4,16-pregnadien-3-one having a melting point of 137–144° C. Recrystallization from acetone-commercial hexanes gave fluffy needles of 6α-methyl-11β-hydroxy-20β,21-epoxy-4,16-pregnadien - 3 - one having a melting point of 142–144° C., $[\alpha]_D+176°$ (CHCl$_3$) and the following analysis:

Analysis.—Calcd. for $C_{22}H_{30}O_3$: C, 77.15; H, 8.83. Found: C, 77.00; H, 9.24.

6α-methyl-11β-hydroxy-20α,21-epoxy-4,16-pregnadien-3-one is present in the mother liquor and can be recovered by chromatography or countercurrent extraction followed by crystallization.

EXAMPLE 39

*16β-fluoro- and 16α-fluoro-6α-methyl-11β,21 - dihydroxy-4,17(20)-pregnadien-3-one 21-acetate and 20β-fluoro- and 20α-fluoro-6α-methyl-11β,21-dihydroxy - 4,16-pregnadien-3-one 21-acetate*

To 91 g. of anhydrous hydrogen fluoride contained in a polyethylene bottle and cooled by means of a Dry-Ice bath to −10° C. there was added, with swirling, 50 ml. of methylene chloride and 164 ml. of tetrahydrofuran, both precooled to about −10° C. A solution of 42.5 g. (0.124 mole) of 20β,21-epoxy-6α-methyl-11β-hydroxy-4,16-pregnadien-3-one dissolved in 630 ml. of methylene chloride, which had previously been cooled to about −10° C. was poured into the methylene chloride-tetrahydrofuran-hydrogen fluoride solution. The thus-obtained reaction mixture was swirled, kept at 0 to 5° C. for 4 hours and then poured slowly, with stirring, into a solution of 364 g. of potassium carbonate dissolved in 2400 ml. of water. Upon standing phase separation into an aqueous and an organic (methylene chloride) phase occurred. The organic (methylene chloride) phase was separated with the aid of additional methylene chloride, washed with water, dried over anhydrous sodium sulfate, and evaporated to give a residue. To the thus-obtained residue there was then added 50 ml. of acetic anhydride and 50 ml. of pyridine and this acetylation reaction mixture was allowed to stand for about 15 hours. The acetylation reaction mixture was then diluted with ice water and the sticky solid, comprising a mixture of 16β-fluoro- and 16α-fluoro-6α-methyl-11β,21-dihydroxy-4,17(20) - pregnadien-3-one 21-acetate and 20β-fluoro- and 20α-fluoro-6α-methyl-11β,21-dihydroxy-4,16-pregnadien - 3 - one 21-acetate, was collected by filtration and allowed to air dry. The resulting solid was then taken up in methylene chlorine and poured onto a 3 kg. Florisil chromatographic column packed wet in commercial hexanes. The chromatographic column was developed by eluting with 56 l. of 7.5% acetone-92.5% commercial hexanes, 100 l. of 10% acetone-90% commercial hexanes and 8 l. of acetone. The eluate was collected in 4 l. fractions and those fractions which papergram analysis showed to contain the 20α-fluoro, 20β-fluoro, 16α-fluoro and 16β-fluoro compounds were evaporated to dryness and combined to yield 17.3 g. of a partly crystalline mixture comprising 20β-fluoro- and 20α-fluoro-6α-methyl-11β,21-dihydroxy-4,16-pregnadien - 3 - one 21-acetate and 16β-fluoro- and 16α-fluoro-6α-methyl-11β,21-dihydroxy-4,17(20)-pregnadien-3-one 21-acetate, the 16-fluoro compounds predominating. A portion of the mixture was recrystallized three times from acetone-commercial hexanes to give crystalline plates of 16α-fluoro-6α-methyl-11β,21-dihydroxy - 4,17(20)-pregnadien-3-one 21-acetate having a melting point of 137–138° C., $[\alpha]_D+88°$ (CHCl$_3$), $$\lambda_{max}^{alc.}\ 241.5\ m\mu\ (\epsilon 15{,}400)$$

and the following analysis:

Analysis.—Calcd. for $C_{24}H_{34}O_4F$: C, 71.08; H, 8.45; F, 4.69. Found: C, 71.49; H, 8.66; F, 4.67.

16β-fluoro-6α-methyl - 11β,21 - dihydroxy - 4,17(20)-pregnadien-3-one 21-acetate and 20β-fluoro- and 20α-fluoro-6α-methyl-11β,21-dihydroxy-4,16-pregnadien-3-one 21-acetate are present in the mother liquors following the crystallization and can be recovered by further chromatography and/or crystallization.

EXAMPLE 40

*16α-fluoro-6α-methyl-11β,21-dihydroxy-1,4,17(20)-pregnadien-3-one 21-acetate*

A mixture of 16.7 g. (0.041 mole) of the crude mixture comprising 16β-fluoro- and 16α-fluoro-6α-methyl-11β,21-dihydroxy-4,17(20)-pregnadien-3-one 21-acetate and 20β-fluoro- and 20α-fluoro-6α-methyl-11β,21-dihydroxy-4,16-pregnadien-3-one 21-acetate, obtained in Example 39, 8.0 g. of dry selenium dioxide, 500 ml. of tertiary butanol, and 3 ml. of pyridine was stirred while heating under reflux for 20 hours. The thus-obtained reaction mixture was filtered through Celite (a diatomaceous earth filtering aid) and the filtrate obtained was evaporated at reduced pressure giving a crude residue. The thus obtained crude residue was taken up in methylene chloride and poured onto a 1.5 kg. Florisil chromatographic column. The chromatographic column was developed by eluting with 8% acetone-, 10% acetone- and 15% acetone-commercial hexanes mixtures. The eluate fractions were freed of solvent and those fractions which papergram analysis showed to contain mostly 16β-fluoro- and 16α-fluoro-6α-methyl-11β,21-dihydroxy-1,4,17(20)-pregnatrien-3-one 21-acetate were combined to give 13.04 g. of material which was taken up in methylene chloride and poured onto a second Florisil (650 g.) chromatographic column packed wet in commercial hexanes. The second column was then eluted with 10% acetone-90% commercial hexanes. The eluate fractions were freed of solvent and combined to yield 8.2 g. of a gummy product (a mixture comprising 16β-fluoro- and 16α-fluoro-6α-methyl - 11β,21 - dihydroxy - 1,4,17(20)-pregnatrien-3-one 21-acetate which is substantially free of 20β-fluoro- and 20α-fluoro-6α-methyl-11β,21-dihydroxy-1,4,16-pregnatrien-3-one 21-acetate, as shown by papergram analysis). The gummy product was used without further purification in the next example (Example 41).

A crystalline mixture comprising 16β-fluoro- and 16α-fluoro-6α-methyl-11β,21-dihydroxy - 1,4,17(20) - pregnadien-3-one 21-acetate was obtained from chromatogram fractions as recovered starting material following the osmium tetroxide reaction described in the succeeding example (Example 41). Recrystallization of the said crystalline material from acetone-commercial hexanes yielded crystalline shiny plates of 16α-fluoro-6α-methyl-11β,21-dihydroxy-1,4,17(20)-pregnatrien-3-one 21-acetate having a melting point of 162–163° C., $[\alpha]_D$ +50° (CHCl$_3$), $$\lambda^{alc.}_{max.}\ 242\ m\mu\ (\epsilon\ 15,250)$$

and the following analysis:

*Analysis.*—Calcd. for C$_{24}$H$_{31}$O$_4$F: C, 71.61; H, 7.76; F, 4.72. Found: C, 71.78; H, 8.01; F, 4.73.

16β-fluoro-6α-methyl-11β,21 - dihydroxy - 1,4,17(20)-pregnatrien-3-one 21-acetate is present in the mother liquor and can be recovered by further chromatography and/or crystallization.

EXAMPLE 41

*16α-fluoro-6α-methyl-11β,17α,21-trihydroxy-1,4-pregnadiene-3,20-dione 21-acetate*

9.5 g. (0.0236 mole) of the gummy product (the mixture comprising substantially 16β-fluoro- and 16α-fluoro-6α-methyl-11β,21-dihydroxy-1,4,17(20) - pregnatrien - 3-one 21-acetate), obtained from the second chromatographic column according to the procedure of Example 41, 170 ml. of tertiary butanol, 10 ml. of pyridine, 27.6 ml. of a tertiary butanol solution of N-methylmorpholine oxide hydrogen peroxide (titration 42.9 ml. 0.1 N sodium thiosulfate per ml.) and 190 mg. of osmium tetroxide were stirred for about 18 hours at about 28° C. There was then added to the reaction mixture a solution of 1.5 g. of sodium hydrosulfite dissolved in 100 ml. of water, which gave a dark solution. The thus-obtained dark solution was then concentrated to ½ volume and extracted with methylene chloride. The methylene chloride extract was then dried over anhydrous sodium sulfate and evaporated to dryness to yield a gummy residue. The thus-obtained gummy residue was taken up in methylene chloride and poured onto a 500 g. Florisil chromatographic column packed wet in commercial hexanes. The chromatographic column was developed by eluting with commercial hexanes containing increasing amounts of acetone. The eluate fractions were freed of solvent and analyzed by paper chromatography. The first fractions eluted with 10% acetone-90% commercial hexanes were combined and yielded 4.06 g. of starting material (16β-fluoro- and 16α-fluoro-6α-methyl-11β,21-dihydroxy-1,4,17(20)-pregnatrien-3-one 21-acetate). The later fractions eluted with 10% acetone-90% commercial hexanes and those fractions eluted with 15% acetone-85% commercial hexanes were combined to yield 1.388 g. of a mixture comprising 16β-fluoro- and 16α-fluoro-6α-methyl-11β,17α,21-trihydroxy-1,4 - pregnadiene - 3,20 - dione 21 - acetate which was rechromatographed in the same manner, using a 100 g. Florisil chromatographic column to yield, as determined by papergram analysis, an additional 219 mg. of starting material (16β-fluoro- and 16α-fluoro-6α-methyl-11β,21-dihydroxy-1,4,17(20)-pregnatrien-3-one 21-acetate), 116 mg. of a mixture comprising 16α-fluoro-6α-methyl-11β,17α,21-trihydroxy-1,4-pregnadiene-3,20-dione 21-acetate and 16β-fluoro- and 16α-fluoro-6α-methyl-11β,21-dihydroxy-1,4,17(20)-pregnatrien-3-one 21 - acetate, 153 mg. of crude 16α-fluoro-6α-methyl-11β,17α,21-trihydroxy-1,4-pregnadiene-3,20 dione 21-acetate, and 600 mg. of a mixture comprising 16α-fluoro- and 16β-fluoro-6α-methyl-11β,17α,21-trihydroxy-1,4-pregnadiene-3,20-dione 21-acetate.

The 153 mg. portion of crude 16α-fluoro-6α-methyl-11β,17α,21-trihydroxy-1,4-pregnadien-3,20-dione 21-acetate was crystallized by trituration with anhydrous ether to yield 90 mg. of 16α-fluoro-6α-methyl-11β,17α,21-trihydroxy-1,4-pregnadiene-3,20-dione 21-acetate having a melting point of 214–217° C.

After recycling the recovered starting material three times in the above manner there was obtained a total of 0.52 g. of crystalline 16α-fluoro-6α-methyl-11β,17α,21-trihydroxy-1,4-pregnadiene-3,20-dione 21-acetate, a sample of which was recrystallized from ether to yield hard prisms of 16α-fluoro-6α-methyl-11β,17α,21-trihydroxy-1,4-pregnadiene-3,20-dione 21-acetate having a melting point of 218–220° C., $$\lambda^{alc.}_{max}\ 242\ m\mu\ (\epsilon\ 14,800)$$

and the following analysis:

*Analysis.*—Calcd. for C$_{24}$H$_{31}$O$_6$F: C, 66.34; H, 7.19; F, 4.37. Found: C, 65.99; H, 7.20; F, 4.59.

16β-fluoro-6α-methyl-11β,17α,21-trihydroxy-1,4 - pregnadiene-3,20-dione 21-acetate present in the 600 mg. portion can be obtained by further chromatography or countercurrent extraction followed by crystallization.

A part of the 4.06 g. portion recovered as starting material was recrystallized from acetone-commercial hexanes and yielded crystalline shiny plates of 16α-fluoro-6α-methyl-11β,21-dihydroxy-1,4,17(20)-pregnatrien-3-one 21-acetate having a melting point of 162–163° C., $[\alpha]_D$ +50° (CHCl$_3$), $$\lambda^{alc.}_{max.}\ 242\ m\mu\ (\epsilon\ 15,250)$$

and the following analysis:

*Analysis.*—Calcd. for C$_{24}$H$_{31}$O$_4$: C, 71.61; H, 7.76; F, 4.72. Found: C, 71.78; H, 8.01; F, 4.73.

16β-fluoro-6α-methyl-11β,21 - dihydroxy - 1,4,17(20)-pregnatrien-3-one 21-acetate is present in the mother liquors and can be recovered by further chromatography and/or crystallization.

16α-fluoro-6α-methyl-11β,17α,21-trihydroxy-1,4 - pregnadiene-3,20-dione 21-acetate has been found to exhibit 20 times the anti-inflammatory and 25 times the glucocorticoid activity of hydrocortisone. In addition, this compound exhibits favorable mineralocorticoid activity

Example 42

16α-fluoro-6α-methyl-11β,17α,21-trihydroxy-1,4-pregnadiene-3,20-dione

A solution of 250 mg. of potassium bicarbonate in 5 ml. of water is purged of oxygen with a stream of nitrogen and added to a stirred oxygen free solution of 500 mg. of 16α - fluoro - 6α-methyl-11β,17α,21-trihydroxy-1,4-pregnadiene-3,20-dione 21-acetate in 30 ml. of methanol. After allowing the reaction mixture to stand 5 hours, a solution of 0.5 ml. of acetic acid in 100 ml. of water is added and the thus obtained acidified mixture is concentrated at reduced pressure to approximately 80 ml. The precipitated product is then collected on a filter, washed with water, dried over anhydrous sodium sulfate and recrystallized from acetone-commercial hexanes to yield 16α - fluoro-6α-methyl-11β,17α,21-trihydroxy-1,4-pregnadiene-3,20-dione, a crystalline solid.

In the same manner substituting 16β-fluoro-6α-methyl-11β,17α,21 - trihydroxy - 1,4-pregnadiene-3,20-dione 21-acetate for 16α-fluoro-6α-methyl-11β,17α,21-trihydroxy-1,4-pregnadiene-3,20-dione 21-acetate is productive of 16β-fluoro-6α-methyl-11β,17α,21 - trihydroxy - 1,4,- pregnadiene-3,20-dione, a crystalline solid.

Example 43

16α-fluoro-6α-methyl-11β,17α,21-trihydroxy-1,4-pregnadiene-3,20-dione 21-hemisuccinate To a solution of 1.0 g. of 16α-fluoro-6α-methyl-11β,17α,21-trihydroxy-1,4-pregnadiene-3,20-dione in 10 ml. of pyridine there is added 1.0 g. of succinic anhydride. The reaction mixture is swirled until all solids are dissolved and then allowed to stand at room temperature for about 40 hours. The reaction mixture is then poured, with stirring, into 200 ml. of 0.5 N hydrochloric acid and ice, allowed to stand for 15–20 minutes, filtered, and the cake obtained is washed several times with water and dried under vacuum to give a crude residue. The crude residue is crystallized from acetone to yield 16α-fluoro-6α-methyl-11β,17α,21-trihydroxy-1,4-pregnadiene-3,20 - dione 21-hemisuccinate, a crystalline solid.

Other 21-acylates are prepared by allowing 16α-fluoro-6α-methyl-11β,17α,21-trihydroxy-1,4 - pregnadiene - 3,20-dione to react with the selected organic carboxylic acid, preferably a hydrocarbon carboxylic acid containing from 1 to 12 carbon atoms, inclusive, or the anhydrides or acyl halides thereof, for example those listed above. Illustrative of the compounds thus produced are the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21 - cyclohexanecarboxylate, the 21 - cyclohexylacetate, the 21-benzoate, the 21-phenylacetate, the 21-(β-phenylpropionate), the 21-(o-, m-, p-toluate), the 21-hemiadipate, the 21-acrylate, the 21-crotonate, the 21-propiolate, the 21-(2-butynoate), the 21-undecolate, the 21-cinnamate, the 21-maleate, the 21-citraconate, and the like of 16α-fluoro-6α-methyl-11β,17α,21 - trihydroxy - 1,4-pregnadiene-3,20-dione.

If the corresponding acylating agent is solid an inert solvent such as toluene, xylene, or dioxane can be added to effect solution and to provide a liquid esterification medium.

If the esterifying agent is the free acid, the reaction is carried out in the presence of an esterification catalyst.

In the same manner substituting 16β-fluoro-6α-methyl-11β,17α,21-trihydroxy - 1,4 - pregnadiene - 3,20-dione for 16α-fluoro-6α-methyl-11β,17α,21 - trihydroxy - 1,4-pregnadiene-3,20-dione is productive of the corresponding 21-hemisuccinate (and other 21-acylates) of 16β-fluoro-6α-methyl-11β,17α,21-trihydroxy-1,4-pregnadiene-3,20-dione.

Example 43A

Sodium salt of 16α-fluoro-6α-methyl-11β,17α,21-trihydroxy-1,4-pregnadiene-3,20-dione 21-hemisuccinate The crystalline acid, 16α-fluoro-6α-methyl-11β,17α,21-trihydroxy - 1,4-pregnadiene-3,20-dione 21-hemisuccinate, obtained in Example 43, is dissolved in 25 ml. of acetone and filtered through a medium porosity glass filter. To the thus-obtained solution there is added a filtered aqueous solution of exactly one equivalent of sodium bicarbonate. The resulting solution is concentrated under house vacuum to remove the acetone and lyophilized under high vacuum to yield the sodium salt of 16α - fluoro-6α-methyl-11β,17α,21-trihydroxy-1,4-pregnadiene-3,20-dione 21-hemisuccinate, a fluffy white solid.

In the same manner substituting 16-β-fluoro-6α-methyl-11β,17α,21 - trihydroxy - 1,4-pragnadiene-3,20-dione 21-hemisuccinate for 16α-fluoro-6α-methyl-11β,17α,21-trihydroxy - 1,4-pregnadiene-3,20-dione 21-hemisuccinate is productive of the sodium salt of 16β-fluoro-6α-methyl-11β,17α,21 - trihydroxy-1,4-pregnadiene-3,20-dione 21-hemisuccinate.

Example 44

16α-fluoro-6α-methyl-17α,21-dihydroxy-1,4,9(11)-pregnatriene-3,20-dione 21-acetate To a stirred solution of 0.45 g. (0.001039 mole) of 16α-fluoro - 6α - methyl - 11β,17α,21 - trihydroxy-1,4-pregnadiene-3,20-dione 21-acetate in 6 ml. of pyridine there was added 0.20 g. (0.00176 mole) of N-bromoacetamide. The thus-obtained reaction mixture was stirred for about 18 minutes, cooled to 10° C. and saturated with sulfur dioxide by passing a stream of the gas on the surface of the stirred reaction mixture. 100 ml. of water was added and a near-white precipitate was obtained which was collected on a filter, washed with water and air dried to yield 0.43 g. of crude material. The thus-obtained crude material was taken up in methylene chloride and poured onto a 25 g. Florisil chromatographic column packed wet in commercial hexanes. The chromatographic column was developed by eluting with commercial hexanes containing increasing amounts of acetone. The eluate fractions were freed of solvent and those fractions eluted with commercial hexanes containing 10% and 12% acetone were combined to give 406 mg. of a crude crystalline product comprising 16α - fluoro - 6α-methyl-17α,21-dihydroxy-1,4,9(11)-pregnatriene-3,20-dione 21-acetate which was used in the following example without further purification.

In the same manner, substituting 16β-fluoro-6α-methyl-11β,17α21-trihydroxy-1,4-pregnadiene-3,20-dione 21-acetate for 16α-fluoro-6α-methyl-11β,17α,21-trihydroxy-1,4-pregnadiene-3,20-dione 21-acetate is productive of 16β-fluoro - 6α-methyl - 17α,21 - dihydroxy-1,4,9(11)-pregnatriene-3,20-dione 21-acetate, a crystalline solid.

Example 45

16α-fluoro-9α-bromo-6α-methyl-11β,17α,21-trihydroxy-1,4-pregnadiene-3,20-dione 21-acetate To a stirred solution of 406 mg. (0.000977 mole) of the crude product comprising 16α-fluoro-6α-methyl-17α,21 - dihydroxy-1,4,9(11)-pregnatriene-3,20-dione 21-acetate (obtained in Example 44) in 25 ml. of tertiary butanol and 7 ml. of methylene chloride there was added a mixture of 1.3 ml. of 70% perchloric acid and 8 ml. of water and a solution of 174 mg. (0.00125 mole) of N-bromoacetamide in 5 ml. of tertiary butanol. The reaction mixture was stirred for 15 minutes and a solution of 0.25 g. of sodium sulfite in 12 ml. of water was added thereto. The thus-obtained mixture was concentrated at reduced pressure to a volume of 20–25 ml., diluted with 100 ml. of water and filtered. Following air drying there was thus obtained 0.44 g. of a white crystalline product comprising 16α - fluoro-9α-bromo-6α-methyl-11β,17α,21- trihydroxy-1,4-pregnadiene-3,20-dione 21-acetate which was used in the following example without further purification.

In the same manner, substituting 16β-fluoro-6α-methyl-17α,21-dihydroxy-1,4,9(11)-pregnatriene-3,20-dione 21-acetate for 16α-fluoro-6α-methyl-17α,21-dihydroxy-1,4,9-(11)-pregnatriene-3,20-dione 21-acetate is productive of 16β-fluoro-9α-bromo-6α-methyl-11β,17α,21-trihydroxy-1,4-pregnadiene-3,20-dione 21-acetate, a crystalline solid.

EXAMPLE 46

*16α-fluoro-9,11β-epoxy-6α-methyl-17α,21-dihydroxy-1,4-pregnadiene-3,20-dione 21-acetate*

A mixture of 0.44 g. (0.000858 mole) of the crude crystalline product comprising 16α-fluoro-9α-bromo-6α-methyl-11β,17α,21-trihydroxy-1,4-pregnadiene-3,20-dione 21-acetate (obtained in Example 45) 0.6 g. of potassium acetate and 20 ml. of acetone was stirred and heated under reflux for 30 hours. The thus-obtained reaction mixture was then evaporated to dryness at reduced pressure to give a residue. The thus-obtained residue was extracted with methylene chloride and the methylene chloride extract was concentrated to a small volume and poured onto a 25 g. Florisil chromatographic column packed wet with commercial hexanes. The chromatographic column was developed by eluting with commercial hexanes containing increasing amounts of acetone. The eluate fractions were freed of solvent and those fractions eluted with hexanes containing 10% and 12.5% acetone were combined to yield 329 mg. of a long needle-like crystalline product comprising 16α-fluoro-9,11β-epoxy-6α-methyl-17α,21-dihydroxy-1,4-pregnadiene-3,20-dione 21-acetate which was used without further purification in the following example.

In the same manner, substituting 16β-fluoro-9α-bromo-6α-methyl-17α,21-dihydroxy-1,4-pregnadiene-3,20-dione 21-acetate for 16α-fluoro-9α-bromo-6α-methyl-17α,21-dihydroxy-1,4-pregnadiene-3,20-dione 21-acetate is productive of 16β-fluoro-9,11β-epoxy-6α-methyl-17α,21-dihydroxy-1,4-pregnadiene-3,20-dione 21-acetate, a crystalline solid.

EXAMPLE 47

*9α,16α-difluoro-6α-methyl-11β,17α,21-trihydroxy-1,4-pregnadiene-3,20-dione 21-acetate*

To 9.5 g. of hydrogen fluoride contained in a polyethylene bottle and cooled in a Dry Ice-alcohol bath there was added 17 ml. of cold tetrahydrofuran and a cold solution of 329 mg. (0.000760 mole) of the crude product comprising 16α-fluoro-9,11β-epoxy-6α-methyl-17α,21-dihydroxy-1,4-pregnadiene-3,20-dione 21-acetate dissolved in 17 ml. of methylene chloride. The thus-obtained mixture was swirled and then kept at +5° C. for 19 hours. The thus-obtained reaction mixture (an amber colored solution) was then cautiously poured into a stirred mixture of 45 g. of sodium carbonate and 1 l. of water and ice and produced a two-phase system. The organic phase was separated from the aqueous phase and the aqueous phase was re-extracted with additional methylene chloride. The organic extracts were combined, dried over anhydrous sodium sulfate, and evaporated to a partly crystalline residue which was taken up in methylene chloride and poured onto a 25 g. Florisil chromatographic column packed wet with commercial hexanes. The chromatographic column was developed by eluting with commercial hexanes containing increasing amounts of acetone. The eluate fractions were freed of solvent and those fractions eluted with commercial hexanes containing 15% and 20% acetone were combined to give crystalline plates of a product comprising 9α,16α-difluoro-6α-methyl-11β,17α,21-trihydroxy-1,4-pregnadiene-3,20-dione 21-acetate weighing 332 mg. Recrystallization of this product from acetone-commercial hexanes yielded two crops: A first crop of shiny plates of 9α,16α-difluoro-6α-methyl-11β,17α,21-trihydroxy-1,4-pregnadiene-3,20-dione 21-acetate weighing 0.19 g. and having a melting point of 259–262° C. (dec.), $$\lambda_{max}^{alc.}\ 239\ m\mu\ (\epsilon 15{,}450)$$

and the following analysis:

*Analysis.*—Calc'd. for $C_{24}H_{30}O_6F_2$: C, 63.70; H, 6.68; F, 8.40. Found: C, 63.40; H, 6.78; F, 8.63; and a second crop of crystals of 9α,16α-difluoro-6α-methyl-11β,17α,21-trihydroxy-1,4-pregnadiene-3,20-dione 21-acetate weighing 0.06 g. and having a melting point of 252–256° C. (dec.).

9α,16α-difluoro-6α-methyl-11β,17α,21-trihydroxy-1,4-pregnadiene-3,20-dione 21-acetate has been found to exhibit 190 times the anti-inflammatory and 250 times the glucocorticoid activity of hydrocortisone. In addition, this compound exhibits favorable mineralocorticoid activity when used for the long-term treatment of arthritis and rheumatic diseases since it does not cause salt retention.

In the same manner, substituting 16β-fluoro-9,11β-epoxy-6α-methyl-17α,21-dihydroxy-1,4-pregnadiene-3,20-dione 21-acetate for 16α-fluoro-9,11β-epoxy-6α-methyl-17α,21-dihydroxy-1,4-pregnadiene-3,20-dione 21-acetate is productive of 9α,16β-difluoro-6α-methyl-11β,17α,21-trihydroxy-1,4-pregnadiene-3,20-dione 21-acetate, a crystalline solid.

EXAMPLE 48

*9α,16α-difluoro-6α-methyl-11β,17α,21-trihydroxy-1,4-pregnadiene-3,20-dione*

A solution of 150 mg. (0.000331 mole) of 9α,16α-difluoro-6α-methyl-11β,17α,21-trihydroxy-1,4-pregnadiene-3,20-dione 21-acetate in 15 ml. of methanol was purged of oxygen by means of a stream of nitrogen and a solution of 75 mg. of potassium bicarbonate dissolved in 1 ml. of oxygen-free water was added thereto whilst stirring. The reaction mixture was stirred for 5 hours at room temperature and 0.2 ml. of acetic acid and 10 ml. of water were added thereto. The thus-obtained mixture was then concentrated to about 15 ml. in vacuo and filtered to yield 130 mg. of a white solid material comprising 9α,16α-difluoro-6α-methyl-11β,17α,21-trihydroxy-1,4-pregnadiene-3,20-dione. The thus-obtained white solid was taken up in methylene chloride and poured onto a 10 g. Florisil chromatographic column. The chromatographic column was developed by eluting with commercial hexanes containing increasing amounts of acetone. The eluate fractions were freed of solvent and those fractions eluted with commercial hexanes containing 20% and 30% acetone were combined to give a crude crystalline product comprising 9α,16α-difluoro-6α-methyl-11β,17α,21-trihydroxy-1,4-pregnadiene-3,20-dione. The crude crystalline product was recrystallized from acetone commercial hexanes and yielded two crops of crystals: The first crystalline crop was 62 mg. of needle-like crystals of 9α,16α-difluoro-6α-methyl-11β,17α,21-trihydroxy-1,4-pregnadiene-3,20-dione having a melting point of 245 to 247° C. (dec.), and the second crop was 21 mg. of 9α,16α-difluoro-6α-methyl-11β,17α,21-trihydroxy-1,4-pregnadiene-3,20-dione having a melting point of 240–244° C. (dec.).

*Analysis.*—Calc'd. for $C_{22}H_{28}O_5F_2$: F, 9.26. Found: F, 8.90.

In the same manner, substituting 9α,16β-difluoro-6α-methyl-11β,17α,21-trihydroxy-1,4-pregnadiene-3,20-dione 21-acetate for 9α,16α-difluoro-6α-methyl-11β,17α,21-trihydroxy-1,4-pregnadiene-3,20-dione 21-acetate is productive of 9α,16β-difluoro-6α-methyl-11β,17α,21-trihydroxy-1,4-pregnadiene-3,20-dione.

EXAMPLE 49

*9α,16α-difluoro-6α-methyl-11β,17α,21-trihydroxy-1,4-pregnadiene-3,20-dione 21-hemisuccinate*

To a solution of 1.0 g. of 9α,16α-difluoro-6α-methyl-11β,17α,21-trihydroxy-1,4-pregnadiene-3,20-dione in 15 ml. of pyridine there is added 1.0 g. of succinic anhydride. The reaction mixture is swirled until all solids are dissolved and then allowed to stand at room temperature for about 64 hours. The reaction mixture is then poured, with stirring, into 300 ml. of 0.5 N hydrochloric acid and ice, allowed to stand for 15–20 minutes, filtered, and the cake obtained is washed several times with water and dried under vacuum to give a crude residue. The crude residue is crystallized from acetone to give 9α,16α-difluoro-6α-methyl-11β,17α,21-trihydroxy-1,4-pregnadiene-3,20-dione 21-hemisuccinate, a crystalline solid.

Other 21-acylates are prepared by allowing 9α,16α-difluoro-6α-methyl-11β,17α,21-trihydroxy-1,4 - pregnadiene-3,20-dione to react with the selected organic carboxylic acid, preferably, a hydrocarbon carboxylic acid containing from 1 to 12 carbon atoms, inclusive, or the anhydride or acyl halide thereof, such as, for example, those listed above. Illustrative of the compounds thus produced are the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylproprionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemiadipate, the 21-acrylate, the 21-crotonate, the 21-propiolate, the 21-(2-butynoate), the 21-undecolate, the 21-cinnamate, the 21-maleate, the 21-citraconate, and the like of 9α,16α-difluoro-6α-methyl - 11β,17α,21 - trihydroxy - 1,4 - pregnadiene-3,20-dione.

If the corresponding acylating agent is solid an inert solvent such as toluene, xylene, or dioxane can be added to effect solution and to provide a liquid esterification medium.

If the esterifying agent is the free acid, the reaction is carried out in the presence of an esterification catalyst.

In the same manner, substituting 9α,16β-difluoro-6α-methyl-11β,17α,21-trihydroxy-1,4-pregnadiene-3,20-dione for 9α,16α-difluoro-6α-methyl-11β,17α,21-trihydroxy-1,4-pregnadiene-3,20-dione is productive of the 21-hemisuccinate (and other 21-acylates) of 9α,16β-difluoro-6α-methyl-11β,17α,21-trihydroxy-1,4-pregnadiene-3,20-dione.

Example 49A

*Sodium salt of 9α,16α-difluoro-6α-methyl-11β,17α,21-trihydroxy-1,4-pregnadiene-3,20-dione 21-hemisuccinate*

The crystalline acid, 9α,16α-difluoro-6α-methyl-11β, 17α,21-trihydroxy-1,4-pregnadiene-3,20-dione 21-hemisuccinate, obtained in Example 49, is dissolved in 35 ml. of acetone and filtered through a medium porosity glass filter. To the thus-obtained solution there is added a filtered aqueous solution of exactly one equivalent of sodium bicarbonate. The resulting solution is concentrated under house vacuum to remove the acetone and lyophilized under high vacuum to yield the sodium salt of 9α,16α-difluoro-6α-methyl-11β,17α,21-trihydroxy-1,4 - pregnadiene-3,20-dione 21-hemisuccinate, a fluffy white solid.

In the same manner substituting 9α,16β-difluoro-6α-methyl-11β,17α,21-trihydroxy-1,4-pregnadiene-3,20 - dione 21-hemisuccinate for 9α,16α-difluoro-6α-methyl-11β,17α, 21-trihydroxy-1,4-pregnadiene-3,20-dione 21 - hemisuccinate is productive of the sodium salt of 9α,16β-difluoro-6α-methyl-11β,17α,21-trihydroxy-1,4 - pregnadiene - 3,20 - dione 21-hemisuccinate, a crystalline solid.

Example 50

*6α-fluoro-11β,16α,21-trihydroxy-4,17(20)-pregnadien-3-one 21-acetate*

A mixture of 0.5 g. of 6α-fluoro-11β,21-dihydroxy-4,17 (20)-pregnadien-3-one 21-acetate, prepared according to the procedure disclosed in Preparation 1 above, 0.2 g. of selenium dioxide, 10 ml. of dioxane and 2 ml. of water was heated under reflux for approximately one hour with stirring. The solvent was then distilled in vacuo to give a residue. The thus-obtained residue was dissolved in methylene chloride, washed with water and dried over anhydrous sodium sulfate. The dried methylene chloride solution was then poured onto a 40 g. Florisil (synthetic magnesium silicate) chromatographic column. The chromatographic column was developed by eluting with commercial hexanes containing increasing amounts of acetone. The eluate fractions were freed of solvent and the fraction eluted with commercial hexanes containing 30% acetone gave 220 mg. of product which was recrystallized twice from ethyl acetate to yield 6α-fluoro-11β,16α-21-trihydroxy-4,17(20)-pregnadien-3-one 21-acetate having a melting point of 185–187° C., [α]_D+105° (CHCl_3) and the following analysis:

*Analysis.*—Calcd. for $C_{23}H_{31}FO_5$: C, 67.95; H, 7.69; F, 4.67. Found: C, 68.04; H, 8.04; F, 4.70.

Example 51

*20α-chloro-6α-fluoro-11β,21-dihydroxy-4,16-pregnadien-3-one 21-acetate*

To a solution of 32 g. of 6α-fluoro-11β,16α,21-trihydroxy-4,17(20)-pregnadien-3-one 21-acetate in 915 ml. of methylene chloride containing 19.4 ml. of tri-n-butylamine cooled to 0° C. there was added 5.4 ml. of thionyl chloride over a period of 5 minutes. The reaction mixture was stirred at 0–5° C. for 30 minutes and then washed twice with dilute hydrochloric acid and once with water. The washed solution was then dried over sodium sulfate and poured onto a 2 kg. Florisil chromatographic column. The chromatographic column was developed by eluting with commercial hexanes containing increasing amounts of acetone. The eluate fractions were freed of solvent and those fractions eluted with commercial hexanes containing 15% acetone were combined to yield 15.1 g. of a product comprising 20α-chloro-6α-fluoro - 11β,21 - dihydroxy-4,16-pregnadien-3-one 21-acetate, which was used in the following example, Example 52, without further purification.

A portion of the thus-obtained product was recrystallized from ethyl acetate-commercial hexanes to yield 20α-chloro-6α-fluoro-11β,21-dihydroxy-4,16-pregnadien-3 - one 21-acetate having a melting point of 158–160° C. and the following analysis:

*Analysis.*—Calcd. for $C_{23}H_{30}ClFO_4$: C, 65.07; H, 7.12; Cl, 8.35; F, 4.48. Found: C, 65.08; H, 7.09; Cl, 8.55; F, 4.71.

20β-chloro-6α-fluoro-11β,21-dihydroxy-4,16-pregnadien-3-one 21-acetate is present in the mother liquor and can be recovered by further chromatography or countercurrent extraction followed by recrystallization.

Example 52

*6α-fluoro-11β-hyroxy-20β,21-epoxy-4,16-pregnadien-3-one*

767 mg. of the product comprising 20α-chloro-6α-fluoro-11β,21-dihydroxy-4,16-pregnadien-3-one 21-acetate, obtained in Example 51, was dissolved in 60 ml. of methanol containing 20 ml. of N/10 sodium hydroxide. The reaction mixture was maintained at about 26° C. for approximately 10 minutes after which time the excess alkali was neutralized by the addition of 1.7 ml. of N/10 hydrochloric acid. A residue crystallized following distillation in vacuo of most of the solvent from the neutralized solution. This residue can be used without further purification in the following example, Example 53. The thus-obtained residue was recrystallized from ethyl acetate-commercial hexanes to give 300 mg. of a product having a melting point of 140–146° C. Two further recrystallizations from ethyl acetate-commercial hexanes yielded 6α-fluoro-11β-hydroxy-20β,21-epoxy-4,16-pregnadien-3-one having a melting point of 152–154° C., [α]_D+189° (CHCl_3) and the following analysis:

*Analysis.*—Calcd. for $C_{21}H_{27}FO_3$: C, 72.80; H, 7.86; F, 5.48. Found: C, 72.88; H, 7.78; F, 5.34.

6α - fluoro-11β-hydroxy-20α,21-epoxy-4,16-pregnadien-

EXAMPLE 53

6α,16α-difluoro-11β,21-dihydroxy-4,17(20)-pregnadien-3-one 21-acetate 5 g. of a residue comprising 6α-fluoro-11β-hydroxy-20α,21-epoxy- and 6α-fluoro-11β-hydroxy-20β,21-epoxy-4,16-pregnadien-3-one, obtained according to the procedure of Example 52, was dissolved in 75 ml. of methylene chloride and cooled to −20° C. This solution was then added to a similarly cooled solution of 10.5 g. of hydrogen fluoride, 18.6 ml. of tetrahydrofuran and 5 ml. of methylene chloride and stirred for 2 hours at 0° C. The thus-obtained reaction mixture comprising 6α,16β-difluoro- and 6α,16α-difluoro-11β,21-dihydroxy-4,17(20)-pregnadien-3-one was cautiously poured into 42 g. of potassium carbonate dissolved in 250 ml. of water and extracted with methylene chloride. To the methylene chloride extract there was then added 10 ml. of acetic anhydride and 10 ml. of pyridine. The thus-obtained acylation mixture after standing at approximately 26° C. for about 17 hours was poured into dilute hydrochloric acid and the acylated product was recovered by extraction with methylene chloride. The acylated product-methylene chloride extract was washed successively with dilute hydrochloric acid and water, and dried over anhydrous sodium sulfate. The dried acylated product-methylene chloride solution was then poured onto a 200 g. Florisil chromatographic column. The chromatographic column was developed using a gradient elution system composed of 4 l. of commercial hexanes-5% acetone and 4 l. of commercial hexanes-25% acetone. The eluate fractions were freed of solvent and those fractions which by weight profile and papergram analysis showed the presence of the desired 6α,16α-difluoro-Δ⁴ and 6α,16β-difluoro-Δ⁴ products were combined to yield 1.78 g. of an oily material comprising 6α,16β-difluoro- and 6α,16α-difluoro-11β,21-dihydroxy-4,17(20)-pregnadien-3-one 21-acetate which was used in the following example, Example 54, without further purification.

EXAMPLE 54

6α,16α-difluoro-11β,21-dihydroxy-1,4,17(20)-pregnadien-3-one 21-acetate 1.78 g. of oily product comprising 6α,16β-difluoro- and 6α,16α-difluoro-11β,21-dihydroxy-4,17(20)-pregnadien-3-one 21-acetate, obtained according to the procedure of Example 53, 880 mg. of anhydrous selenium dioxide, 0.3 ml. of pyridine and 50 ml. of t-butyl alcohol were mixed and heated under reflux for about 17 hours. The thus-obtained reaction mixture was cooled and filtered through a pad of Celite (diatomaceous earth filtering aid) and concentrated in vacuo to give a residue. The thus-obtained residue was then partitioned between methylene chloride-water and the organic phase (methylene chloride) was poured onto a 200 g. Florisil chromatographic column. The chromatographic column was developed by using a gradient elution system composed of 4 l. of commercial hexanes-5% acetone and 4 l. of commercial hexanes-25% acetone. The eluate fractions were freed of solvent and those fractions which by weight profile and papergram analysis showed the presence of the desired 6α,16β-difluoro-Δ¹,⁴ and 6α,16α-difluoro-Δ¹,⁴ products were combined to yield 1.43 g. of 6α,16β-difluoro- and 6α,16α-difluoro-11β,21-dihydroxy-1,4,17(20)-pregnatrien-3-one 21-acetate. An analytical sample of 6α,16α-difluoro-11β,21-dihydroxy-1,4,17(20)-pregnatrien-3-one 21-acetate having a melting point of 137–149° C. was obtained as recovered starting material following the osmium tetroxide reaction described in the following example, Example 55.

EXAMPLE 55

6α,16β-difluoro- and 6α,16α-difluoro-11β,17α,21-trihydroxy-1,4-pregnadiene-3,20-dione 21-acetate A mixture of 1.43 g. of a crude product comprising 6α,16β-difluoro and 6α,16α-difluoro-11β,21-dihydroxy-1,4,17(20)-pregnatrien-3-one 21-acetate, obtained according to the procedure of Example 54, 28.8 mg. of osmium tetroxide, 53 ml. of t-butyl alcohol, 1.74 ml. of pyridine and 4.4 ml. of 2 N solution of N-methylmorpholine oxide hydrogen peroxide was stirred at approximately 26° C. for about 7 hours. To the thus-obtained reaction mixture there was added a slight excess of dilute sodium hydrosulfite solution and the thus-obtained mixture was distilled in vacuo to remove the t-butyl alcohol. The material left following distillation of the t-butyl alcohol was partitioned between methylene chloride-dilute hydrochloric acid. The organic phase (methylene chloride) was poured onto a 100 g. Florisil chromatographic column. The chromatographic column was developed using a gradient elution system composed of 4 l. of commercial hexanes-5% acetone and 4 l. of commercial hexanes-25% acetone. The eluate fractions (taken as 200 ml. fractions) were freed of solvent and analyzed by weight profile and papergram analysis. Those fractions which showed the presence of unconverted starting material were combined to yield 515 mg. of a mixture (A) of 6α,16β-difluoro- and 6α,16α-difluoro-11β,21-dihydroxy-1,4,17(20)-pregnatrien-3-one 21-acetate, an analytical sample of which had a melting point of 137–149° C. Those fractions which predominated in the 6α,16α-difluoro-Δ¹,⁴ compound were combined to yield 43 mg. of a product (B) comprising chiefly 6α,16α-difluoro-11β,17α,21-trihydroxy-1,4-pregnadiene-3,20-dione 21-acetate with minor amounts of 6α,16β-difluoro-11β,17α,21-trihydroxy-1,4-pregnadiene-3,20-dione 21-acetate being present. Those fractions which predominated in the 6α,16β-difluoro-Δ¹,⁴ compound yielded 112 mg. of a material (C) comprising chiefly 6α,16β-difluoro-11β,17α,21-trihydroxy-1,4-pregnadiene-3,20-dione 21-acetate. A single fraction of material (C) (weighing 24 mg.) was recrystallized from ethyl acetate to yield an analytical sample of 6α,16β-difluoro-11β,17α,21-trihydroxy-1,4-pregnadiene-3,20-dione 21-acetate having a melting point of 172–178° C. and the characteristic infrared spectrum absorptions in chloroform at 1700 and 1735 cm.⁻¹ of 16β-fluoro corticoids.

The recovered starting material (A), consisting predominantly of 6α,16α-difluoro-11β,21-dihydroxy-1,4,17-(20)-pregnadien-3-one 21-acetate, was again reacted with N-methylmorpholine oxide hydrogen peroxide and osmium tetroxide as described above and rechromatographed as described above. There was obtained from the second chromatographic column 260 mg. of 6α,16α-difluoro-11β,21-dihydroxy-1,4,17(20)-pregnatrien-3-one 21-acetate, and a crystalline chromatographic fraction of 71 mg. of crude 6α,16α-difluoro-11β,17α,21-trihydroxy-1,4-pregnadiene-3,20-dione 21-acetate which was recrystallized from methanol to yield an analytical sample of 6α,16α-difluoro-11β,17α,21-trihydroxy-1,4-pregnadiene-3,20-dione 21-acetate having a melting point of 235–239° C., showing the expected infrared spectrum absorptions in chloroform at 1725 and 1737 (sh) cm.⁻¹ of 16α-fluoro corticoids and the following analysis:

*Analysis.*—Calcd. for $C_{23}H_{38}F_2O_6$: F, 8.67. Found: F, 8.25.

EXAMPLE 56

6α,16α-difluoro-11β,17α,21-trihydroxy-1,4-pregnadiene-3,20-dione

A solution of 250 mg. of potassium bicarbonate in 5 ml. of water is purged of oxygen with a stream of nitrogen and added to a stirred oxygen-free solution of 500 mg. of 6α,16α-difluoro-11β,17α,21-trihydroxy-1,4-pregnadiene,3,20-dione 21-acetate in 30 ml. of methanol. After allowing the reaction mixture to stand for 5 hours, a solution of 0.5 ml. of acetic acid in 100 ml. of water is added and the thus-obtained acidified mixture is concentrated at reduced pressure to approximately 80 ml. The precipitated product is then collected on a filter, washed with water, dried over anhydrous sodium sulfate and recrystallized from acetone commercial hexanes to yield 6α,16α-difluoro-11β,17α,21-trihydroxy-1,4-pregnadiene-3,20-dione, a crystalline solid.

In the same manner substituting 6α,16β-difluoro-11β,17α,21-trihydroxy-1,4-pregnadiene-3,20-dione 21-acetate for 6α,16α-difluoro-11β,17α,21-trihydroxy-1,4-pregnadiene-3,20-dione 21-acetate is productive of 6α,16β-difluoro - 11β,17α,21 - trihydroxy-1,4-pregnadiene-3,20-dione, a crystalline solid.

EXAMPLE 57

*6α,16α-difluoro-11β,17α,21-trihydroxy-1,4-pregnadiene-3,20-dione 21-hemisuccinate*

To a solution of 1.0 g. of 6α,16α-difluoro-11β,17α,21-trihydroxy-1,4-pregnadiene-3,20-dione in 10 ml. of pyridine there is added 1.0 g. of succinic anhydride. The reaction mixture is swirled until all solids are dissolved and then allowed to stand at room temperature for about 40 hours. The reaction mixture is then poured, with stirring, into 200 ml. of 0.5 N hydrochloric acid and ice, allowed to stand for 15–20 minutes, filtered, and the cake obtained is washed several times with water and dried under vacuum to give a crude residue. The crude residue is crystallized from acetone to yield 6α,16α-difluoro-11β,17α,21 - trihydroxy - 1,4 - pregnadiene-3,20-dione 21-hemisuccinate, a crystalline solid.

Other 21-acylates are prepared by allowing 6α,16α-difluoro - 11β,17α,21-trihydroxy-1,4-pregnadiene-3,20-dione to react with the selected organic carboxylic acid, preferably a hydrocarbon carboxylic acid containing from 1 to 12 carbon atoms, inclusive, or the anhydrides or acyl halides thereof, for example, those listed above. Illustrative of the compounds thus produced are the 21-formate, 21-propionate, the 21-butyrate, the 21-valerate, the 21-hexanoate, the 21-laurate, the 21-trimethylacetate, the 21-isobutyrate, the 21-isovalerate, the 21-tertiary-butylacetate, the 21-(β-cyclopentylpropionate), the 21-cyclohexanecarboxylate, the 21-cyclohexylacetate, the 21-benzoate, the 21-phenyl-acetate, the 21-(β-phenylpropionate), the 21-(o-, m-, p-toluate), the 21-hemiadipate, the 21-acrylate, the 21-crotonate, the 21-propiolate, the 21-(2-butynoate), the 21-undecolate, the 21-cinnamate, the 21-maleate, the 21-citraconate, and the like of 6α,16α-difluoro - 11β,17α,21 - trihydroxy - 1,4-pregnadiene-3,20-dione.

If the corresponding acylating agent is solid an inert solvent such as toluene, xylene, or dioxane can be added to effect solution and to provide a liquid esterification medium.

If the esterifying agent is the free acid, the reaction is carried out in the presence of an esterification catalyst.

In the same manner, substituting 6α,16β-difluoro-11β,17α,21 - trihydroxy - 1,4 - pregnadiene-3,20-dione for 6α,16α - difluoro - 11β,17α,21-trihydroxy-1,4-pregnadiene-3,20-dione is productive of the corresponding 21-hemisuccinate (and other 21-acylates) of 6α,16β-difluoro-11β,17α,21-trihydroxy-1,4-pregnadiene-3,20-dione.

EXAMPLE 57A

*Sodium salt of 6α,16α-difluoro-11β,17α,21-trihydroxy-1,4-pregnadiene-3,20-dione 21-hemisuccinate*

The crystalline acid, 6α,16α-difluoro-11β,17α,21-trihydroxy-1,4-pregnadiene-3,20-dione 21-hemisuccinate, obtained in Example 57, is dissolved in 25 ml. of acetone and filtered through a medium porosity glass filter. To the thus-obtained solution there is added a filtered aqueous solution of exactly one equivalent of sodium bicarbonate. The resulting solution is concentrated under house vacuum to remove the acetone and lyophilized under high vacuum to yield the sodium salt of 6α,16α-difluoro-11β,17α,21 - trihydroxy - 1,4 - pregnadiene-3,20-dione 21-hemisuccinate, a fluffy white solid.

In the same manner, substituting 6α,16β-difluoro-11β,17α,21 - trihydroxy - 1,4-pregnadiene-3,20-dione 21-hemisuccinate for 6α,16α-difluoro-11β,17α,21-trihydroxy-1,4-pregnadiene-3,20-dione 21-hemisuccinate is productive of the sodium salt of 6α16β-difluoro-11β,17α,21-trihydroxy-1,4-pregnadiene-3,20-dione 21-hemisuccinate.

EXAMPLE 58

*6α,16α-difluoro-17,21-dihydroxy-1,4,9(11)-pregnatriene-3,20-dione 21-acetate*

To a stirred solution of 0.45 g. of 6α,16α-difluoro-11β,17α,21 - trihydroxy - 1,4-pregnadiene-3,20-dione 21-acetate in 6 ml. of pyridine there is added 0.20 g. of N-bromo-acetamide. The thus-obtained reaction mixture is stirred for about 18 minutes, cooled to 10° C. and saturated with sulfur dioxide by passing a stream of the gas on the surface of the stirred reaction mixture. 100 ml. of methylene chloride is added and the solution is washed 3 times with dilute hydrochloric acid. The organic phase is separated and dried over sodium sulfate. The thus-obtained organic phase is then poured onto a column containing 40 g. of Florisil (synthetic magnesium silicate) packed wet in commercial hexanes. The chromatographic column is eluted with commercial hexanes containing increasing amounts of acetone. Those fractions which move more rapidly from the origin on papergram (benzene-formamide) than the starting material are combined to yield 6α,16α-difluoro-17α,21-dihydroxy - 1,4,9(11) - pregnatriene-3,20-dione 21-acetate which is used in the following example, Example 59, without further purification.

A portion of the combined material is recrystallized from acetone-commercial hexanes or ethyl acetate-commercial hexanes to yield 6α-16α-difluoro-17,21-dihydroxy-1,4,9(11)-pregnatriene-3,10-dione 21-acetate, a crystalline solid.

In the same manner, substituting 6α,16β-difluoro-11β,17α,21 - trihydroxy - 1,4-pregnadiene-3,20-dione 21-acetate for 6α,16α - difluoro - 11β,17α,21-trihydroxy-1,4-pregnadiene-3,20-dione 21-acetate is productive of 6α,16β-difluoro - 17α,21 - dihydroxy-1,4,9(11)-pregnatriene-3,20-dione 21-acetate, a crystalline solid.

EXAMPLE 59

*6α,16α-difluoro-9α-bromo-11β,17α,21-trihydroxy-1,4-pregnadiene-3,20-dione 21-acetate*

To a stirred solution of 406 mg. of the crude product comprising 6α,16α - difluoro-17α,21-dihydroxy-1,4,9(11)-pregnatriene-3,20-dione 21-acetate (obtained according to the procedure of Example 58) in 25 ml. of tertiary butyl alcohol and 7 ml. of methylene chloride there is added a mixture of 1.3 ml. of 70% perchloric acid and 8 ml. of water and a solution of 174 mg. of N-bromoacetamide in 5 ml. of tertiary butyl alcohol. The reaction mixture is stirred for 15 minutes and a solution of 0.25 g. of sodium sulfite in 12 ml. of water is added thereto. The thus-obtained mixture is concentrated at reduced pressure to a volume of 20–25 ml., diluted with 100 ml. of water and filtered. Following air drying there is thus obtained a tan solid product comprising 6α,16α-difluoro-9α - bromo - 11β,17α,21-trihydroxy-1,4-pregnadiene-3,20-dione 21-acetate which is used in the following example, Example 60, without further purification.

A portion of the tan solid is recrystallized from acetone-commercial hexanes or ethyl acetate-commercial hexanes to give 6α,16α-difluoro-9α-bromo-11β,17α,21-trihydroxy-1,4-pregnadiene-3,20-dione 21-acetate, a crystalline solid.

In the same manner, substituting 6α,16β-difluoro-17α,21 - dihydroxy - 1,4,9(11) - pregnatriene - 3,20-dione 21-acetate for 6α,16α-difluoro-17α,21-dihydroxy-1,4,9(11)-pregnatriene-3,20-dione 21-acetate is productive of 6α, 16β-difluoro-9α-bromo-11β,17α,21-trihydroxy-1,4-pregnadiene-3,20-dione 21-acetate, a crystalline solid.

EXAMPLE 60

*6α,16α-difluoro-9,11β-epoxy-17α,21-dihydroxy-1,4-pregnadiene-3,20-dione 21-acetate*

A mixture of 0.44 g. of the crude product comprising 6α,16α-difluoro-9α-bromo-11β,17α,21-trihydroxy-1,4-pregnadiene-3,20-dione 21-acetate (obtained according to the procedure of Example 59), 0.6 g. of potassium acetate and 20 ml. of acetone is stirred and heated under reflux for 30 hours. The thus-obtained reaction mixture is then evaporated to dryness at reduced pressure to give a residue. The thus-obtained residue is extracted with methyl chloride and the methylene chloride extract is concentrated to a small volume and poured onto a 25 g. Florisil chromatographic column packed wet with commercial hexanes. The chromatographic column is developed by eluting with commercial hexanes containing increasing amounts of acetone. The eluate fractions are freed of solvent. Those fractions which move more rapidly from the origin on papergram (benzene-formamide) than the starting material are combined to yield a product comprising 6α,16α-difluoro-9,11β-epoxy-17α,21-dihydroxy-1,4-pregnadiene-3,20-dione 21-acetate which is used without further purification in the following example, Example 61.

A portion of the combined product is recrystallized from acetone-commercial hexanes or ethyl acetate-commercial hexanes to give 6α,16α-difluoro-9,11β-epoxy-17α,21-dihydroxy-1,4-pregnadiene-3,20-dione 21-acetate, a crystalline solid.

In the same manner, substituting 6α,16β-difluoro-9α-bromo-17α,21-dihydroxy-1,4-pregnadiene-3,20-dione 21-acetate for 6α,16α-difluoro-9α-bromo-17α,21-dihydroxy-1,4-pregnadiene-3,20-dione 21-acetate is productive of 6α,16β-difluoro-9,11β-epoxy-17α,21-dihydroxy-1,4-pregnadiene-3,20-dione 21-acetate, a crystalline solid.

EXAMPLE 61

*6α,9α,16α-trifluoro-11β,17α,21-trihydroxy-1,4-pregnadiene-3,20-dione 21-acetate*

To 9.5 g. of hydrogen fluoride contained in a polyethylene bottle and cooled in a Dry-Ice-alcohol bath there is added 17 ml. of cold tetrahydrofuran and a cold solution of 329 mg. of the crude product comprising 6α,16α-difluoro-9,11β-epoxy-17α,21-dihydroxy-1,4-pregnadiene-3,20-dione 21-acetate (obtained according to the procedure of Example 60) dissolved in 7 ml. of methylene chloride. The thus-obtained mixture is swirled and then kept at +5° C. for 19 hours. The thus-obtained reaction mixture (an amber colored solution) is then cautiously poured into a stirred mixture of 45 g. of sodium carbonate and 1 l. of water and ice and produced a two-phase system. The organic phase is separated from the aqueous phase and the aqueous phase is re-extracted with additional methylene chloride. The organic extracts are combined, dried over anhydrous sodium sulfate, and evaporated to a partly crystalline residue which is taken up in methylene chloride and poured onto a 25 g. Florisil chromatographic column packed wet with commercial hexanes. The chromatographic column is developed by eluting with commercial hexanes containing increasing amounts of acetone.

Those fractions which move more slowly from the origin on papergram (benzene-formamide) than the starting material are combined and crystallized from acetone commercial-hexanes or ethyl acetate commercial-hexanes to give 6α,9α,16α-trifluoro-11β,17α,21-trihydroxy-1,4-pregnadiene-3,20-dione 21-acetate, a crystalline solid.

In the same manner, substituting 6α,16β-difluoro-9,11β-epoxy-17α,21-dihydroxy-1,4-pregnadiene-3,20-dione 21-acetate for 6α,16α-difluoro-9,11β-epoxy-17α,21-dihydroxy-1,4-pregnadiene-3,20-dione 21-acetate is productive of 6α,9α,16β-trifluoro-11β,17α,21-trihydroxy-1,4-pregnadiene-3,20-dione 21-acetate, a crystalline solid.

EXAMPLE 62

*6α,9α,16α-trifluoro-11β,17α,21-trihydroxy-1,4-pregnadiene-3,20-dione*

A solution of 150 mg. of 6α,9α,16α-trifluoro-11β,17α,21-trihydroxy-1,4-pregnadiene-3,20-dione 21-acetate in 15 ml. of methanol is purged of oxygen by means of a stream of nitrogen and a solution of 75 mg. of potassium bicarbonate dissolved in 1 ml. of oxygen-free water is added thereto whilst stirring. The reaction mixture is stirred for 5 hours at room temperature and 0.2 ml. of acetic acid and 10 ml. of water are added thereto. The thus-obtained mixture is then concentrated to about 15 ml. in vacuo and filtered to yield a white solid material comprising 6α,9α,16α-trifluoro-11β,17α,21-trihydroxy-1,4-pregnadiene-3-20-dione. The thus-obtained white solid is taken up in methylene chloride and poured onto a 10 g. Florisil chromatographic column. The chromatographic column is developed by eluting with commercial hexanes containing increasing amounts of acetone. The eluate fractions are freed of solvent and those fractions which move more slowly from the origin on papergram (benzene-formamide) than the starting material are combined and recrystallized from acetone-commercial hexanes or ethyl acetate-commercial hexanes to yield 6α,9α,16α-trifluoro-11β,17α,21-trihydroxy-1,4-pregnadiene-3,20-dione, a crystalline solid.

In the same manner, substituting 6α,9α,16β-trifluoro-11β,17α,21-trihydroxy-1,4-pregnadiene-3,20-dione 21-acetate for 6α,9α,16α,-trifluoro-11β,17α,21-trihydroxy-1,4-pregnadiene-3,20-dione 21-acetate is productive of 6α,9α,16β-trifluoro-11β,17α,21-trihydroxy-1,4-pregnadiene-3,20-dione, a crystalline solid.

EXAMPLE 63

*6α,9α,16α-trifluoro-11β,17α,21-trihydroxy-1,4-pregnadiene-3,20-dione 21-hemisuccinate*

To a solution of 1.0 g. of 6α,9α,16α-trifluoro-11β,17α,21-trihydroxy-1,4-pregnadiene-3,20-dione in 15 ml. of pyridine there is added 1.0 g. of succinic anhydride. The reaction mixture is swirled until all solids are dissolved and then allowed to stand at room temperature for about 64 hours. The reaction mixture is then poured, with stirring, into 300 ml. of 0.5 N hydrochloric acid and ice, allowed to stand for 15–20 minutes, filtered, and the cake obtained is washed several times with water and dried under vacuum to give a crude residue. The crude residue is crystallized from acetone to give a 6α,9α,16α-trifluoro-11β,17α,21-trihydroxy-1,4-pregnadiene-3,20-dione 21-hemisuccinate, a crystalline solid.

Other 21-acylates are prepared by allowing 6α,9α,16α-trifluoro-11β,17α,21-trihydroxy-1,4-pregnadiene-3,20-dione to react with the selected organic carboxylic acid, preferably, a hydrocarbon carboxylic acid containing from 1 to 12 carbon atoms, inclusive, or the anhydride or acyl halide thereof, such as, for example, those listed above. Illustrative of the compounds thus produced are the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiary-butylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemiadipate, the 21-acrylate, the 21-crotonate, the 21-propiolate, the 21-(2-butynoate), the 21-undecolate, the 21-cinnamte, the 21-maleate, the 21-citraconate, and the like of 6α,9α,16α-trifluoro-11β,17α,21-trihydroxy-1,4-pregnadiene-3,20-dione.

If the corresponding acylating agent is solid, an inert solvent such as toluene, xylene, or dioxane can be added to effect solution and to provide a liquid esterification medium.

If the esterifying agent is the free acid, the reaction is carried out in the presence of an esterification catalyst.

In the same manner, substituting 6α,9α,16β-trifluoro-11β,17α,21 - trihydroxy - 1,4 - pregnadiene-3,20-dione for 6α,9α,16α - trifluoro - 11β,17α,21 - trihydroxy-1,4-pregnadiene-3,20-dione is productive of the 21-hemisuccinate (and other 21-acylates) of 6α,9α,16β-trifluoro-11β,17α,21-trihydroxy-1,4-pregnadiene-3,20-dione.

Example 63A

*Sodium salt of 6α,9α,16α-trifluoro-11β,17α,21-trihydroxy-1,4-pregenadiene-3,20-dione 21-hemisuccinate*

The crystalline acid, 6α,9α,16α-trifluoro-11β,17α,21-trihydroxy-1,4-pregnadiene-3,20-dione 21-hemisuccinate, obtained in Example 63, is dissolved in 35 ml. of acetone and filtered through a medium porosity glass filter. To the thus-obtained solution there is added a filtered aqueous solution of exactly one equivalent of sodium bicarbonate. The resulting solution is concentrated under house vacuum to remove the acetone and lyophilized under high vacuum to yield the sodium salt of 6α,9α,16α-trifluoro-11β,17α,21-trihydroxy - 1,4 - pregnadiene-3,20-dione 21-hemisuccinate, a fluffy white solid.

In the same manner, substituting 6α,9α,16β-trifluoro-11β,17α,21 - trihydroxy - 1,4 - pregnadiene-3,20-dione 21-hemisuccinate for 6α,9α,16α-trifluoro - 11β,17α,21 - trihydroxy-1,4-pregnadiene - 3,20 - dione 21-hemisuccinate is productive of the sodium salt of 6α,9α,16β - trifluoro-11β,17α,21-trihydroxy - 1,4 - pregnadiene-3-20-dione 21-hemisuccinate, a crystalline solid.

Example 64

*6α,16α-difluoro-11β,17α,21-trihydroxy-1,4-pregnadiene-3,20-dione 21-phosphate*

To a slurry of 3.7 g. of 6α,16α-difluoro-11β,17α,21-trihydroxy-1,4-pregnadiene-3,20-dione 21 - methanesulfonate there is added a solution of 8.5 ml. of triethylamine and 2 ml. of 85% phosphoric acid in 20 ml. of acetonitrile. The thus-obtained reaction mixture is heated at reflux for about 3 hours and then concentrated under reduced pressure to about 10 ml. The concentrated reaction mixture is then diluted with about 50 ml. of ethanol, reconcentrated and allowed to stand until crystallization is complete. The product is then triturated with cold acetonitrile and filtered to yield 6α,16α-difluoro-11β,17α,21-trihydroxy-1,4-pregnadiene-3,20-dione 21-hydrogen phosphate triethyl ammonium salt. Acidification of an aqueous solution of the ammonium salt with ice cold dilute hydrochloric acid yields, following filtration, 6α,16α-difluoro-11β,17α,21 - trihydroxy - 1,4 - pregnadiene-3,20-dione 21-phosphate, a crystalline solid.

Example 65

*6α,9α,16α-trifluoro-11β,17α,21-trihydroxy-1,4-pregnadiene-3,20-dione 21-phosphate*

Substituting a stoichiometric equivalent amount of 6α,9α,16α-trifluoro - 11β,17α,21 - trihydroxy-1,4-pregnadiene-3,20-dione 21-methanesulfonate for 6α,16α-difluoro-11β,17α,21-trihydroxy - 1,4 - pregnadiene-3,20-dione 21-methanesulfonate and following the procedure of Example 64 is productive of 16α-fluoro-6α-methyl-11β,17α,21-trihydroxy-1,4-pregnadiene-3,20-dione 21-phosphate, a crystalline solid.

Example 66

*16α-fluoro-6α-methyl-11β,17α,21-trihydroxy-1,4-pregnadiene-3,20-dione 21-phosphate*

Substituting a stoichiometric equivalent amount of 16α-fluoro-6α-methyl-11β,17α,21 - trihydroxy-1,4-pregnadiene-3,20 - dione 21 - methanesulfonate for 6α,16α-difluoro-11β,17α,21-trihydroxy - 1,4 - pregnadiene-3,20-dione 21-methanesulfonate and following the procedure of Example 64 is productive of 16α-fluoro-6α-methyl-11β,17α,21-trihydroxy-1,4-pregnadiene-3,20-dione 21 - phosphate, a crystalline solid.

Example 67

*9α,16α-difluoro-6α-methyl-11β,17α,21-trihydroxy-1,4-pregnadiene-3,20-dione 21-phosphate*

Substituting a stoichiometric equivalent amount of 9α,16α-difluoro-6α - methyl - 11β,17α,21 - trihydroxy-1,4-pregnadiene-3,20-dione 21-methanesulfonate for 6α,16α-difluoro-11β,17α,21 - trihydroxy - 1,4 - pregnadiene-3,20-dione 21-methanesulfonate and following the procedure of Example 64 is productive of 9α,16α-difluoro-6α-methyl-11β,17α,21 - trihydroxy - 1,4 - pregnadiene-3,20-dione 21-phosphate, a crystalline solid.

Example 68

*Sodium salt of 6α,16α-difluoro-11β,17α,21-trihydroxy-1,4-pregnadiene-3,20-dione 21-phosphate*

Substituting a stoichiometric equivalent amount of 6α,16α-difluoro-11β,17α,21 - trihydroxy-1,4-pregnadiene-3,20-dione 21-phosphate for 6α,9α,16α-trifluoro-11β,17α, 21-trihydroxy-1,4-pregnadiene-3,20-dione 21-hemisuccinate and following the procedure of Example 63A is productive of the sodium salt of 6α,16α-difluoro-11β,17α,21-trihydroxy-1,4-pregnadiene-3,20-dione 21 - phosphate, a crystalline solid.

Example 69

*Sodium salt of 6α,9α,16α-trifluoro-11β,17α,21-trihydroxy-1,4-pregnadiene-3,20-dione 21-phosphate*

Substituting a stoichiometric equivalent amount of 6α,9α,16α - trifluoro-11β,17α,21-trihydroxy-1,4-pregnadiene-3,20-dione 21-phosphate for 6α,9α,16α-trifluoro-11β,17α, 21 - trihydroxy-1,4-pregnadiene-3,20-dione 21-hemisuccinate and following the procedure of Example 63A is productive of the sodium salt of 6α,9α,16α-trifluoro-11β, 17α,21 - trihydroxy-1,4-pregnadiene-3,20-dione 21-phosphate, a crystalline solid.

Example 70

*The sodium salt of 16α-fluoro-6α-methyl-11β,17α,21-trihydroxy-1,4-pregnadiene-3,20-dione 21-phosphate*

Substituting a stoichiometric equivalent amount of 16α-fluoro - 6α-methyl-11β,17α,21-trihydroxy-1,4-pregnadiene-3,20-dione 21-phosphate for 6α,9α,16α-trifluoro-11β,17α, 21-trihydroxy-1,4-pregnadiene-3,20-dione 21-hemisuccinate and following the procedure of Example 63A is productive of the sodium salt of 16α-fluoro-6α-methyl-11β, 17α,21 - trihydroxy-1,4-pregnadiene-3,20-dione 21-phosphate, a crystalline solid.

Example 71

*The sodium salt of 9α,16α-difluoro-6α-methyl-11β,17α, 21-trihydroxy-1,4-pregnadiene-3,20-dione 21-phosphate*

Substituting a stoichiometric equivalent amount of 9α, 16α - difluoro-6α-methyl-11β,17α,21-trihydroxy-1,4-pregnadiene-3,20-dione 21-phosphate for 6α,9α,16α-trifluoro-11β,17α,21 - trihydroxy-1,4-pregnadiene-3,20-dione 21-hemisuccinate and following the procedure of Example 63A is productive of the sodium salt of 9α,16α-difluoro-6α - methyl-11β,17α,21-trihydroxy-1,4-pregnadiene-3,20-dione 21-phosphate.

Example 72

*Other pharmacologically acceptable salts of the 21-hemisuccinate and the 21-phosphates*

Substituting other bases capable of forming pharmacologically acceptable water-soluble salts, for example, inorganic bases, such as, potassium bicarbonate, lithium bicarbonate, ammonium bicarbonate, sodium hydroxide, potassium hydroxide, lithium hydroxide, ammonium hydroxide, and the like, and organic bases, such as, lower alkyl tertiary amines, for example, trimethylamine, triethylamine, and the like, for the sodium bicarbonate recited in Examples 43A, 49A, 57A, 63A, and 68 through 71 is productive of the pharmacologically acceptable water-soluble salts, such as, sodium, potassium, lithium, ammonium, trimethylammonium, triethylammonium, and the like, salts respectively, of 16α-fluoro-6α-methyl-11β,17α,21-trihydroxy-1,4-pregnadiene-3,20-dione 21-hemisuccinate, 9α,16α-difluoro-6α-methyl-11β,17α,21-trihydroxy-1,4-pregnadiene-3,20-dione 21-hemisuccinate, 6α,16α-difluoro - 11β,17α,21-trihydroxy-1,4-pregnadiene-3,20-dione 21 - hemisuccinate 6α,9α,16α-trifluoro-11β,17α,21-trihydroxy-1,4-pregnadiene-3,20-dione 21-hemisuccinate, 6α,16α - difluoro-11β,17α,21-trihydroxy-1,4-pregnadiene-3,20-dione 21-phosphate, 6α,9α,16α-trifluoro-11β,17α,21-trihydroxy - 1,4 - pregnadiene-3,20-dione 21-phosphate, 16α-fluoro - 6α-methyl-11β,17α-21-trihydroxy-1,4-pregnadiene-3,20-dione 21-phosphate, and 9α,16α-difluoro-6α-methyl-11β,17α,21 - trihydroxy-1,4-pregnadiene-3,20-dione 21-phosphate.

We claim:

1. A compound of the pregnane series having the following formula:

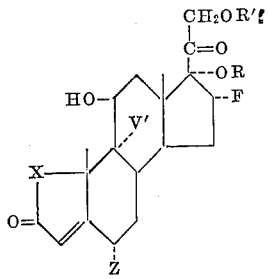

wherein X is selected from the group consisting of

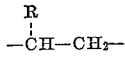

and

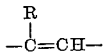

R being attached at the 2-position and selected from the group consisting of hydrogen and methyl, R″ is selected from the group consisting of hydrogen and the acyl radical of a hydrocarbon carboxylic acid containing from 1 to 12 carbon atoms, inclusive, V′ is selected from the group consisting of hydrogen and a halogen having an atomic weight of 19 to 80, inclusive, and Z is selected from the group consisting of hydrogen, fluorine, and methyl.

2. A compound of the pregnane series having the following formula:

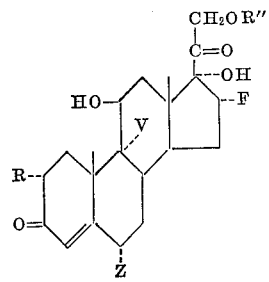

wherein R is selected from the group consisting of hydrogen and methyl, R″ is selected from the group consisting of hydrogen and the acyl radical of a hydrocarbon carboxylic acid containing from 1 to 12 carbon atoms, inclusive, V is selected from the group consisting of hydrogen and fluorine, and Z is selected from the group consisting of hydrogen, fluorine, and methyl.

3. 16α - fluoro-11β,17α,21-trihydroxy-4-pregnene-3,20-dione and the 21-acylates thereof wherein the acyl radical is that of a hydrocarbon carboxylic acid containing from 1 to 12 carbon atoms, inclusive.

4. A compound of the pregnane series having the following formula:

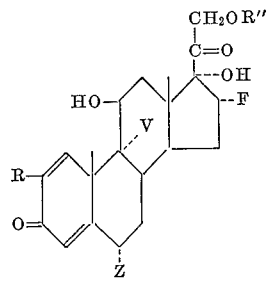

wherein R is selected from the group consisting of hydrogen and methyl, R″ is selected from the group consisting of hydrogen and the acyl radical of a hydrocarbon carboxylic acid containing from 1 to 12 carbon atoms, inclusive, V is selected from the group consisting of hydrogen and fluorine, and Z is selected from the group consisting of hydrogen, fluorine, and methyl.

5. 16α - fluoro-11β,17α-21-trihydroxy-1,4-pregnadiene-3,20-dione.

6. 16α - fluoro-11β,17α,21-trihydroxy-1,4-pregnadiene-3,20-dione 21-acetylates in which the actyl radical is that of a hydrocarbon carboxylic acid containing from 1 to 12 carbon atoms, inclusive.

7. 16α - fluoro-11β,17α,21-trihydroxy-1,4-pregnadiene-3,20-dione 21-acetate.

8. 16α-fluoro - 6α - methyl-11β,17α,21-trihydroxy-1,4-pregnadiene-3,20-dione and the 21-acylates thereof in which the acyl radical is that of a hydrocarbon carboxylic acid containing from 1 to 12 carbon atoms, inclusive.

9. 16α-fluoro - 6α - methyl-11β,17α,21-trihydroxy-1,4-pregnadiene-3,20-dione 21-acetate.

10. 16α-fluoro - 6α - methyl-11β,17α,21-trihydroxy-1,4-pregnadiene-3,20-dione 21-hemisuccinate.

11. 6α,16α-difluoro - 11β,17α,21 - trihydroxy-1,4-pregnadiene-3,20-dione and the 21-acylates thereof in which the acyl radical is that of a hydrocarbon carboxylic acid containing from 1 to 12 carbon atoms, inclusive.

12. 6α,16α-difluoro - 11β,17α,21 - trihydroxy-1,4-pregnadiene-3,20-dione 21-acetate.

13. 6α,16α-difluoro - 11β,17α,21 - trihydroxy-1,4-pregnadiene-3,20-dione 21-hemisuccinate.

14. 9α,16α-difluoro - 11β,17α,21 - trihydroxy-1,4-pregnadiene-3,20-dione.

15. 9α,16α-difluoro - 11β,17α,21 - trihydroxy-1,4-pregnadiene-3,20-dione 21-acylates in which the acyl radical is that of a hydrocarbon carboxylic acid containing from 1 to 12 carbon atoms, inclusive.

16. 9α,16α-difluoro - 11β,17α,21 - trihydroxy-1,4-pregnadiene-3,20-dione 21-acetate.

17. 9α,16α - difluoro-6α-methyl-11β,17α,21-trihydroxy-1,4-pregnadiene-3,20-dione.

18. 9α,16α - difluoro-6α-methyl-11β,17α,21-trihydroxy-1,4-pregnadiene-3,20-dione 21-acylates in which the acyl radical is that of a hydrocarbon carboxylic acid containing from 1 to 12 carbon atoms, inclusive.

19. 9α,16α - difluoro-6α-methyl-11β,17α,21-trihydroxy-1,4-pregnadiene-3,20-dione 21-acetate.

20. 9α,16α - difluoro-6α-methyl-11β,17α,21-trihydroxy-1,4-pregnadiene-3,20-dione 21-hemisuccinate.

21. 6α,9α,16α - trifluoro - 11β,17α,21 - trihydroxy-1,4-pregnadiene-3,20-dione and the 21-acylates thereof in which the acyl radical is that of a hydrocarbon carboxylic acid containing from 1 to 12 carbon atoms, inclusive.

22. 6α,9α,16α - trifluoro - 11β,17α,21 - trihydroxy-1,4-pregnadiene-3,20-dione 21-acetate.

23. 6α,9α,16α - trifluoro - 11β,17α,21 - trihydroxy-1,4-pregnadiene-3,20-dione 21-hemisuccinate.

24. A compound of the pregnane series having the following formula:

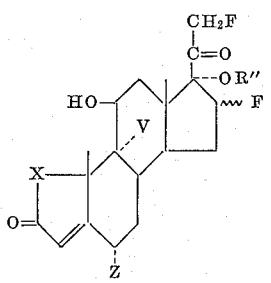

wherein X is selected from the group consisting of

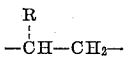

and

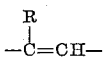

R being attached at the 2-position and selected from the group consisting of hydrogen and methyl, R″ is selected from the group consisting of hydrogen and the acyl radical of a hydrocarbon carboxylic acid containing from 1 to 12 carbon atoms, inclusive, V is selected from the group consisting of hydrogen and fluorine, and Z is selected from the group consisting of hydrogen, fluorine, and methyl.

25. A compound of the pregnane series having the following formula:

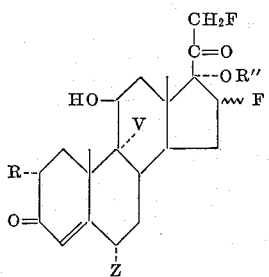

wherein R is selected from the group consisting of hydrogen and methyl, R″ is selected from the group consisting of hydrogen and the acyl radical of a hydrocarbon carboxylic acid containing from 1 to 12 carbon atoms, inclusive, V is selected from the group consisting of hydrogen and fluorine, and Z is selected from the group consisting of hydrogen, fluorine, and methyl.

26. A compound of the pregnane series having the following formula:

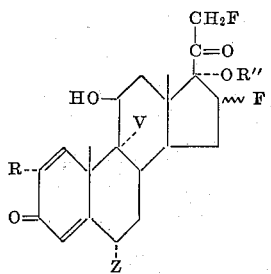

wherein R is selected from the group consisting of hydrogen and methyl, R″ is selected from the group consisting of hydrogen and the acyl radical of a hydrocarbon carboxylic acid containing from 1 to 12 carbon atoms, inclusive, V is selected from the group consisting of hydrogen and fluorine, and Z is selected from the group consisting of hydrogen, fluorine, and methyl.

27. 9α,16α,21-trifluoro-11β,17α-dihydroxy-1,4 - pregnadiene-3,20-dione.

28. A compound of the pregnane series having the following formula:

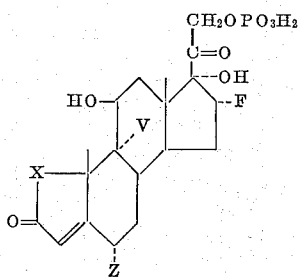

wherein X is selected from the group consisting of

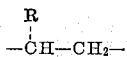

and

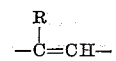

R being attached at the 2-position and selected from the group consisting of hydrogen and methyl, V is selected from the group consisting of hydrogen and fluorine, and Z is selected from the group consisting of hydrogen, fluorine, and methyl.

29. 9α,16α-difluoro-6α-methyl-11β,17α,21-trihydroxy-1,4-pregnadiene-3,20-dione 21-phosphate.

30. 6α,16α-difluoro-11β,17α,21-trihydroxy-1,4-pregnadiene-3,20-dione 21-phosphate.

31. 6α,9α,16α-trifluoro-11β,17α,21-trihydroxy-1,4-pregnadiene-3,20-dione 21-phosphate.

32. A compound of the pregnane series having the following formula:

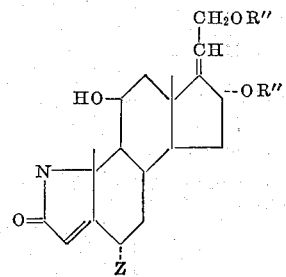

wherein X is selected from the group consisting of

and

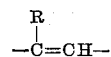

R being attached at the 2-position and selected from the group consisting of hydrogen and methyl, R″ is selected from the group consisting of hydrogen and the acyl radical of a hydrocarbon carboxylic acid containing from 1 to 12 carbon atoms, inclusive, and Z is selected from the group consisting of hydrogen, fluorine, and methyl.

33. 6α-fluoro-11β,16α,21 - trihydroxy - 4,17(20) - pregnadien-3-one 21-acetate.

References Cited by the Examiner

UNITED STATES PATENTS

| | | | |
|---|---|---|---|
| 2,781,366 | 2/1957 | Schneider | 260—397.45 |
| 2,980,670 | 4/1961 | Berg et al. | 260—239.55 |
| 3,022,297 | 2/1962 | Berg et al. | 260—239.55 |
| 3,105,083 | 9/1963 | Lincoln et al. | 260—397.45 |

LEWIS GOTTS, *Primary Examiner.*

LESLIE H. GASTON, MORRIS LIEBMAN, *Examiners.*

ELBERT L. ROBERTS, *Assistant Examiner.*